(12) United States Patent
Chun et al.

(10) Patent No.: US 12,101,712 B2
(45) Date of Patent: Sep. 24, 2024

(54) NETWORK ACCESS MANAGEMENT

(71) Applicant: Ofinno, LLC, Reston, VA (US)

(72) Inventors: SungDuck Chun, Fairfax, VA (US); Kyungmin Park, Vienna, VA (US); Esmael Hejazi Dinan, McLean, VA (US); Peyman Talebi Fard, Vienna, VA (US); Jian Xu, McLean, VA (US); Weihua Qiao, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/511,192

(22) Filed: Nov. 16, 2023

(65) Prior Publication Data

US 2024/0114441 A1    Apr. 4, 2024

Related U.S. Application Data

(63) Continuation of application No. PCT/US2023/015944, filed on Mar. 22, 2023.

(60) Provisional application No. 63/322,714, filed on Mar. 23, 2022.

(51) Int. Cl.
*H04W 48/16* (2009.01)
*H04W 48/02* (2009.01)
*H04W 60/04* (2009.01)

(52) U.S. Cl.
CPC ........... *H04W 48/16* (2013.01); *H04W 48/02* (2013.01); *H04W 60/04* (2013.01)

(58) Field of Classification Search
CPC ...... H04W 48/16; H04W 48/02; H04W 60/04
See application file for complete search history.

(56) References Cited

U.S. PATENT DOCUMENTS

| 9,451,535 | B2 | 9/2016 | Gupta |
| 10,051,533 | B2 | 8/2018 | Fitzpatrick |
| 2021/0250890 | A1* | 8/2021 | Won ..................... H04W 48/16 |
| 2021/0297844 | A1 | 9/2021 | Prabhakar et al. |
| 2021/0410025 | A1 | 12/2021 | Dharmadhikari |
| 2022/0167260 | A1 | 5/2022 | Chun |

(Continued)

FOREIGN PATENT DOCUMENTS

| EP | 3681187 A1 | 7/2020 |
| WO | 2022/035512 A1 | 2/2022 |
| WO | 2022/169693 A1 | 8/2022 |

(Continued)

OTHER PUBLICATIONS

3GPP TS 22.011 V18.1.0 (Dec. 2021); Technical Specification; 3rd Generation Partnership Project; Technical Specification Group Services and System Aspects; Service accessibility (Release 18).

(Continued)

*Primary Examiner* — Diane D Mizrahi
(74) *Attorney, Agent, or Firm* — Sachin Kandhari; Kavon Nasabzadeh; Philip R. Smith

(57) ABSTRACT

A wireless device sends, to a network, a message indicating an enhanced steering of roaming (SOR) capability for network access information for one or more non-public networks (NPN). The wireless device receives, from the network, network access information comprising an identifier of a first NPN and a condition for whether the wireless device is allowed to access the first NPN. The wireless device sends, to the first NPN and based on the condition being met, a registration request message.

20 Claims, 34 Drawing Sheets

(56) References Cited

U.S. PATENT DOCUMENTS

2022/0312360 A1     9/2022     Kuppelur et al.

FOREIGN PATENT DOCUMENTS

| WO | 2022/231982 A1 | 11/2022 |
| WO | 2023/037266 A1 | 3/2023 |
| WO | 2023/081415 A1 | 5/2023 |

OTHER PUBLICATIONS

3GPP TS 23.122 V17.5.0 (Dec. 2021); Technical Specification; 3rd Generation Partnership Project; Technical Specification Group Core Network and Terminals; Non-Access-Stratum (NAS) functions related to Mobile Station (MS) in idle mode; (Release 17).

3GPP TS 23.501 V17.3.0 (Dec. 2021); Technical Specification; 3rd Generation Partnership Project; Technical Specification Group Services and System Aspects; System architecture for the 5G System (5GS); Stage 2; (Release 17).

3GPP TS 23.502 V17.3.0 (Dec. 2021); Technical Specification; 3rd Generation Partnership Project; Technical Specification Group Services and System Aspects; Procedures for the 5G System (5GS); Stage 2; (Release 17).

3GPP TS 29.544 V17.1.0 (Dec. 2021); Technical Specification; 3rd Generation Partnership Project; Technical Specification Group Core Network and Terminals; 5G System; Secured Packet Application Function (SP-AF) Services; Stage 3; (Release 17).

S1-204051; 3GPP TSG-SA WG1 Meeting #92e; Electronic Meeting, Nov. 16-25, 2020; (revision of S1-20xxxx); Title: FS_PALS: Business models for Providing Access to Localized Services; Agenda Item: 7.13.1 (FS_PALS); Document for: Approval; Source: Samsung.

S1-204217; 3GPP TSG-SA WG1 Meeting #92e; E-Meeting Nov. 11-19, 2020; (revision of S1-20xxxx); Title: Use Case for UEs using home network service via hosting network; Agenda Item: 7.13.1; Source: Intel.

S1-210120; 3GPP TSG-SA WG1#93 e-Meeting; Nov. 10-19, 2020; Title: Use case of home service provider dynamically steering UEs to different PALS service networks; Agenda Item: 7.13.1; Source: Futurewei, Philips.

S1-210127; 3GPP TSG-SA WG1 Meeting #93e; Electronic Meeting, Feb. 22-Mar. 4, 2021; (revision of S1-20xxxx); Title: Use case for Network selection based on application for localized services; Agenda Item: 7.13.1; Source: Alibaba.

S2-2200491; SA WG2 Meeting #S2-149E; Feb. 14-25, 2022, E-meeting; Source: Ericsson, Futurewei; Title: Key issue (WT#5): NPN supports of providing access to localized services; Document for: Agreement; Agenda Item: 9.4; Work Item / Release: FS_eNPN_ph2/Rel-18.

S2-2200520; SA WG2 Meeting #S2-149E; Feb. 14-25, 2022, E-meeting; Source:I nterDigital; Title: New Key Issue: Discovery, selection and access of hosting network; Document for: Approval; Agenda Item: 9.4; Work Item / Release: FS_eNPN_ph2 / Rel-18.

S2-2200521; SA WG2 Meeting #S2-149E; Feb. 14-25, 2022, E-meeting; Source:I nterDigital, FutureWei; Title: Key Issue: Network steering between local hosting network and home network; Document for: Approval; Agenda Item: 9.4; Work Item / Release: FS_eNPN_ph2 / Rel-18.

S2-2200522; SA WG2 Meeting #S2-149E; Feb. 14-25, 2022, E-meeting; Source: InterDigital; Title: Key Issue: Overload control when returning to Home Network; Document for: Approval; Agenda Item: 9.4; Work Item / Release: FS_eNPN_ph2 / Rel-18.

S2-2200723; SA WG2 Meeting #149e; Feb. 14-25, 2022; Elbonia; (revision of S2-220xxxx); Source: vivo; Title: FS_eNPN_Ph2 KI proposal of Returning to Home Network; Document for: Approval; Agenda Item: 9.4; Work Item / Release: FS_eNPN_Ph2 / Rel-18.

S2-2200750; 3GPP TSG-WG SA2 Meeting #149E e-meeting; Elbonia, Feb. 14-25, 2022; (revision of S2-220xxxx); Source: Huawei, HiSilicon; Title: FS_eNPN_Ph2 Key Issue for Objective 3; Document for: Approval; Agenda Item: 9.4; Work Item / Release: FS_eNPN_Ph2 / Rel-18.

S2-2200834; 3GPP SA WG2 Meeting #149E (e-meeting); Feb. 14-25, 2022, Elbonia; Source: Nokia, Nokia Shanghai Bell; Title: Key Issues for supporting UE to discover, select, access services offered by SNPN; Document for: Agreement (P-CR); Agenda Item: 9.4; Work Item / Release: FS_eNPN_Ph2 / Rel-18.

S2-2200839; SA WG2 Meeting #149e; Feb. 14-25, 2022; Elbonia; (revision of S2-220); Source: Samsung; Title: KI related with FS_eNPN_ph2 WT5; Document for: Approval; Agenda Item: 9.4; Work Item / Release: FS_eNPN_ph2 / Rel-18.

S2-2201182; SA WG2 Meeting #S2-149E; Feb. 14-25, 2022, E-meeting; Source: Xiaomi; Title: FS_eNPN_Ph2: KI support for PALS; Document for: Approval; Agenda Item: 9.4; Agenda Item: 9.4; Work Item / Release: FS_eNPN_ph2/Rel-18.

S2-2201752; SA WG2 Meeting #149e; Feb. 14-25, 2022; Elbonia; (revision of S2-2200723); Source: vivo, InterDigital; Title: FS_eNPN_Ph2 KI proposal of Returning to Home Network; Document for: Approval; Agenda Item: 9.4; Work Item / Release: FS_eNPN_Ph2 / Rel-18.

S2-2201860; SA WG2 Meeting #S2-149E; Feb. 14-25, 2022, E-meeting; Source: Ericsson, Futurewei, Nokia, Nokia Shanghai Bell, Intel, InterDigital, vivo, Lenovo, Motorola Mobility, Qualcomm Inc.; Title: Key issue (WT#5): NPN supports of providing access to localized services; Document for: Agreement; Agenda Item: 9.4; Work Item / Release: FS_eNPN_ph2/Rel-18.

SP-211656; TSG SA Meeting #SP-94E; Dec. 14-20, 2021, Electronic meeting; P-211617r04; TSG SA Meeting #SP-94ES; Dec. 14-20, 2021, Electronic meeting; SP-211568; TSG SA Meeting #SP-94E; Dec. 14-20, 2021, Electronic meeting; SP-211196; TSG SA Rel-18 Prioritization Workshop; Dec. 9-10, 2021, Electronic meeting; S2-2109353; 3GPP SA WG2 Meeting #148E; Elbonia, Nov. 15-22, 2021; (revision of S2-2108463).

C1-215700; 3GPP TSG-CT WG1 Meeting #132-e; E-meeting, Oct. 11-15, 2021; Change Request; 23.122; CR 0790; rev—Current version: 17.4.0.

International Search Report and Written Opinion of the International Searching authority mailed Jun. 6, 2023, in International Application No. PCT/US2023/015944.

3GPP TR 23. 700-07 V17.0.0 (Mar. 2021); Technical Report; 3rd Generation Partnership Project; Technical Specification Group Services and System Aspects; Study on enhanced support of Non-Public Networks (NPN); (Release 17).

3GPP TS 29.550 V17.3.0 (Dec. 2021); Technical Specification; 3rd Generation Partnership Project; Technical Specification Group Core Network and Terminals; 5G System; Steering of roaming application function services; Stage 3; (Release 17).

* cited by examiner

NETWORK ACCESS MANAGEMENT

CROSS-REFERENCE TO RELATED APPLICATIONS

This application is a continuation of International Application No. PCT/US2023/015944, filed Mar. 22, 2023, which claims the benefit of U.S. Provisional Application No. 63/322,714, filed Mar. 23, 2022, all of which are hereby incorporated by reference in their entireties.

BRIEF DESCRIPTION OF THE DRAWINGS

Examples of several of the various embodiments of the present disclosure are described herein with reference to the drawings.

DETAILED DESCRIPTION

Figure 1A:
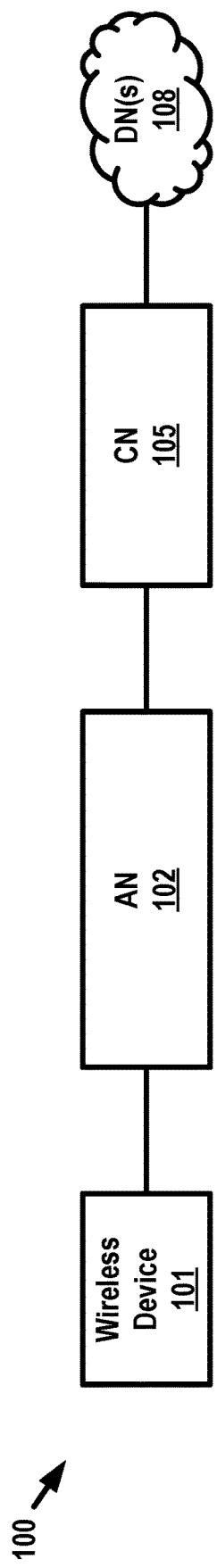
FIG. 1A and FIG. 1B illustrate example communication networks including an access network and a core network.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have one or more specific capabilities. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases refer to a single instance of a particular element, but should not be interpreted to exclude other instances of that element. For example, a bicycle with two wheels may be described as having "a wheel". Any term that ends with the suffix "(s)" is to be interpreted as "at least one" and/or "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described.

The phrases "based on", "in response to", "depending on", "employing", "using", and similar phrases indicate the presence and/or influence of a particular factor and/or condition on an event and/or action, but do not exclude unenumerated factors and/or conditions from also being present and/or influencing the event and/or action. For example, if action X is performed "based on" condition Y, this is to be interpreted as the action being performed "based at least on" condition Y. For example, if the performance of action X is performed when conditions Y and Z are both satisfied, then the performing of action X may be described as being "based on Y".

The term "configured" may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, a parameter may comprise one or more information objects, and an information object may comprise one or more other objects. For example, if parameter J comprises parameter K, and parameter K comprises parameter L, and parameter L comprises parameter M, then J comprises L, and J comprises M. A parameter may be referred to as a field or information element. In an example embodiment, when one or more messages comprise a plurality of parameters, it implies that a parameter in the plurality of parameters is in at least one of the one or more messages, but does not have to be in each of the one or more messages.

This disclosure may refer to possible combinations of enumerated elements. For the sake of brevity and legibility, the present disclosure does not explicitly recite each and every permutation that may be obtained by choosing from a set of optional features. The present disclosure is to be interpreted as explicitly disclosing all such permutations. For example, the seven possible combinations of enumerated elements A, B, C consist of: (1) "A"; (2) "B"; (3) "C"; (4) "A and B"; (5) "A and C"; (6) "B and C"; and (7) "A, B, and C". For the sake of brevity and legibility, these seven possible combinations may be described using any of the following interchangeable formulations: "at least one of A, B, and C"; "at least one of A, B, or C"; "one or more of A, B, and C"; "one or more of A, B, or C"; "A, B, and/or C". It will be understood that impossible combinations are excluded. For example, "X and/or not-X" should be interpreted as "X or not-X". It will be further understood that these formulations may describe alternative phrasings of overlapping and/or synonymous concepts, for example, "identifier, identification, and/or ID number".

This disclosure may refer to sets and/or subsets. As an example, set X may be a set of elements comprising one or more elements. If every element of X is also an element of Y, then X may be referred to as a subset of Y. In this disclosure, only non-empty sets and subsets are considered. For example, if Y consists of the elements Y1, Y2, and Y3, then the possible subsets of Y are {Y1, Y2, Y3}, {Y1, Y2}, {Y1, Y3}, {Y2, Y3}, {Y1}, {Y2}, and {Y3}.

FIG. 1A illustrates an example of a communication network 100 in which embodiments of the present disclosure may be implemented. The communication network 100 may comprise, for example, a public land mobile network (PLMN) run by a network operator. As illustrated in FIG. 1A, the communication network 100 includes a wireless device 101, an access network (AN) 102, a core network (CN) 105, and one or more data network (DNs) 108.

The wireless device 101 may communicate with DNs 108 via AN 102 and CN 105. In the present disclosure, the term wireless device may refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, unmanned aerial vehicle, urban air mobility, and/or any combination thereof. The term wireless device encompasses other terminology, including user equipment (UE), user terminal (UT), access terminal (AT), mobile station, handset, wireless transmit and receive unit (WTRU), and/or wireless communication device.

The AN 102 may connect wireless device 101 to CN 105 in any suitable manner. The communication direction from the AN 102 to the wireless device 101 is known as the downlink and the communication direction from the wireless device 101 to AN 102 is known as the uplink. Downlink transmissions may be separated from uplink transmissions using frequency division duplexing (FDD), time-division duplexing (TDD), and/or some combination of the two duplexing techniques. The AN 102 may connect to wireless device 101 through radio communications over an air interface. An access network that at least partially operates over the air interface may be referred to as a radio access network (RAN). The CN 105 may set up one or more end-to-end connection between wireless device 101 and the one or more DNs 108. The CN 105 may authenticate wireless device 101 and provide charging functionality.

In the present disclosure, the term base station may refer to and encompass any element of AN 102 that facilitates communication between wireless device 101 and AN 102. Access networks and base stations have many different names and implementations. The base station may be a terrestrial base station fixed to the earth. The base station may be a mobile base station with a moving coverage area. The base station may be in space, for example, on board a satellite. For example, WiFi and other standards may use the term access point. As another example, the Third-Generation Partnership Project (3GPP) has produced specifications for three generations of mobile networks, each of which uses different terminology. Third Generation (3G) and/or Universal Mobile Telecommunications System (UMTS) standards may use the term Node B. 4G, Long Term Evolution (LTE), and/or Evolved Universal Terrestrial Radio Access (E-UTRA) standards may use the term Evolved Node B (eNB). 5G and/or New Radio (NR) standards may describe AN 102 as a next-generation radio access network (NG-RAN) and may refer to base stations as Next Generation eNB (ng-eNB) and/or Generation Node B (gNB). Future standards (for example, 6G, 7G, 8G) may use new terminology to refer to the elements which implement the methods described in the present disclosure (e.g., wireless devices, base stations, ANs, CNs, and/or components thereof). A base station may be implemented as a repeater or relay node used to extend the coverage area of a donor node. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The AN 102 may include one or more base stations, each having one or more coverage areas. The geographical size and/or extent of a coverage area may be defined in terms of a range at which a receiver of AN 102 can successfully receive transmissions from a transmitter (e.g., wireless device 101) operating within the coverage area (and/or vice-versa). The coverage areas may be referred to as sectors or cells (although in some contexts, the term cell refers to the carrier frequency used in a particular coverage area, rather than the coverage area itself). Base stations with large coverage areas may be referred to as macrocell base stations. Other base stations cover smaller areas, for example, to provide coverage in areas with weak macrocell coverage, or to provide additional coverage in areas with high traffic (sometimes referred to as hotspots). Examples of small cell base stations include, in order of decreasing coverage area, microcell base stations, picocell base stations, and femtocell base stations or home base stations. Together, the coverage areas of the base stations may provide radio coverage to wireless device 101 over a wide geographic area to support wireless device mobility.

A base station may include one or more sets of antennas for communicating with the wireless device 101 over the air interface. Each set of antennas may be separately controlled by the base station. Each set of antennas may have a corresponding coverage area. As an example, a base station may include three sets of antennas to respectively control three coverage areas on three different sides of the base station. The entirety of the base station (and its corresponding antennas) may be deployed at a single location. Alternatively, a controller at a central location may control one or more sets of antennas at one or more distributed locations. The controller may be, for example, a baseband processing unit that is part of a centralized or cloud RAN architecture. The baseband processing unit may be either centralized in a pool of baseband processing units or virtualized. A set of antennas at a distributed location may be referred to as a remote radio head (RRH).

Figure 1B:
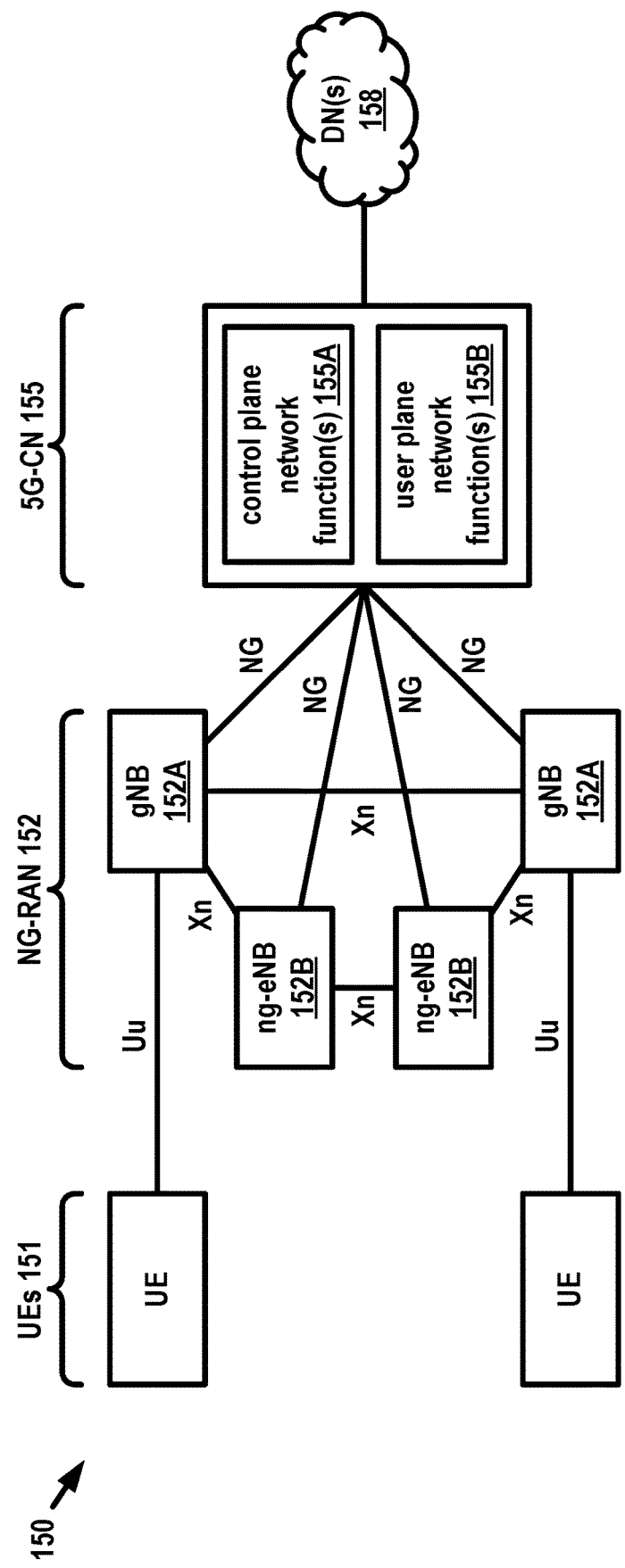

FIG. 1B illustrates another example communication network 150 in which embodiments of the present disclosure may be implemented. The communication network 150 may comprise, for example, a PLMN run by a network operator. As illustrated in FIG. 1B, communication network 150 includes UEs 151, a next generation radio access network (NG-RAN) 152, a 5G core network (5G-CN) 155, and one or more DNs 158. The NG-RAN 152 includes one or more base stations, illustrated as generation node Bs (gNBs) 152A and next generation evolved Node Bs (ng eNBs) 152B. The 5G-CN 155 includes one or more network functions (NFs), including control plane functions 155A and user plane functions 155B. The one or more DNs 158 may comprise public DNs (e.g., the Internet), private DNs, and/or intra-operator DNs. Relative to corresponding components illustrated in FIG. 1A, these components may represent specific implementations and/or terminology.

The base stations of the NG-RAN 152 may be connected to the UEs 151 via Uu interfaces. The base stations of the NG-RAN 152 may be connected to each other via Xn interfaces. The base stations of the NG-RAN 152 may be connected to 5G CN 155 via NG interfaces. The Uu interface may include an air interface. The NG and Xn interfaces may include an air interface, or may consist of direct physical connections and/or indirect connections over an underlying transport network (e.g., an internet protocol (IP) transport network).

Each of the Uu, Xn, and NG interfaces may be associated with a protocol stack. The protocol stacks may include a user plane (UP) and a control plane (CP). Generally, user plane data may include data pertaining to users of the UEs 151, for example, internet content downloaded via a web browser application, sensor data uploaded via a tracking application, or email data communicated to or from an email server. Control plane data, by contrast, may comprise signaling and messages that facilitate packaging and routing of user plane data so that it can be exchanged with the DN(s). The NG interface, for example, may be divided into an NG user plane interface (NG-U) and an NG control plane interface (NG-C). The NG-U interface may provide delivery of user plane data between the base stations and the one or more user plane network functions 155B. The NG-C interface may be used for control signaling between the base stations and the one or more control plane network functions 155A. The NG-C interface may provide, for example, NG interface management, UE context management, UE mobility management, transport of NAS messages, paging, PDU session management, and configuration transfer and/or warning message transmission. In some cases, the NG-C interface may support transmission of user data (for example, a small data transmission for an IoT device).

One or more of the base stations of the NG-RAN 152 may be split into a central unit (CU) and one or more distributed units (DUs). A CU may be coupled to one or more DUs via an F1 interface. The CU may handle one or more upper layers in the protocol stack and the DU may handle one or more lower layers in the protocol stack. For example, the CU may handle RRC, PDCP, and SDAP, and the DU may handle RLC, MAC, and PHY. The one or more DUs may be in geographically diverse locations relative to the CU and/or each other. Accordingly, the CU/DU split architecture may permit increased coverage and/or better coordination.

The gNBs 152A and ng-eNBs 152B may provide different user plane and control plane protocol termination towards the UEs 151. For example, the gNB 154A may provide new radio (NR) protocol terminations over a Uu interface associated with a first protocol stack. The ng-eNBs 152B may provide Evolved UMTS Terrestrial Radio Access (E-UTRA) protocol terminations over a Uu interface associated with a second protocol stack.

The 5G-CN 155 may authenticate UEs 151, set up end-to-end connections between UEs 151 and the one or more DNs 158, and provide charging functionality. The 5G-CN 155 may be based on a service-based architecture, in which the NFs making up the 5G-CN 155 offer services to each other and to other elements of the communication network 150 via interfaces. The 5G-CN 155 may include any number of other NFs and any number of instances of each NF.

FIG. 2A, FIG. 2B, FIG. 2C, and FIG. 2D illustrate various examples of a framework for a service-based architecture within a core network. In a service-based architecture, a service may be sought by a service consumer and provided by a service producer. Prior to obtaining a particular service, an NF may determine where such as service can be obtained. To discover a service, the NF may communicate with a network repository function (NRF). As an example, an NF that provides one or more services may register with a network repository function (NRF). The NRF may store data relating to the one or more services that the NF is prepared to provide to other NFs in the service-based architecture. A consumer NF may query the NRF to discover a producer NF (for example, by obtaining from the NRF a list of NF instances that provide a particular service).

Figure 2A:
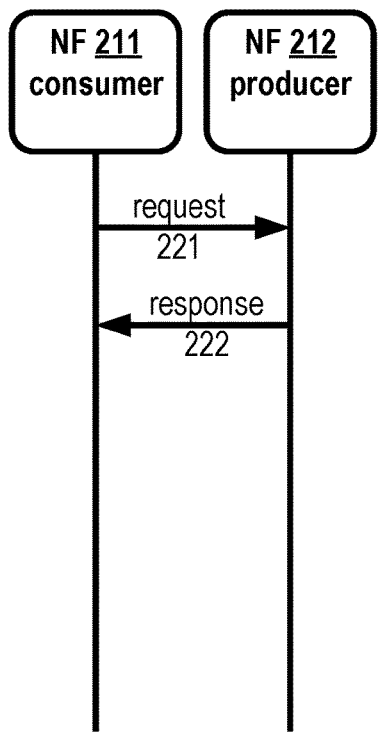
FIG. 2A, FIG. 2B, FIG. 2C, and FIG. 2D illustrate various examples of a framework for a service-based architecture within a core network.

In the example of FIG. 2A, an NF 211 (a consumer NF in this example) may send a request 221 to an NF 212 (a producer NF). The request 221 may be a request for a particular service and may be sent based on a discovery that NF 212 is a producer of that service. The request 221 may comprise data relating to NF 211 and/or the requested service. The NF 212 may receive request 221, perform one or more actions associated with the requested service (e.g., retrieving data), and provide a response 221. The one or more actions performed by the NF 212 may be based on request data included in the request 221, data stored by NF 212, and/or data retrieved by NF 212. The response 222 may notify NF 211 that the one or more actions have been completed. The response 222 may comprise response data relating to NF 212, the one or more actions, and/or the requested service.

Figure 2B:
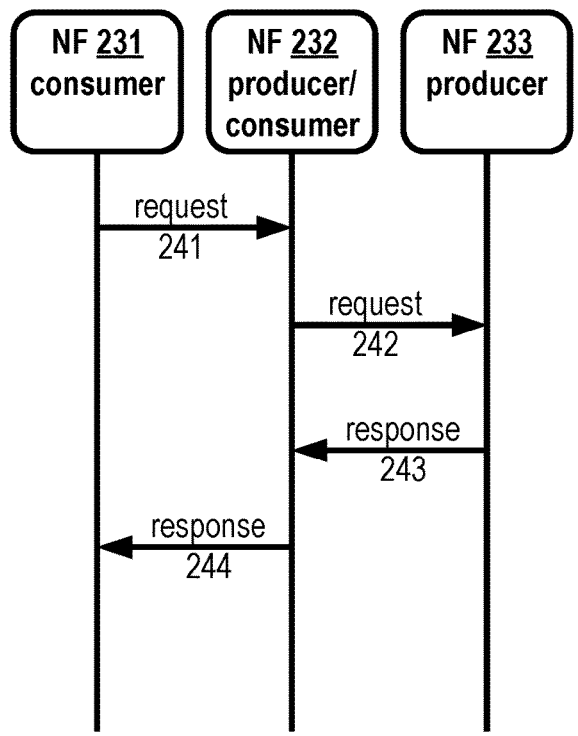

In the example of FIG. 2B, an NF 231 sends a request 241 to an NF 232. In this example, part of the service produced by NF 232 is to send a request 242 to an NF 233. The NF 233 may perform one or more actions and provide a response 243 to NF 232. Based on response 243, NF 232 may send a response 244 to NF 231. It will be understood from FIG. 2B that a single NF may perform the role of producer of services, consumer of services, or both. A particular NF service may include any number of nested NF services produced by one or more other NFs.

Figure 2C:
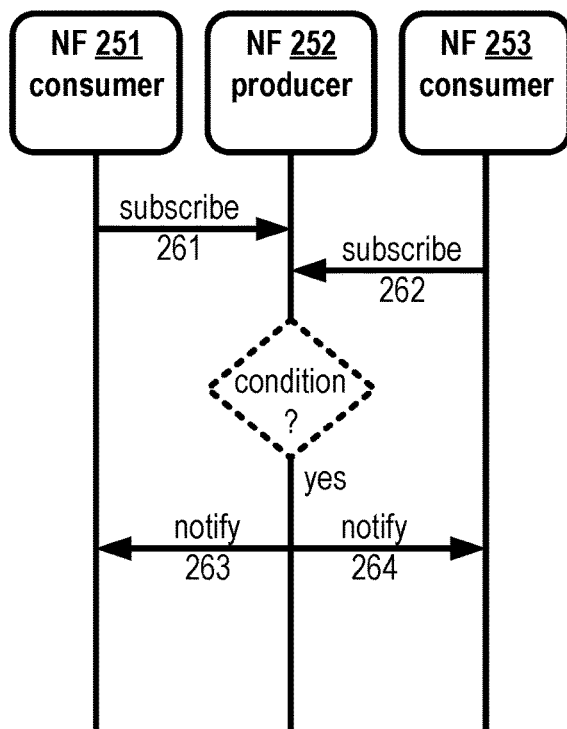

FIG. 2C illustrates examples of subscribe-notify interactions between a consumer NF and a producer NF. In FIG. 2C, an NF 251 sends a subscription 261 to an NF 252. An NF 253 sends a subscription 262 to the NF 252. Two NFs are shown in FIG. 2C for illustrative purposes (to demonstrate that the NF 252 may provide multiple subscription services to different NFs), but it will be understood that a subscribe-notify interaction only requires one subscriber. The NFs 251, 253 may be independent from one another. For example, the NFs 251, 253 may independently discover NF 252 and/or independently determine to subscribe to the service offered by NF 252. In response to receipt of a subscription, the NF 252 may provide a notification to the subscribing NF. For example, NF 252 may send a notification 263 to NF 251 based on subscription 261 and may send a notification 264 to NF 253 based on subscription 262.

As shown in the example illustration of FIG. 2C, the sending of the notifications 263, 264 may be based on a determination that a condition has occurred. For example, the notifications 263, 264 may be based on a determination that a particular event has occurred, a determination that a particular condition is outstanding, and/or a determination that a duration of time associated with the subscription has elapsed (for example, a period associated with a subscription for periodic notifications). As shown in the example illustration of FIG. 2C, NF 252 may send notifications 263, 264 to NFs 251, 253 simultaneously and/or in response to the same condition. However, it will be understood that the NF 252 may provide notifications at different times and/or in response to different notification conditions. In an example, the NF 251 may request a notification when a certain parameter, as measured by the NF 252, exceeds a first threshold, and the NF 252 may request a notification when the parameter exceeds a second threshold different from the first threshold. In an example, a parameter of interest and/or a corresponding threshold may be indicated in the subscriptions 261, 262.

Figure 2D:
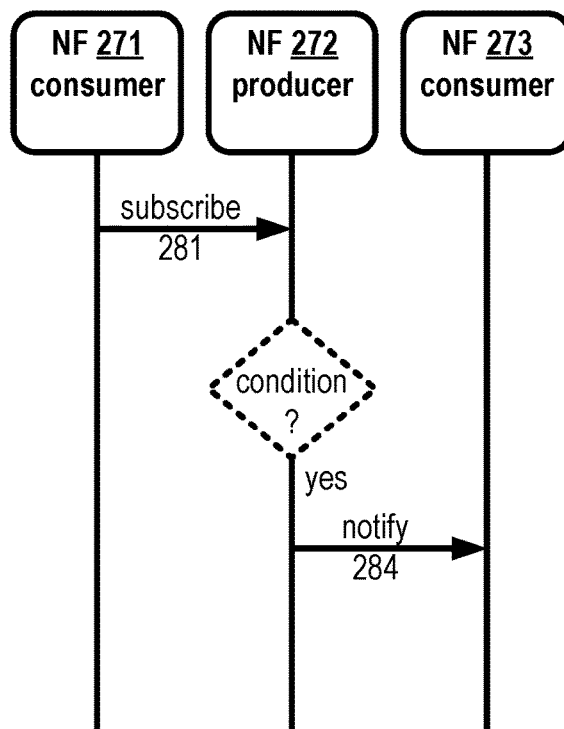

FIG. 2D illustrates another example of a subscribe-notify interaction. In FIG. 2D, an NF 271 sends a subscription 281 to an NF 272. In response to receipt of subscription 281 and/or a determination that a notification condition has occurred, NF 272 may send a notification 284. The notification 284 may be sent to an NF 273. Unlike the example in FIG. 2C (in which a notification is sent to the subscribing NF), FIG. 2D demonstrates that a subscription and its corresponding notification may be associated with different NFs. For example, NF 271 may subscribe to the service provided by NF 272 on behalf of NF 273.

Figure 3:
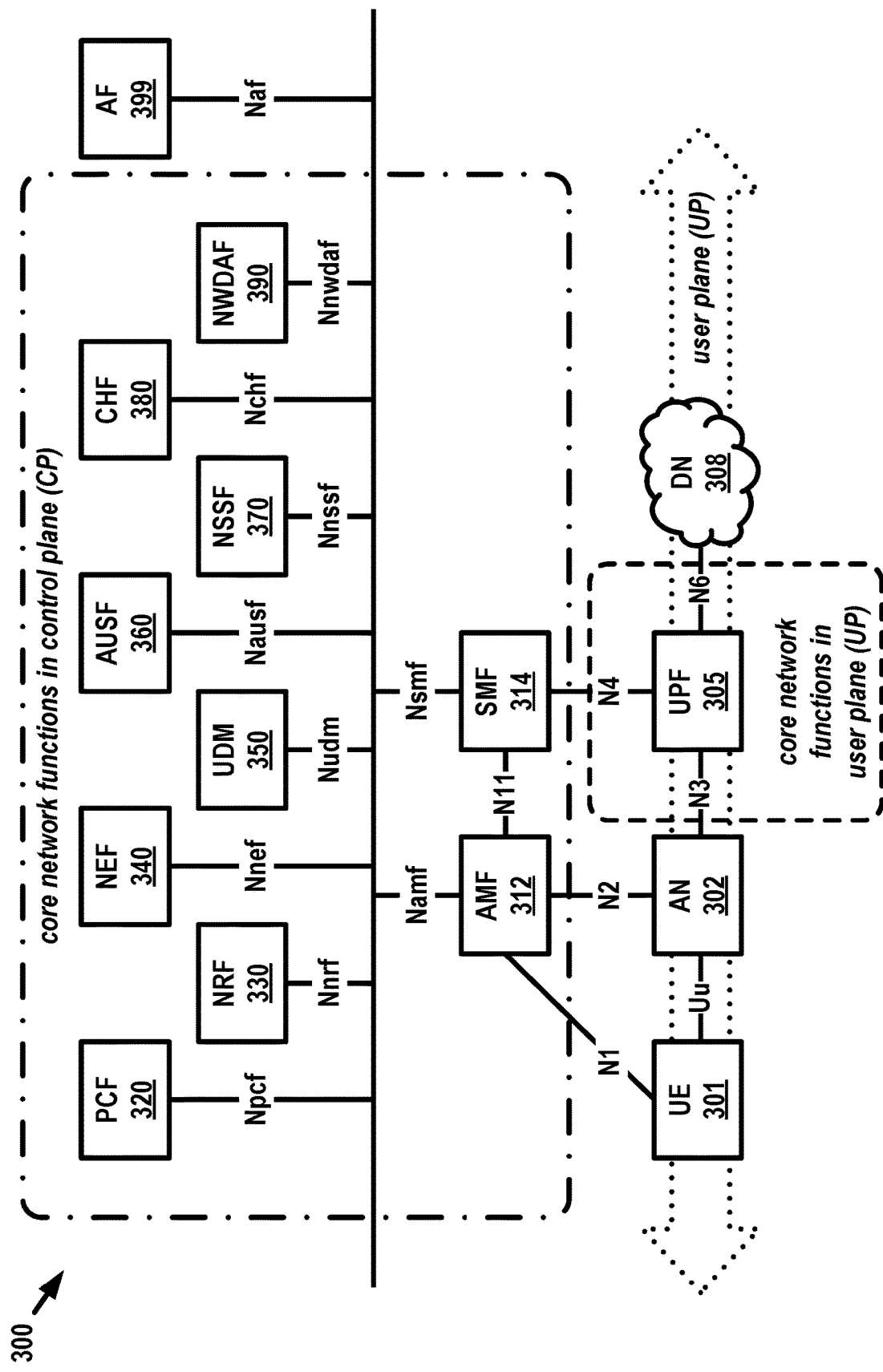
FIG. 3 illustrates an example communication network including core network functions.

FIG. 3 illustrates another example communication network 300 in which embodiments of the present disclosure may be implemented. Communication network 300 includes a user equipment (UE) 301, an access network (AN) 302, and a data network (DN) 308. The remaining elements depicted in FIG. 3 may be included in and/or associated with a core network. Each element of the core network may be referred to as a network function (NF).

The NFs depicted in FIG. 3 include a user plane function (UPF) 305, an access and mobility management function (AMF) 312, a session management function (SMF) 314, a policy control function (PCF) 320, a network repository function (NRF) 330, a network exposure function (NEF) 340, a unified data management (UDM) 350, an authentication server function (AUSF) 360, a network slice selection function (NSSF) 370, a charging function (CHF) 380, a network data analytics function (NWDAF) 390, and an application function (AF) 399. The UPF 305 may be a user-plane core network function, whereas the NFs 312, 314, and 320-390 may be control-plane core network functions. Although not shown in the example of FIG. 3, the core network may include additional instances of any of the NFs depicted and/or one or more different NF types that provide different services. Other examples of NF type include a gateway mobile location center (GMLC), a location management function (LMF), an operations, administration, and maintenance function (OAM), a public warning system (PWS), a short message service function (SMSF), a unified data repository (UDR), and an unstructured data storage function (UDSF).

Each element depicted in FIG. 3 has an interface with at least one other element. The interface may be a logical connection rather than, for example, a direct physical connection. Any interface may be identified using a reference point representation and/or a service-based representation. In a reference point representation, the letter 'N' is followed by a numeral, indicating an interface between two specific elements. For example, as shown in FIG. 3, AN 302 and UPF 305 interface via 'N3', whereas UPF 305 and DN 308 interface via 'N6'. By contrast, in a service-based representation, the letter 'N' is followed by letters. The letters identify an NF that provides services to the core network. For example, PCF 320 may provide services via interface 'Npcf'. The PCF 320 may provide services to any NF in the core network via 'Npcf'. Accordingly, a service-based representation may correspond to a bundle of reference point representations. For example, the Npcf interface between PCF 320 and the core network generally may correspond to an N7 interface between PCF 320 and SMF 314, an N30 interface between PCF 320 and NEF 340, etc.

The UPF 305 may serve as a gateway for user plane traffic between AN 302 and DN 308. The UE 301 may connect to UPF 305 via a Uu interface and an N3 interface (also described as NG-U interface). The UPF 305 may connect to DN 308 via an N6 interface. The UPF 305 may connect to one or more other UPFs (not shown) via an N9 interface. The UE 301 may be configured to receive services through a protocol data unit (PDU) session, which is a logical connection between UE 301 and DN 308. The UPF 305 (or a plurality of UPFs if desired) may be selected by SMF 314 to handle a particular PDU session between UE 301 and DN 308. The SMF 314 may control the functions of UPF 305 with respect to the PDU session. The SMF 314 may connect to UPF 305 via an N4 interface. The UPF 305 may handle any number of PDU sessions associated with any number of UEs (via any number of ANs). For purposes of handling the one or more PDU sessions, UPF 305 may be controlled by any number of SMFs via any number of corresponding N4 interfaces.

The AMF 312 depicted in FIG. 3 may control UE access to the core network. The UE 301 may register with the network via AMF 312. It may be necessary for UE 301 to register prior to establishing a PDU session. The AMF 312 may manage a registration area of UE 301, enabling the network to track the physical location of UE 301 within the network. For a UE in connected mode, AMF 312 may manage UE mobility, for example, handovers from one AN or portion thereof to another. For a UE in idle mode, AMF 312 may perform registration updates and/or page the UE to transition the UE to connected mode.

The AMF 312 may receive, from UE 301, non-access stratum (NAS) messages transmitted in accordance with NAS protocol. NAS messages relate to communications between UE 301 and the core network. Although NAS messages may be relayed to AMF 312 via AN 302, they may be described as communications via the N1 interface. NAS messages may facilitate UE registration and mobility management, for example, by authenticating, identifying, configuring, and/or managing a connection of UE 301. NAS messages may support session management procedures for maintaining user plane connectivity and quality of service (QoS) of a session between UE 301 and DN 309. If the NAS message involves session management, AMF 312 may send the NAS message to SMF 314. NAS messages may be used to transport messages between UE 301 and other components of the core network (e.g., core network components other than AMF 312 and SMF 314). The AMF 312 may act on a particular NAS message itself, or alternatively, forward the NAS message to an appropriate core network function (e.g., SMF 314, etc.)

The SMF 314 depicted in FIG. 3 may establish, modify, and/or release a PDU session based on messaging received UE 301. The SMF 314 may allocate, manage, and/or assign an IP address to UE 301, for example, upon establishment of a PDU session. There may be multiple SMFs in the network, each of which may be associated with a respective group of wireless devices, base stations, and/or UPFs. A UE with multiple PDU sessions may be associated with a different SMF for each PDU session. As noted above, SMF 314 may select one or more UPFs to handle a PDU session and may control the handling of the PDU session by the selected UPF by providing rules for packet handling (PDR, FAR, QER, etc.). Rules relating to QoS and/or charging for a particular PDU session may be obtained from PCF 320 and provided to UPF 305.

The PCF 320 may provide, to other NFs, services relating to policy rules. The PCF 320 may use subscription data and information about network conditions to determine policy rules and then provide the policy rules to a particular NF which may be responsible for enforcement of those rules. Policy rules may relate to policy control for access and mobility, and may be enforced by the AMF. Policy rules may relate to session management, and may be enforced by the SMF 314. Policy rules may be, for example, network-specific, wireless device-specific, session-specific, or data flow-specific.

The NRF 330 may provide service discovery. The NRF 330 may belong to a particular PLMN. The NRF 330 may maintain NF profiles relating to other NFs in the communication network 300. The NF profile may include, for example, an address, PLMN, and/or type of the NF, a slice identifier, a list of the one or more services provided by the NF, and the authorization required to access the services.

The NEF 340 depicted in FIG. 3 may provide an interface to external domains, permitting external domains to selectively access the control plane of the communication network 300. The external domain may comprise, for example, third-party network functions, application functions, etc. The NEF 340 may act as a proxy between external elements and network functions such as AMF 312, SMF 314, PCF 320, UDM 350, etc. As an example, NEF 340 may determine a location or reachability status of UE 301 based on reports from AMF 312, and provide status information to an external element. As an example, an external element may provide, via NEF 340, information that facilitates the setting of parameters for establishment of a PDU session. The NEF 340 may determine which data and capabilities of the control plane are exposed to the external domain. The NEF 340 may provide secure exposure that authenticates and/or authorizes an external entity to which data or capabilities of the communication network 300 are exposed. The NEF 340 may selectively control the exposure such that the internal architecture of the core network is hidden from the external domain.

The UDM 350 may provide data storage for other NFs. The UDM 350 may permit a consolidated view of network information that may be used to ensure that the most relevant information can be made available to different NFs from a single resource. The UDM 350 may store and/or retrieve information from a unified data repository (UDR). For example, UDM 350 may obtain user subscription data relating to UE 301 from the UDR.

The AUSF 360 may support mutual authentication of UE 301 by the core network and authentication of the core network by UE 301. The AUSF 360 may perform key agreement procedures and provide keying material that can be used to improve security.

The NSSF 370 may select one or more network slices to be used by the UE 301. The NSSF 370 may select a slice based on slice selection information. For example, the NSSF 370 may receive Single Network Slice Selection Assistance Information (S-NSSAI) and map the S-NSSAI to a network slice instance identifier (NSI).

The CHF 380 may control billing-related tasks associated with UE 301. For example, UPF 305 may report traffic usage associated with UE 301 to SMF 314. The SMF 314 may collect usage data from UPF 305 and one or more other UPFs. The usage data may indicate how much data is exchanged, what DN the data is exchanged with, a network slice associated with the data, or any other information that may influence billing. The SMF 314 may share the collected usage data with the CHF. The CHF may use the collected usage data to perform billing-related tasks associated with UE 301. The CHF may, depending on the billing status of UE 301, instruct SMF 314 to limit or influence access of UE 301 and/or to provide billing-related notifications to UE 301.

The NWDAF 390 may collect and analyze data from other network functions and offer data analysis services to other network functions. As an example, NWDAF 390 may collect data relating to a load level for a particular network slice instance from UPF 305, AMF 312, and/or SMF 314. Based on the collected data, NWDAF 390 may provide load level data to the PCF 320 and/or NSSF 370, and/or notify the PC220 and/or NSSF 370 if load level for a slice reaches and/or exceeds a load level threshold.

The AF 399 may be outside the core network, but may interact with the core network to provide information relating to the QoS requirements or traffic routing preferences associated with a particular application. The AF 399 may access the core network based on the exposure constraints imposed by the NEF 340. However, an operator of the core network may consider the AF 399 to be a trusted domain that can access the network directly.

Figure 4A:
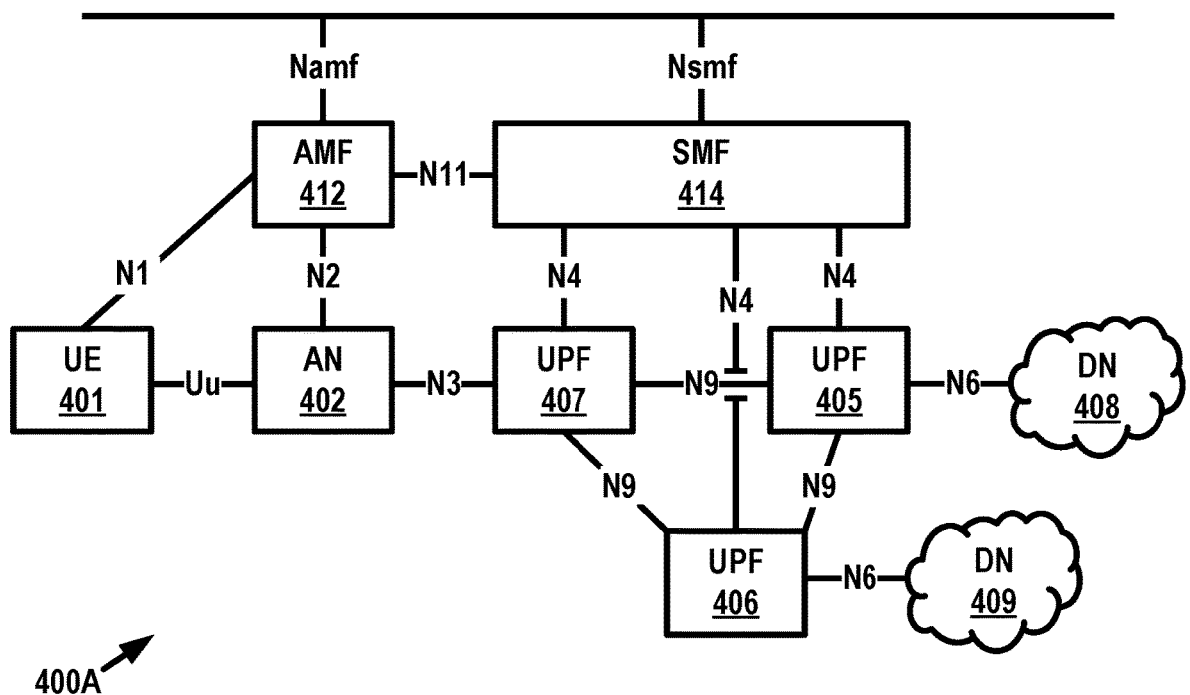
FIG. 4A and FIG. 4B illustrate example of core network architecture with multiple user plane functions and untrusted access.
Figure 4B:
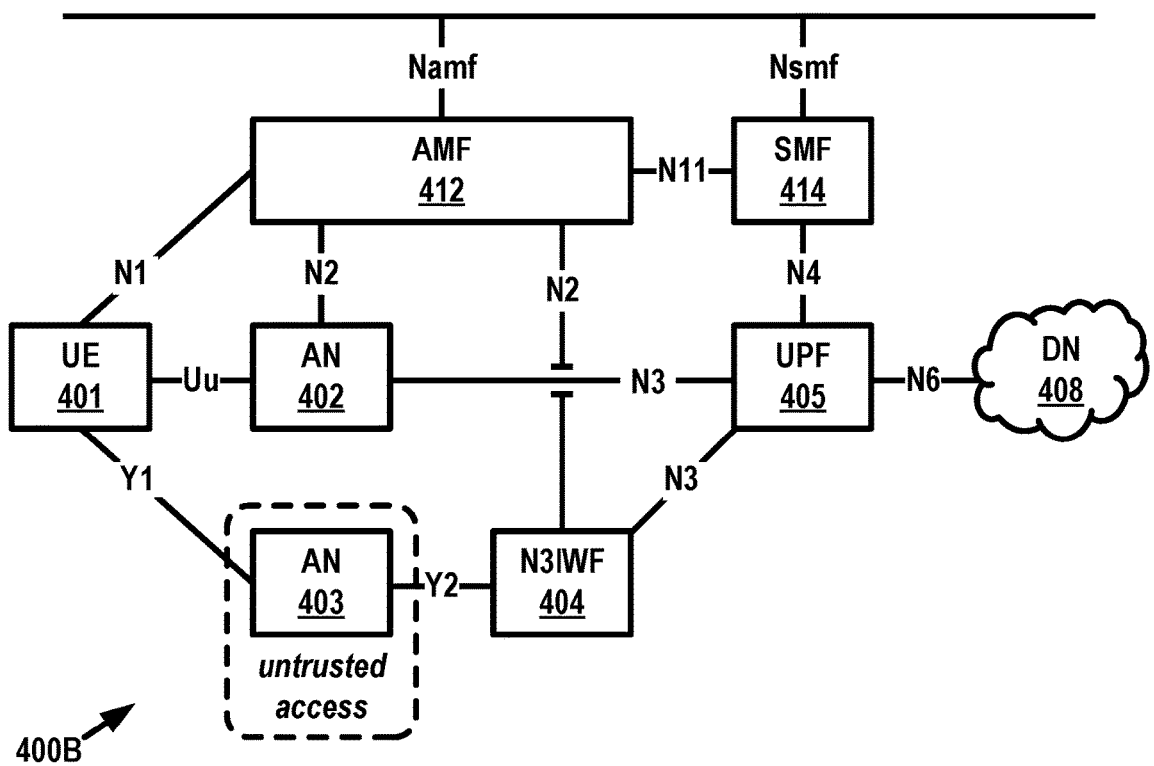
Figure 5:
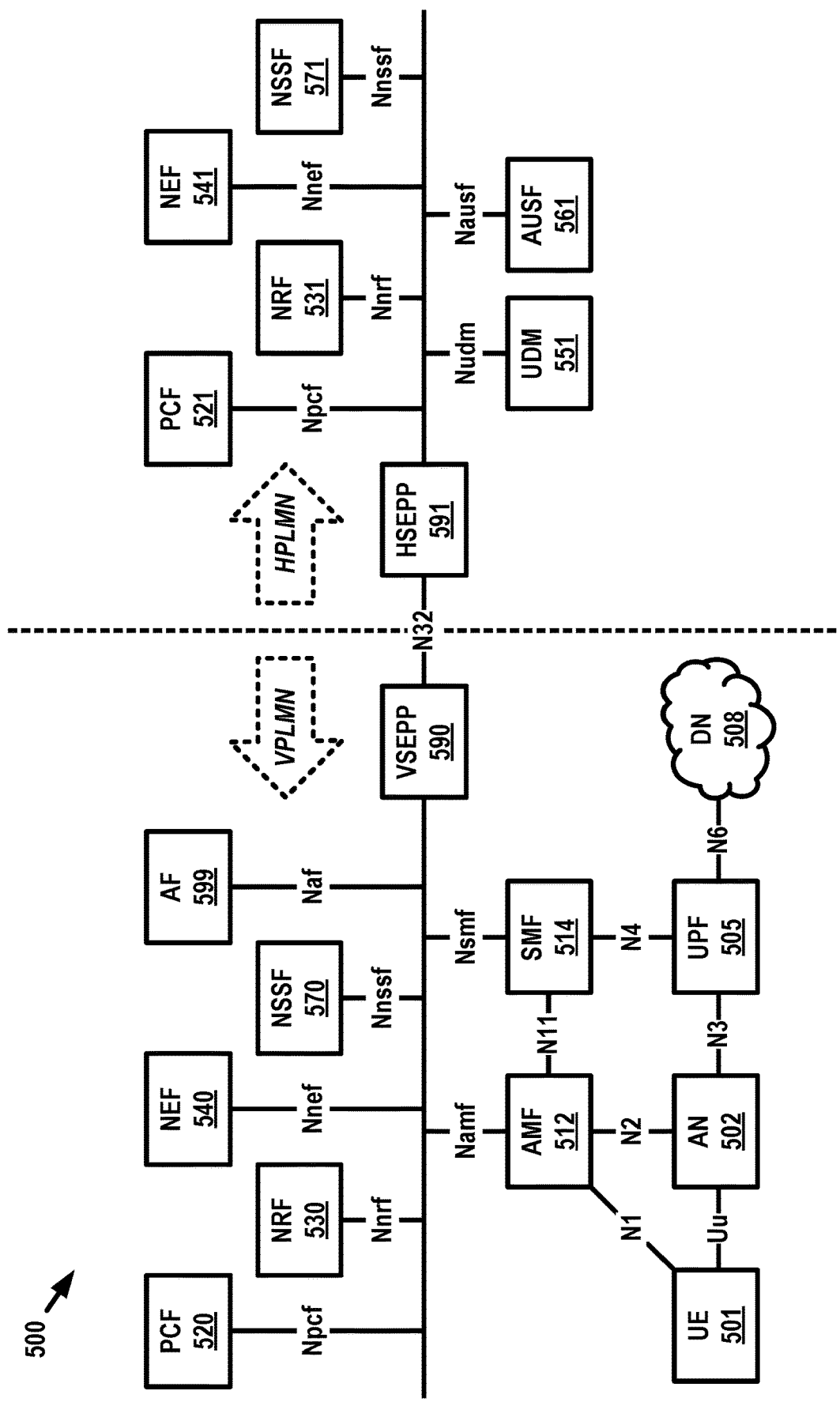
FIG. 5 illustrates an example of a core network architecture for a roaming scenario.

FIGS. 4A, 4B, and 5 illustrate other examples of core network architectures that are analogous in some respects to the core network architecture 300 depicted in FIG. 3. For conciseness, some of the core network elements depicted in FIG. 3 are omitted. Many of the elements depicted in FIGS. 4A, 4B, and 5 are analogous in some respects to elements depicted in FIG. 3. For conciseness, some of the details relating to their functions or operation are omitted.

FIG. 4A illustrates an example of a core network architecture 400A comprising an arrangement of multiple UPFs. Core network architecture 400A includes a UE 401, an AN 402, an AMF 412, and an SMF 414. Unlike previous examples of core network architectures described above, FIG. 4A depicts multiple UPFs, including a UPF 405, a UPF 406, and a UPF 407, and multiple DNs, including a DN 408 and a DN 409. Each of the multiple UPFs 405, 406, 407 may communicate with the SMF 414 via an N4 interface. The DNs 408, 409 communicate with the UPFs 405, 406, respectively, via N6 interfaces. As shown in FIG. 4A, the multiple UPFs 405, 406, 407 may communicate with one another via N9 interfaces.

The UPFs 405, 406, 407 may perform traffic detection, in which the UPFs identify and/or classify packets. Packet identification may be performed based on packet detection rules (PDR) provided by the SMF 414. A PDR may include packet detection information comprising one or more of: a source interface, a UE IP address, core network (CN) tunnel information (e.g., a CN address of an N3/N9 tunnel corresponding to a PDU session), a network instance identifier, a quality of service flow identifier (QFI), a filter set (for example, an IP packet filter set or an ethernet packet filter set), and/or an application identifier.

In addition to indicating how a particular packet is to be detected, a PDR may further indicate rules for handling the packet upon detection thereof. The rules may include, for example, forwarding action rules (FARs), multi-access rules (MARs), usage reporting rules (URRs), QoS enforcement rules (QERs), etc. For example, the PDR may comprise one or more FAR identifiers, MAR identifiers, URR identifiers, and/or QER identifiers. These identifiers may indicate the rules that are prescribed for the handling of a particular detected packet.

The UPF 405 may perform traffic forwarding in accordance with a FAR. For example, the FAR may indicate that a packet associated with a particular PDR is to be forwarded, duplicated, dropped, and/or buffered. The FAR may indicate a destination interface, for example, "access" for downlink or "core" for uplink. If a packet is to be buffered, the FAR may indicate a buffering action rule (BAR). As an example, UPF 405 may perform data buffering of a certain number downlink packets if a PDU session is deactivated.

The UPF 405 may perform QoS enforcement in accordance with a QER. For example, the QER may indicate a guaranteed bitrate that is authorized and/or a maximum bitrate to be enforced for a packet associated with a particular PDR. The QER may indicate that a particular guaranteed and/or maximum bitrate may be for uplink packets and/or downlink packets. The UPF 405 may mark packets belonging to a particular QoS flow with a corresponding QFI. The marking may enable a recipient of the packet to determine a QoS of the packet.

The UPF 405 may provide usage reports to the SMF 414 in accordance with a URR. The URR may indicate one or more triggering conditions for generation and reporting of the usage report, for example, immediate reporting, periodic reporting, a threshold for incoming uplink traffic, or any other suitable triggering condition. The URR may indicate a method for measuring usage of network resources, for example, data volume, duration, and/or event.

As noted above, the DNs 408, 409 may comprise public DNs (e.g., the Internet), private DNs (e.g., private, internal corporate-owned DNs), and/or intra-operator DNs. Each DN may provide an operator service and/or a third-party service. The service provided by a DN may be the Internet, an IP multimedia subsystem (IMS), an augmented or virtual reality network, an edge computing or mobile edge computing (MEC) network, etc. Each DN may be identified using a data network name (DNN). The UE 401 may be configured to establish a first logical connection with DN 408 (a first PDU session), a second logical connection with DN 409 (a second PDU session), or both simultaneously (first and second PDU sessions).

Each PDU session may be associated with at least one UPF configured to operate as a PDU session anchor (PSA, or "anchor"). The anchor may be a UPF that provides an N6 interface with a DN.

In the example of FIG. 4A, UPF 405 may be the anchor for the first PDU session between UE 401 and DN 408, whereas the UPF 406 may be the anchor for the second PDU session between UE 401 and DN 409. The core network may use the anchor to provide service continuity of a particular PDU session (for example, IP address continuity) as UE 401 moves from one access network to another. For example, suppose that UE 401 establishes a PDU session using a data path to the DN 408 using an access network other than AN 402. The data path may include UPF 405 acting as anchor. Suppose further that the UE 401 later moves into the coverage area of the AN 402. In such a scenario, SMF 414 may select a new UPF (UPF 407) to bridge the gap between the newly-entered access network (AN 402) and the anchor UPF (UPF 405). The continuity of the PDU session may be preserved as any number of UPFs are added or removed from the data path. When a UPF is added to a data path, as shown in FIG. 4A, it may be described as an intermediate UPF and/or a cascaded UPF.

As noted above, UPF 406 may be the anchor for the second PDU session between UE 401 and DN 409. Although the anchor for the first and second PDU sessions are associated with different UPFs in FIG. 4A, it will be understood that this is merely an example. It will also be understood that multiple PDU sessions with a single DN may correspond to any number of anchors. When there are multiple UPFs, a UPF at the branching point (UPF 407 in FIG. 4) may operate as an uplink classifier (UL-CL). The UL-CL may divert uplink user plane traffic to different UPFs.

The SMF 414 may allocate, manage, and/or assign an IP address to UE 401, for example, upon establishment of a PDU session. The SMF 414 may maintain an internal pool of IP addresses to be assigned. The SMF 414 may, if necessary, assign an IP address provided by a dynamic host configuration protocol (DHCP) server or an authentication, authorization, and accounting (AAA) server. IP address management may be performed in accordance with a session and service continuity (SSC) mode. In SSC mode 1, an IP address of UE 401 may be maintained (and the same anchor UPF may be used) as the wireless device moves within the network. In SSC mode 2, the IP address of UE 401 changes as UE 401 moves within the network (e.g., the old IP address and UPF may be abandoned and a new IP address and anchor UPF may be established). In SSC mode 3, it may be possible to maintain an old IP address (similar to SSC mode 1) temporarily while establishing a new IP address (similar to SSC mode 2), thus combining features of SSC modes 1 and 2. Applications that are sensitive to IP address changes may operate in accordance with SSC mode 1.

UPF selection may be controlled by SMF 414. For example, upon establishment and/or modification of a PDU session between UE 401 and DN 408, SMF 414 may select UPF 405 as the anchor for the PDU session and/or UPF 407 as an intermediate UPF. Criteria for UPF selection include path efficiency and/or speed between AN 402 and DN 408. The reliability, load status, location, slice support and/or other capabilities of candidate UPFs may also be considered.

FIG. 4B illustrates an example of a core network architecture 400B that accommodates untrusted access. Similar to FIG. 4A, UE 401 as depicted in FIG. 4B connects to DN 408 via AN 402 and UPF 405. The AN 402 and UPF 405 constitute trusted (e.g., 3GPP) access to the DN 408. By contrast, UE 401 may also access DN 408 using an untrusted access network, AN 403, and a non-3GPP interworking function (N3IWF) 404.

The AN 403 may be, for example, a wireless land area network (WLAN) operating in accordance with the IEEE 802.11 standard. The UE 401 may connect to AN 403, via an interface Y1, in whatever manner is prescribed for AN 403. The connection to AN 403 may or may not involve authentication. The UE 401 may obtain an IP address from AN 403. The UE 401 may determine to connect to core network 400B and select untrusted access for that purpose. The AN 403 may communicate with N3IWF 404 via a Y2 interface. After selecting untrusted access, the UE 401 may provide N3IWF 404 with sufficient information to select an AMF. The selected AMF may be, for example, the same AMF that is used by UE 401 for 3GPP access (AMF 412 in the present example). The N3IWF 404 may communicate with AMF 412 via an N2 interface. The UPF 405 may be selected and N3IWF 404 may communicate with UPF 405 via an N3 interface. The UPF 405 may be a PDU session anchor (PSA) and may remain the anchor for the PDU session even as UE 401 shifts between trusted access and untrusted access.

FIG. 5 illustrates an example of a core network architecture 500 in which a UE 501 is in a roaming scenario. In a roaming scenario, UE 501 is a subscriber of a first PLMN (a home PLMN, or HPLMN) but attaches to a second PLMN (a visited PLMN, or VPLMN). Core network architecture 500 includes UE 501, an AN 502, a UPF 505, and a DN 508. The AN 502 and UPF 505 may be associated with a VPLMN. The VPLMN may manage the AN 502 and UPF 505 using core network elements associated with the VPLMN, including an AMF 512, an SMF 514, a PCF 520, an NRF 530, an NEF 540, and an NSSF 570. An AF 599 may be adjacent the core network of the VPLMN.

The UE 501 may not be a subscriber of the VPLMN. The AMF 512 may authorize UE 501 to access the network based on, for example, roaming restrictions that apply to UE 501. In order to obtain network services provided by the VPLMN, it may be necessary for the core network of the VPLMN to interact with core network elements of a HPLMN of UE 501, in particular, a PCF 521, an NRF 531, an NEF 541, a UDM 551, and/or an AUSF 561. The VPLMN and HPLMN may communicate using an N32 interface connecting respective security edge protection proxies (SEPPs). In FIG. 5, the respective SEPPs are depicted as a VSEPP 590 and an HSEPP 591.

The VSEPP 590 and the HSEPP 591 communicate via an N32 interface for defined purposes while concealing information about each PLMN from the other. The SEPPs may apply roaming policies based on communications via the N32 interface. The PCF 520 and PCF 521 may communicate via the SEPPs to exchange policy-related signaling. The NRF 530 and NRF 531 may communicate via the SEPPs to enable service discovery of NFs in the respective PLMNs. The VPLMN and HPLMN may independently maintain NEF 540 and NEF 541. The NSSF 570 and NSSF 571 may communicate via the SEPPs to coordinate slice selection for UE 501. The HPLMN may handle all authentication and subscription related signaling. For example, when the UE 501 registers or requests service via the VPLMN, the VPLMN may authenticate UE 501 and/or obtain subscription data of UE 501 by accessing, via the SEPPs, the UDM 551 and AUSF 561 of the HPLMN.

The core network architecture 500 depicted in FIG. 5 may be referred to as a local breakout configuration, in which UE 501 accesses DN 508 using one or more UPFs of the VPLMN (i.e., UPF 505). However, other configurations are possible. For example, in a home-routed configuration (not shown in FIG. 5), UE 501 may access a DN using one or more UPFs of the HPLMN. In the home-routed configuration, an N9 interface may run parallel to the N32 interface, crossing the frontier between the VPLMN and the HPLMN to carry user plane data. One or more SMFs of the respective PLMNs may communicate via the N32 interface to coordinate session management for UE 501. The SMFs may control their respective UPFs on either side of the frontier.

Figure 6:
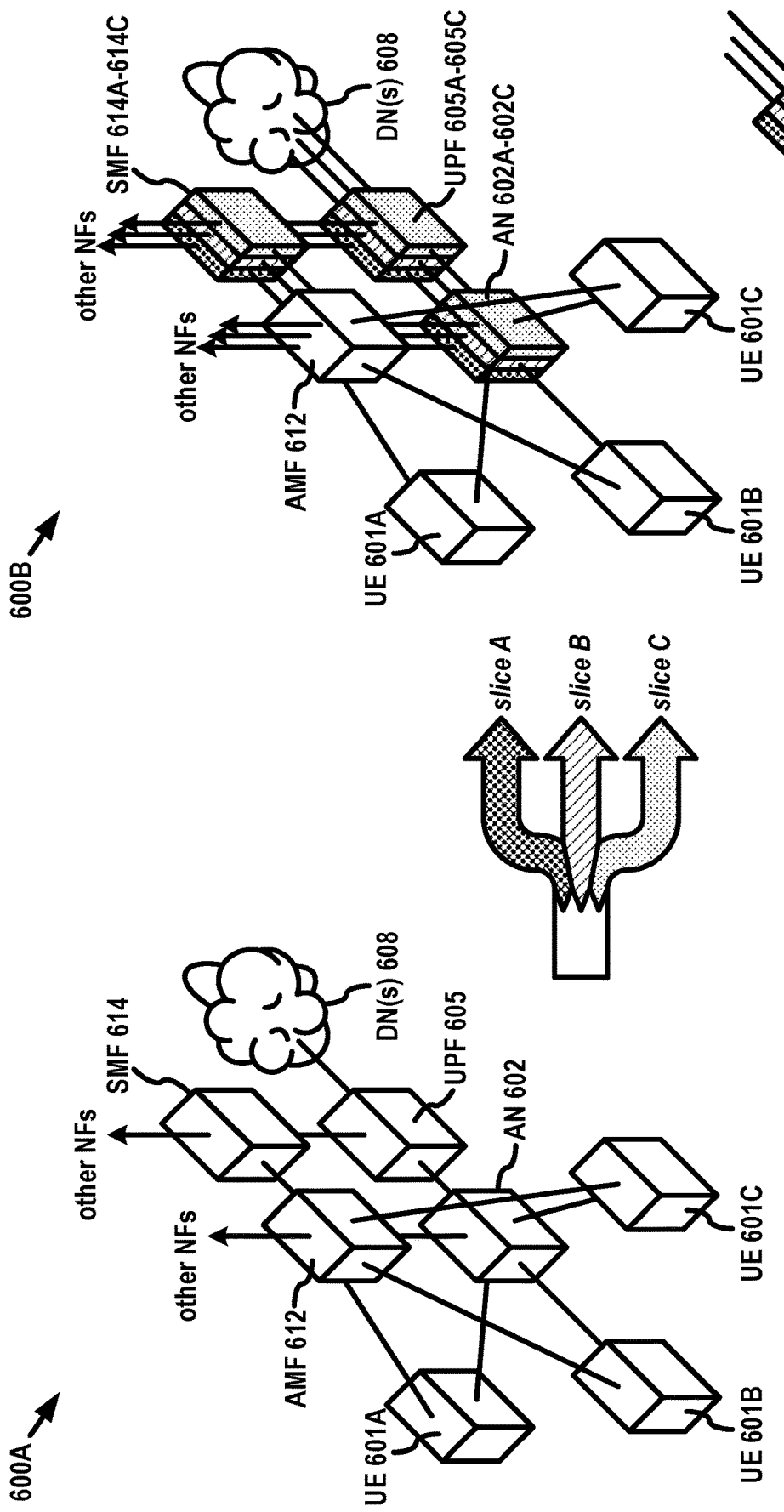
FIG. 6 illustrates an example of network slicing.

FIG. 6 illustrates an example of network slicing. Network slicing may refer to division of shared infrastructure (e.g., physical infrastructure) into distinct logical networks. These distinct logical networks may be independently controlled, isolated from one another, and/or associated with dedicated resources.

Network architecture 600A illustrates an un-sliced physical network corresponding to a single logical network. The network architecture 600A comprises a user plane wherein UEs 601A, 601B, 601C (collectively, UEs 601) have a physical and logical connection to a DN 608 via an AN 602 and a UPF 605. The network architecture 600A comprises a control plane wherein an AMF 612 and a SMF 614 control various aspects of the user plane.

The network architecture 600A may have a specific set of characteristics (e.g., relating to maximum bit rate, reliability, latency, bandwidth usage, power consumption, etc.). This set of characteristics may be affected by the nature of the network elements themselves (e.g., processing power, availability of free memory, proximity to other network elements, etc.) or the management thereof (e.g., optimized to maximize bit rate or reliability, reduce latency or power bandwidth usage, etc.). The characteristics of network architecture 600A may change over time, for example, by upgrading equipment or by modifying procedures to target a particular characteristic. However, at any given time, network architecture 600A will have a single set of characteristics that may or may not be optimized for a particular use case. For example, UEs 601A, 601B, 601C may have different requirements, but network architecture 600A can only be optimized for one of the three.

Network architecture 600B is an example of a sliced physical network divided into multiple logical networks. In FIG. 6, the physical network is divided into three logical networks, referred to as slice A, slice B, and slice C. For example, UE 601A may be served by AN 602A, UPF 605A, AMF 612, and SMF 614A. UE 601B may be served by AN 602B, UPF 605B, AMF 612, and SMF 614B. UE 601C may be served by AN 602C, UPF 605C, AMF 612, and SMF 614C. Although the respective UEs 601 communicate with different network elements from a logical perspective, these network elements may be deployed by a network operator using the same physical network elements.

Each network slice may be tailored to network services having different sets of characteristics. For example, slice A may correspond to enhanced mobile broadband (eMBB) service. Mobile broadband may refer to internet access by mobile users, commonly associated with smartphones. Slice B may correspond to ultra-reliable low-latency communication (URLLC), which focuses on reliability and speed. Relative to eMBB, URLLC may improve the feasibility of use cases such as autonomous driving and telesurgery. Slice C may correspond to massive machine type communication (mMTC), which focuses on low-power services delivered to a large number of users. For example, slice C may be optimized for a dense network of battery-powered sensors that provide small amounts of data at regular intervals. Many mMTC use cases would be prohibitively expensive if they operated using an eMBB or URLLC network.

If the service requirements for one of the UEs 601 changes, then the network slice serving that UE can be updated to provide better service. Moreover, the set of network characteristics corresponding to eMBB, URLLC, and mMTC may be varied, such that differentiated species of eMBB, URLLC, and mMTC are provided. Alternatively, network operators may provide entirely new services in response to, for example, customer demand.

In FIG. 6, each of the UEs 601 has its own network slice. However, it will be understood that a single slice may serve any number of UEs and a single UE may operate using any number of slices. Moreover, in the example network architecture 600B, the AN 602, UPF 605 and SMF 614 are separated into three separate slices, whereas the AMF 612 is unsliced. However, it will be understood that a network operator may deploy any architecture that selectively utilizes any mix of sliced and unsliced network elements, with different network elements divided into different numbers of slices. Although FIG. 6 only depicts three core network functions, it will be understood that other core network functions may be sliced as well. A PLMN that supports multiple network slices may maintain a separate network repository function (NFR) for each slice, enabling other NFs to discover network services associated with that slice.

Network slice selection may be controlled by an AMF, or alternatively, by a separate network slice selection function (NSSF). For example, a network operator may define and implement distinct network slice instances (NSIs). Each NSI may be associated with single network slice selection assistance information (S-NSSAI). The S-NSSAI may include a particular slice/service type (SST) indicator (indicating eMBB, URLLC, mMTC, etc.). as an example, a particular tracking area may be associated with one or more configured S-NSSAIs. UEs may identify one or more requested and/or subscribed S-NSSAIs (e.g., during registration). The network may indicate to the UE one or more allowed and/or rejected S-NSSAIs.

The S-NSSAI may further include a slice differentiator (SD) to distinguish between different tenants of a particular slice and/or service type. For example, a tenant may be a customer (e.g., vehicle manufacture, service provider, etc.) of a network operator that obtains (for example, purchases) guaranteed network resources and/or specific policies for handling its subscribers. The network operator may configure different slices and/or slice types, and use the SD to determine which tenant is associated with a particular slice.

Figure 7C:
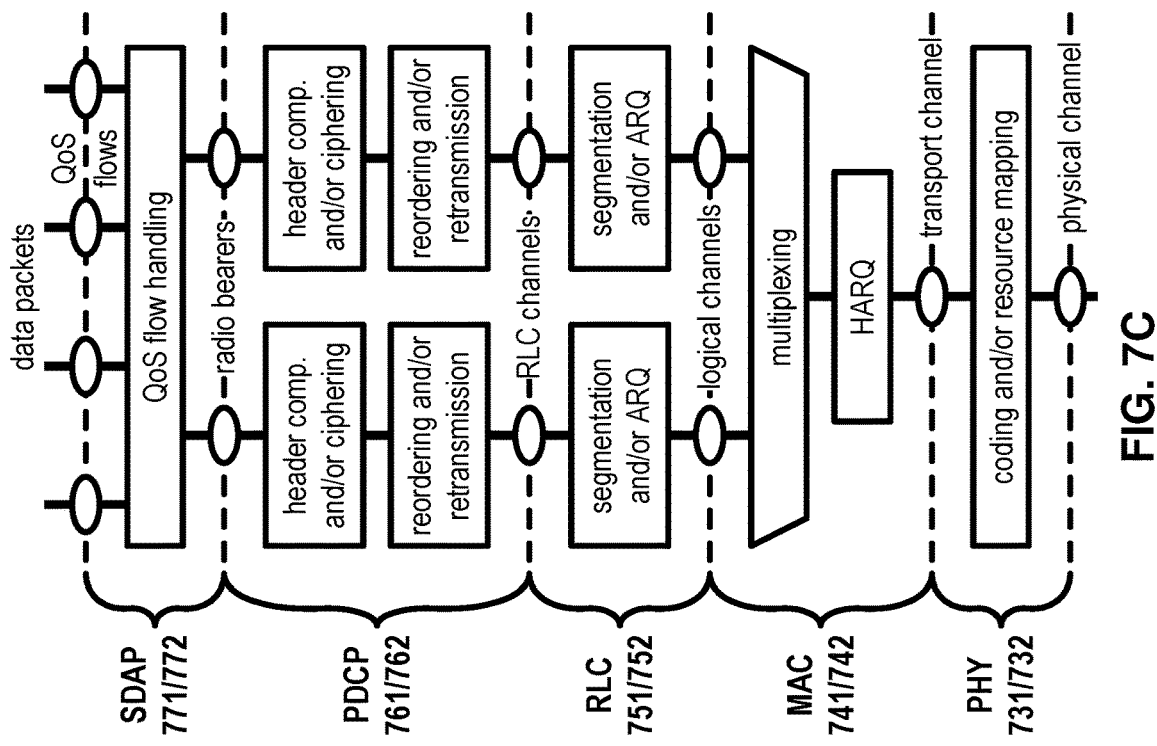
FIG. 7A, FIG. 7B, and FIG. 7C illustrate a user plane protocol stack, a control plane protocol stack, and services provided between protocol layers of the user plane protocol stack.
Figure 7A:
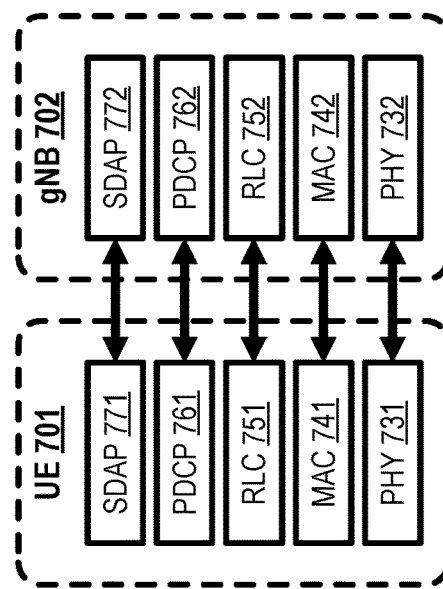
Figure 7B:
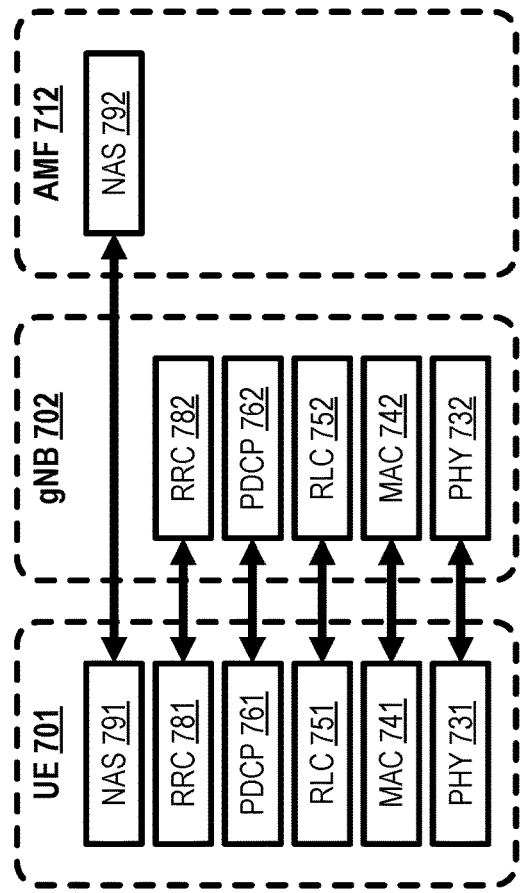

FIG. 7A, FIG. 7B, and FIG. 7C illustrate a user plane (UP) protocol stack, a control plane (CP) protocol stack, and services provided between protocol layers of the UP protocol stack.

The layers may be associated with an open system interconnection (OSI) model of computer networking functionality. In the OSI model, layer 1 may correspond to the bottom layer, with higher layers on top of the bottom layer. Layer 1 may correspond to a physical layer, which is concerned with the physical infrastructure used for transfer of signals (for example, cables, fiber optics, and/or radio frequency transceivers). In New Radio (NR), layer 1 may comprise a physical layer (PHY). Layer 2 may correspond to a data link layer. Layer 2 may be concerned with packaging of data (into, e.g., data frames) for transfer, between nodes of the network, using the physical infrastructure of layer 1. In NR, layer 2 may comprise a media access control layer (MAC), a radio link control layer (RLC), a packet data convergence layer (PDCP), and a service data application protocol layer (SDAP).

Layer 3 may correspond to a network layer. Layer 3 may be concerned with routing of the data which has been packaged in layer 2. Layer 3 may handle prioritization of data and traffic avoidance. In NR, layer 3 may comprise a radio resource control layer (RRC) and a non-access stratum layer (NAS). Layers 4 through 7 may correspond to a transport layer, a session layer, a presentation layer, and an application layer. The application layer interacts with an end user to provide data associated with an application. In an example, an end user implementing the application may generate data associated with the application and initiate sending of that information to a targeted data network (e.g., the Internet, an application server, etc.). Starting at the application layer, each layer in the OSI model may manipulate and/or repackage the information and deliver it to a lower layer. At the lowest layer, the manipulated and/or repackaged information may be exchanged via physical infrastructure (for example, electrically, optically, and/or electromagnetically). As it approaches the targeted data network, the information will be unpackaged and provided to higher and higher layers, until it once again reaches the application layer in a form that is usable by the targeted data network (e.g., the same form in which it was provided by the end user). To respond to the end user, the data network may perform this procedure in reverse.

FIG. 7A illustrates a user plane protocol stack. The user plane protocol stack may be a new radio (NR) protocol stack for a Uu interface between a UE 701 and a gNB 702. In layer 1 of the UP protocol stack, the UE 701 may implement PHY 731 and the gNB 702 may implement PHY 732. In layer 2 of the UP protocol stack, the UE 701 may implement MAC 741, RLC 751, PDCP 761, and SDAP 771. The gNB 702 may implement MAC 742, RLC 752, PDCP 762, and SDAP 772.

FIG. 7B illustrates a control plane protocol stack. The control plane protocol stack may be an NR protocol stack for the Uu interface between the UE 701 and the gNB 702 and/or an N1 interface between the UE 701 and an AMF 712. In layer 1 of the CP protocol stack, the UE 701 may implement PHY 731 and the gNB 702 may implement PHY 732. In layer 2 of the CP protocol stack, the UE 701 may implement MAC 741, RLC 751, PDCP 761, RRC 781, and NAS 791. The gNB 702 may implement MAC 742, RLC 752, PDCP 762, and RRC 782. The AMF 712 may implement NAS 792.

The NAS may be concerned with the non-access stratum, in particular, communication between the UE 701 and the core network (e.g., the AMF 712). Lower layers may be concerned with the access stratum, for example, communication between the UE 701 and the gNB 702. Messages sent between the UE 701 and the core network may be referred to as NAS messages. In an example, a NAS message may be relayed by the gNB 702, but the content of the NAS message (e.g., information elements of the NAS message) may not be visible to the gNB 702.

FIG. 7C illustrates an example of services provided between protocol layers of the NR user plane protocol stack illustrated in FIG. 7A. The UE 701 may receive services through a PDU session, which may be a logical connection between the UE 701 and a data network (DN). The UE 701 and the DN may exchange data packets associated with the PDU session. The PDU session may comprise one or more quality of service (QoS) flows. SDAP 771 and SDAP 772 may perform mapping and/or demapping between the one or more QoS flows of the PDU session and one or more radio bearers (e.g., data radio bearers). The mapping between the QoS flows and the data radio bearers may be determined in the SDAP 772 by the gNB 702, and the UE 701 may be notified of the mapping (e.g., based on control signaling and/or reflective mapping). For reflective mapping, the SDAP 772 of the gNB 220 may mark downlink packets with a QoS flow indicator (QFI) and deliver the downlink packets to the UE 701. The UE 701 may determine the mapping based on the QFI of the downlink packets.

PDCP 761 and PDCP 762 may perform header compression and/or decompression. Header compression may reduce the amount of data transmitted over the physical layer. The PDCP 761 and PDCP 762 may perform ciphering and/or deciphering. Ciphering may reduce unauthorized decoding of data transmitted over the physical layer (e.g., intercepted on an air interface), and protect data integrity (e.g., to ensure control messages originate from intended sources). The PDCP 761 and PDCP 762 may perform retransmissions of undelivered packets, in-sequence delivery and reordering of packets, duplication of packets, and/or identification and removal of duplicate packets. In a dual connectivity scenario, PDCP 761 and PDCP 762 may perform mapping between a split radio bearer and RLC channels.

RLC 751 and RLC 752 may perform segmentation, retransmission through Automatic Repeat Request (ARQ). The RLC 751 and RLC 752 may perform removal of duplicate data units received from MAC 741 and MAC 742, respectively. The RLCs 213 and 223 may provide RLC channels as a service to PDCPs 214 and 224, respectively.

MAC 741 and MAC 742 may perform multiplexing and/or demultiplexing of logical channels. MAC 741 and MAC 742 may map logical channels to transport channels. In an example, UE 701 may, in MAC 741, multiplex data units of one or more logical channels into a transport block. The UE 701 may transmit the transport block to the gNB 702 using PHY 731. The gNB 702 may receive the transport block using PHY 732 and demultiplex data units of the transport blocks back into logical channels. MAC 741 and MAC 742 may perform error correction through Hybrid Automatic Repeat Request (HARQ), logical channel prioritization, and/or padding.

PHY 731 and PHY 732 may perform mapping of transport channels to physical channels. PHY 731 and PHY 732 may perform digital and analog signal processing functions (e.g., coding/decoding and modulation/demodulation) for sending and receiving information (e.g., transmission via an air interface). PHY 731 and PHY 732 may perform multi-antenna mapping.

Figure 8:
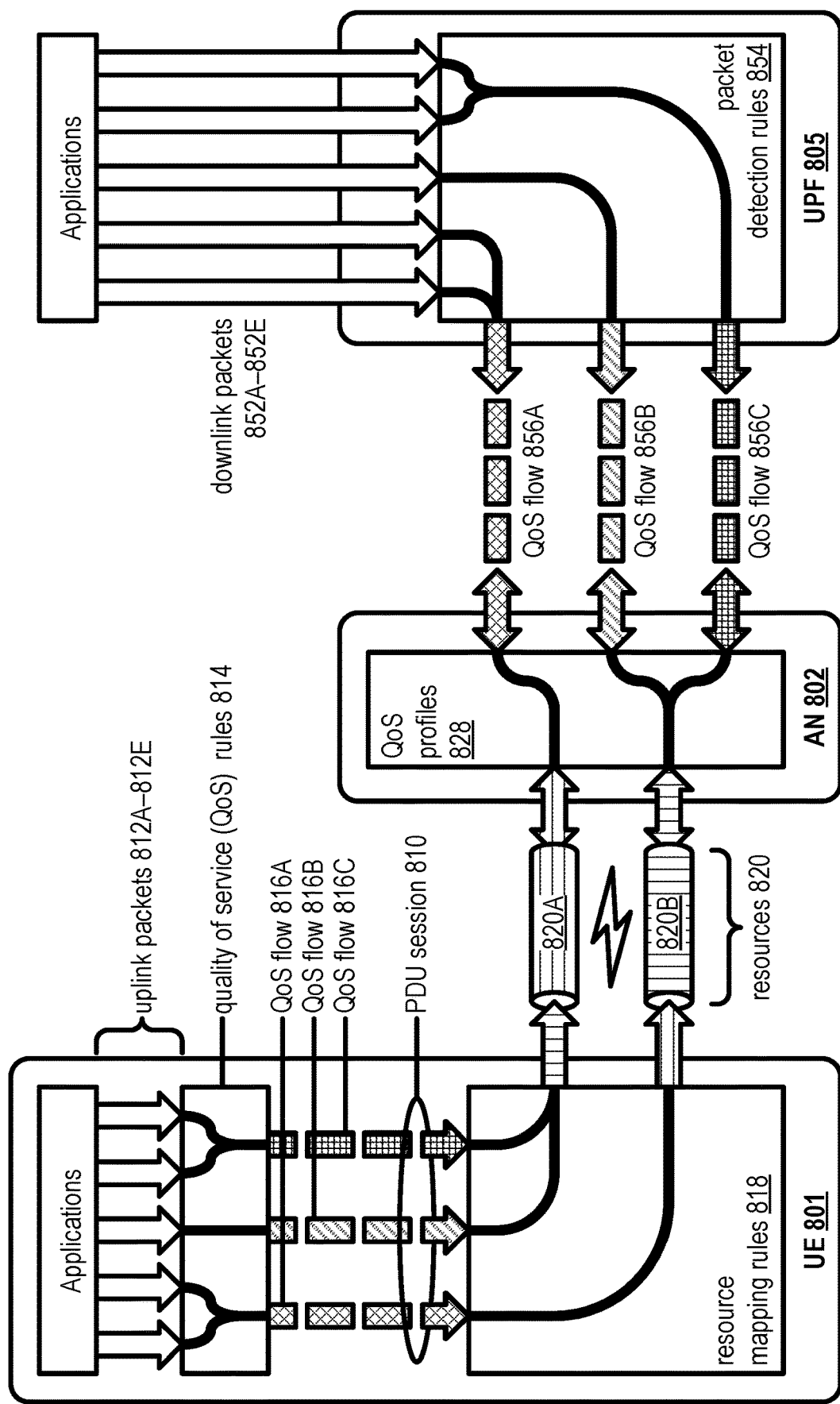
FIG. 8 illustrates an example of a quality of service model for data exchange.

FIG. 8 illustrates an example of a quality of service (QoS) model for differentiated data exchange. In the QoS model of FIG. 8, there are a UE 801, a AN 802, and a UPF 805. The QoS model facilitates prioritization of certain packet or protocol data units (PDUs), also referred to as packets. For example, higher-priority packets may be exchanged faster and/or more reliably than lower-priority packets. The network may devote more resources to exchange of high-QoS packets.

In the example of FIG. 8, a PDU session 810 is established between UE 801 and UPF 805. The PDU session 810 may be a logical connection enabling the UE 801 to exchange data with a particular data network (for example, the Internet). The UE 801 may request establishment of the PDU session 810. At the time that the PDU session 810 is established, the UE 801 may, for example, identify the targeted data network based on its data network name (DNN). The PDU session 810 may be managed, for example, by a session management function (SMF, not shown). In order to facilitate exchange of data associated with the PDU session 810, between the UE 801 and the data network, the SMF may select the UPF 805 (and optionally, one or more other UPFs, not shown).

One or more applications associated with UE 801 may generate uplink packets 812A-812E associated with the PDU session 810. In order to work within the QoS model, UE 801 may apply QoS rules 814 to uplink packets 812A-812E. The QoS rules 814 may be associated with PDU session 810 and may be determined and/or provided to the UE 801 when PDU session 810 is established and/or modified. Based on QoS rules 814, UE 801 may classify uplink packets 812A-812E, map each of the uplink packets 812A-812E to a QoS flow, and/or mark uplink packets 812A-812E with a QoS flow indicator (QFI). As a packet travels through the network, and potentially mixes with other packets from other UEs having potentially different priorities, the QFI indicates how the packet should be handled in accordance with the QoS model. In the present illustration, uplink packets 812A, 812B are mapped to QoS flow 816A, uplink packet 812C is mapped to QoS flow 816B, and the remaining packets are mapped to QoS flow 816C.

The QoS flows may be the finest granularity of QoS differentiation in a PDU session. In the figure, three QoS flows 816A-816C are illustrated. However, it will be understood that there may be any number of QoS flows. Some QoS flows may be associated with a guaranteed bit rate (GBR QoS flows) and others may have bit rates that are not guaranteed (non-GBR QoS flows). QoS flows may also be subject to per-UE and per-session aggregate bit rates. One of the QoS flows may be a default QoS flow. The QoS flows may have different priorities. For example, QoS flow 816A may have a higher priority than QoS flow 816B, which may have a higher priority than QoS flow 816C. Different priorities may be reflected by different QoS flow characteristics. For example, QoS flows may be associated with flow bit rates. A particular QoS flow may be associated with a guaranteed flow bit rate (GFBR) and/or a maximum flow bit rate (MFBR). QoS flows may be associated with specific packet delay budgets (PDBs), packet error rates (PERs), and/or maximum packet loss rates. QoS flows may also be subject to per-UE and per-session aggregate bit rates.

In order to work within the QoS model, UE 801 may apply resource mapping rules 818 to the QoS flows 816A-816C. The air interface between UE 801 and AN 802 may be associated with resources 820. In the present illustration, QoS flow 816A is mapped to resource 820A, whereas QoS flows 816B, 816C are mapped to resource 820B. The resource mapping rules 818 may be provided by the AN 802. In order to meet QoS requirements, the resource mapping rules 818 may designate more resources for relatively high-priority QoS flows. With more resources, a high-priority QoS flow such as QoS flow 816A may be more likely to obtain the high flow bit rate, low packet delay budget, or other characteristic associated with QoS rules 814. The resources 820 may comprise, for example, radio bearers. The radio bearers (e.g., data radio bearers) may be established between the UE 801 and the AN 802. The radio bearers in 5G, between the UE 801 and the AN 802, may be distinct from bearers in LTE, for example, Evolved Packet System (EPS) bearers between a UE and a packet data network gateway (PGW), S1 bearers between an eNB and a serving gateway (SGW), and/or an S5/S8 bearer between an SGW and a PGW.

Once a packet associated with a particular QoS flow is received at AN 802 via resource 820A or resource 820B, AN 802 may separate packets into respective QoS flows 856A-856C based on QoS profiles 828. The QoS profiles 828 may be received from an SMF. Each QoS profile may correspond to a QFI, for example, the QFI marked on the uplink packets 812A-812E. Each QoS profile may include QoS parameters such as 5G QoS identifier (5QI) and an allocation and retention priority (ARP). The QoS profile for non-GBR QoS flows may further include additional QoS parameters such as a reflective QoS attribute (RQA). The QoS profile for GBR QoS flows may further include additional QoS parameters such as a guaranteed flow bit rate (GFBR), a maximum flow bit rate (MFBR), and/or a maximum packet loss rate. The 5QI may be a standardized 5QI which have one-to-one mapping to a standardized combination of 5G QoS characteristics per well-known services. The 5QI may be a dynamically assigned 5QI which the standardized 5QI values are not defined. The 5QI may represent 5G QoS characteristics. The 5QI may comprise a resource type, a default priority level, a packet delay budget (PDB), a packet error rate (PER), a maximum data burst volume, and/or an averaging window. The resource type may indicate a non-GBR QoS flow, a GBR QoS flow or a delay-critical GBR QoS flow. The averaging window may represent a duration over which the GFBR and/or MFBR is calculated. ARP may be a priority level comprising pre-emption capability and a pre-emption vulnerability. Based on the ARP, the AN 802 may apply admission control for the QoS flows in a case of resource limitations.

The AN 802 may select one or more N3 tunnels 850 for transmission of the QoS flows 856A-856C. After the packets are divided into QoS flows 856A-856C, the packet may be sent to UPF 805 (e.g., towards a DN) via the selected one or more N3 tunnels 850. The UPF 805 may verify that the QFIs of the uplink packets 812A-812E are aligned with the QoS rules 814 provided to the UE 801. The UPF 805 may measure and/or count packets and/or provide packet metrics to, for example, a PCF.

The figure also illustrates a process for downlink. In particular, one or more applications may generate downlink packets 852A-852E. The UPF 805 may receive downlink packets 852A-852E from one or more DNs and/or one or more other UPFs. As per the QoS model, UPF 805 may apply packet detection rules (PDRs) 854 to downlink packets 852A-852E. Based on PDRs 854, UPF 805 may map packets 852A-852E into QoS flows. In the present illustration, downlink packets 852A, 852B are mapped to QoS flow 856A, downlink packet 852C is mapped to QoS flow 856B, and the remaining packets are mapped to QoS flow 856C.

The QoS flows 856A-856C may be sent to AN 802. The AN 802 may apply resource mapping rules to the QoS flows 856A-856C. In the present illustration, QoS flow 856A is mapped to resource 820A, whereas QoS flows 856B, 856C are mapped to resource 820B. In order to meet QoS requirements, the resource mapping rules may designate more resources to high-priority QoS flows.

FIGS. 9A-9D illustrate example states and state transitions of a wireless device (e.g., a UE). At any given time, the wireless device may have a radio resource control (RRC) state, a registration management (RM) state, and a connection management (CM) state.

Figure 9A:
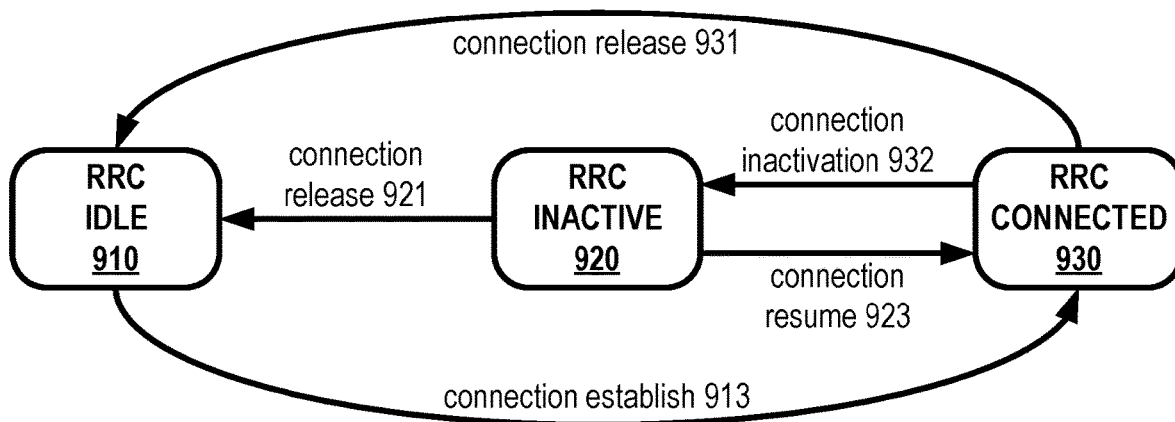
FIG. 9A, FIG. 9B, FIG. 9C, and FIG. 9D illustrate example states and state transitions of a wireless device.

FIG. 9A is an example diagram showing RRC state transitions of a wireless device (e.g., a UE). The UE may be in one of three RRC states: RRC idle 910, (e.g., RRC_IDLE), RRC inactive 920 (e.g., RRC_INACTIVE), or RRC connected 930 (e.g., RRC_CONNECTED). The UE may implement different RAN-related control-plane procedures depending on its RRC state. Other elements of the network, for example, a base station, may track the RRC state of one or more UEs and implement RAN-related control-plane procedures appropriate to the RRC state of each.

In RRC connected 930, it may be possible for the UE to exchange data with the network (for example, the base station). The parameters necessary for exchange of data may be established and known to both the UE and the network. The parameters may be referred to and/or included in an RRC context of the UE (sometimes referred to as a UE context). These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. The base station with which the UE is connected may store the RRC context of the UE.

While in RRC connected 930, mobility of the UE may be managed by the access network, whereas the UE itself may manage mobility while in RRC idle 910 and/or RRC inactive 920. While in RRC connected 930, the UE may manage mobility by measuring signal levels (e.g., reference signal levels) from a serving cell and neighboring cells and reporting these measurements to the base station currently serving the UE. The network may initiate handover based on the reported measurements. The RRC state may transition from RRC connected 930 to RRC idle 910 through a connection release procedure 930 or to RRC inactive 920 through a connection inactivation procedure 932.

In RRC idle 910, an RRC context may not be established for the UE. In RRC idle 910, the UE may not have an RRC connection with a base station. While in RRC idle 910, the UE may be in a sleep state for a majority of the time (e.g., to conserve battery power). The UE may wake up periodically (e.g., once in every discontinuous reception cycle) to monitor for paging messages from the access network. Mobility of the UE may be managed by the UE through a procedure known as cell reselection. The RRC state may transition from RRC idle 910 to RRC connected 930 through a connection establishment procedure 913, which may involve a random access procedure, as discussed in greater detail below.

In RRC inactive 920, the RRC context previously established is maintained in the UE and the base station. This may allow for a fast transition to RRC connected 930 with reduced signaling overhead as compared to the transition from RRC idle 910 to RRC connected 930. The RRC state may transition to RRC connected 930 through a connection resume procedure 923. The RRC state may transition to RRC idle 910 though a connection release procedure 921 that may be the same as or similar to connection release procedure 931.

An RRC state may be associated with a mobility management mechanism. In RRC idle 910 and RRC inactive 920, mobility may be managed by the UE through cell reselection. The purpose of mobility management in RRC idle 910 and/or RRC inactive 920 is to allow the network to be able to notify the UE of an event via a paging message without having to broadcast the paging message over the entire mobile communications network. The mobility management mechanism used in RRC idle 910 and/or RRC inactive 920 may allow the network to track the UE on a cell-group level so that the paging message may be broadcast over the cells of the cell group that the UE currently resides within instead of the entire communication network. Tracking may be based on different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 920 state, the UE may be assigned a RAN notification area. A RAN notification area may comprise one or more cell identities, a list of RAIs, and/or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 920.

Figure 9B:
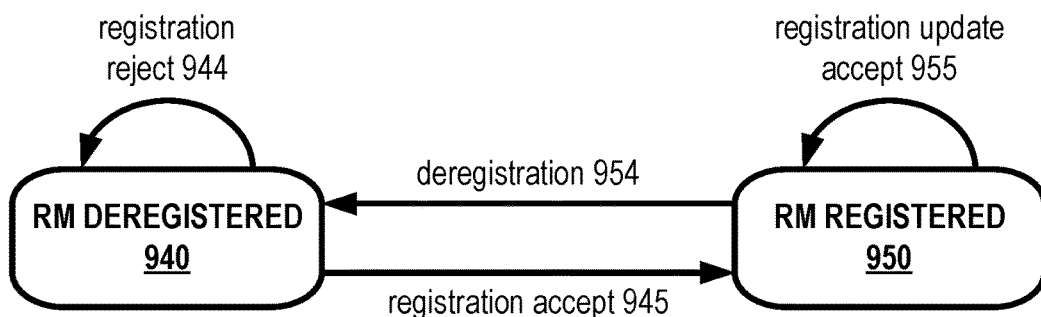

FIG. 9B is an example diagram showing registration management (RM) state transitions of a wireless device (e.g., a UE). The states are RM deregistered 940, (e.g., RM-DEREGISTERED) and RM registered 950 (e.g., RM-REGISTERED).

In RM deregistered 940, the UE is not registered with the network, and the UE is not reachable by the network. In order to be reachable by the network, the UE must perform an initial registration. As an example, the UE may register with an AMF of the network. If registration is rejected (registration reject 944), then the UE remains in RM deregistered 940. If registration is accepted (registration accept 945), then the UE transitions to RM registered 950. While the UE is RM registered 950, the network may store, keep, and/or maintain a UE context for the UE. The UE context may be referred to as wireless device context. The UE context corresponding to network registration (maintained by the core network) may be different from the RRC context corresponding to RRC state (maintained by an access network, e.g., a base station). The UE context may comprise a UE identifier and a record of various information relating to the UE, for example, UE capability information, policy information for access and mobility management of the UE, lists of allowed or established slices or PDU sessions, and/or a registration area of the UE (i.e., a list of tracking areas covering the geographical area where the wireless device is likely to be found).

While the UE is RM registered 950, the network may store the UE context of the UE, and if necessary use the UE context to reach the UE. Moreover, some services may not be provided by the network unless the UE is registered. The UE may update its UE context while remaining in RM registered 950 (registration update accept 955). For example, if the UE leaves one tracking area and enters another tracking area, the UE may provide a tracking area identifier to the network. The network may deregister the UE, or the UE may deregister itself (deregistration 954). For example, the network may automatically deregister the wireless device if the wireless device is inactive for a certain amount of time. Upon deregistration, the UE may transition to RM deregistered 940.

Figure 9C:
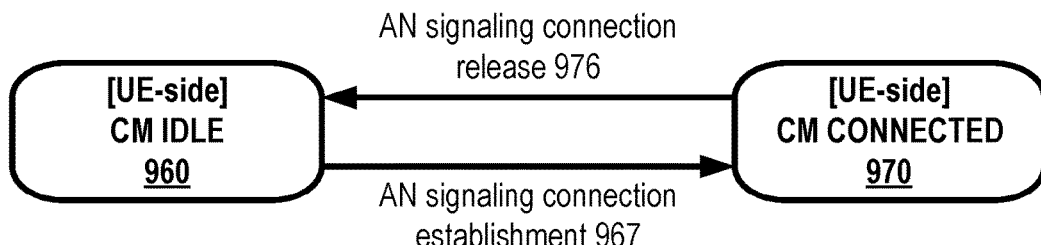

FIG. 9C is an example diagram showing connection management (CM) state transitions of a wireless device (e.g., a UE), shown from a perspective of the wireless device. The UE may be in CM idle 960 (e.g., CM-IDLE) or CM connected 970 (e.g., CM-CONNECTED).

In CM idle 960, the UE does not have a non access stratum (NAS) signaling connection with the network. As a result, the UE can not communicate with core network functions. The UE may transition to CM connected 970 by establishing an AN signaling connection (AN signaling connection establishment 967). This transition may be initiated by sending an initial NAS message. The initial NAS message may be a registration request (e.g., if the UE is RM deregistered 940) or a service request (e.g., if the UE is RM registered 950). If the UE is RM registered 950, then the UE may initiate the AN signaling connection establishment by sending a service request, or the network may send a page, thereby triggering the UE to send the service request.

In CM connected 970, the UE can communicate with core network functions using NAS signaling. As an example, the UE may exchange NAS signaling with an AMF for registration management purposes, service request procedures, and/or authentication procedures. As another example, the UE may exchange NAS signaling, with an SMF, to establish and/or modify a PDU session. The network may disconnect the UE, or the UE may disconnect itself (AN signaling connection release 976). For example, if the UE transitions to RM deregistered 940, then the UE may also transition to CM idle 960. When the UE transitions to CM idle 960, the network may deactivate a user plane connection of a PDU session of the UE.

Figure 9D:
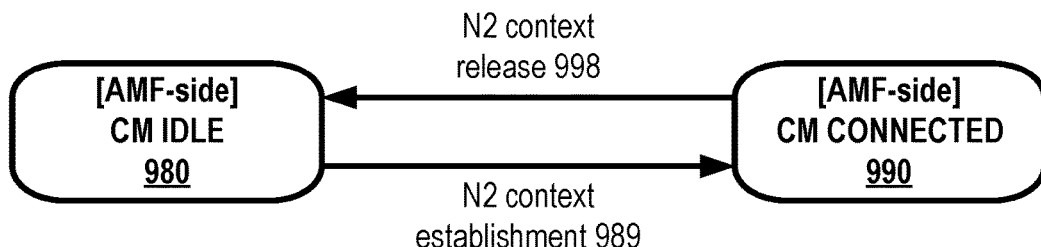

FIG. 9D is an example diagram showing CM state transitions of the wireless device (e.g., a UE), shown from a network perspective (e.g., an AMF). The CM state of the UE, as tracked by the AMF, may be in CM idle 980 (e.g., CM-IDLE) or CM connected 990 (e.g., CM-CONNECTED). When the UE transitions from CM idle 980 to CM connected 990, the AMF many establish an N2 context of the UE (N2 context establishment 989). When the UE transitions from CM connected 990 to CM idle 980, the AMF many release the N2 context of the UE (N2 context release 998).

Figure 10:
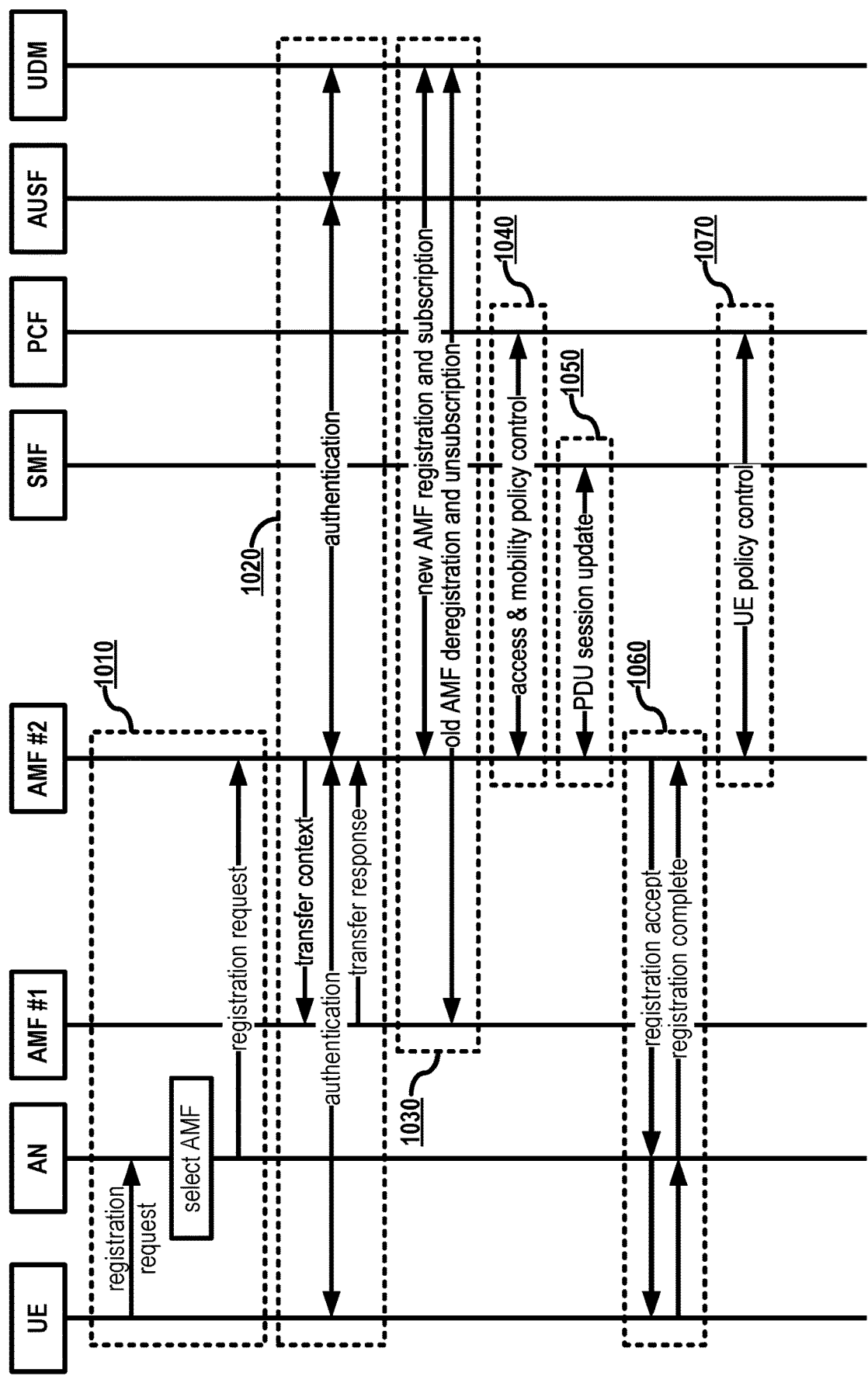
FIG. 10 illustrates an example of a registration procedure for a wireless device.
Figure 11:
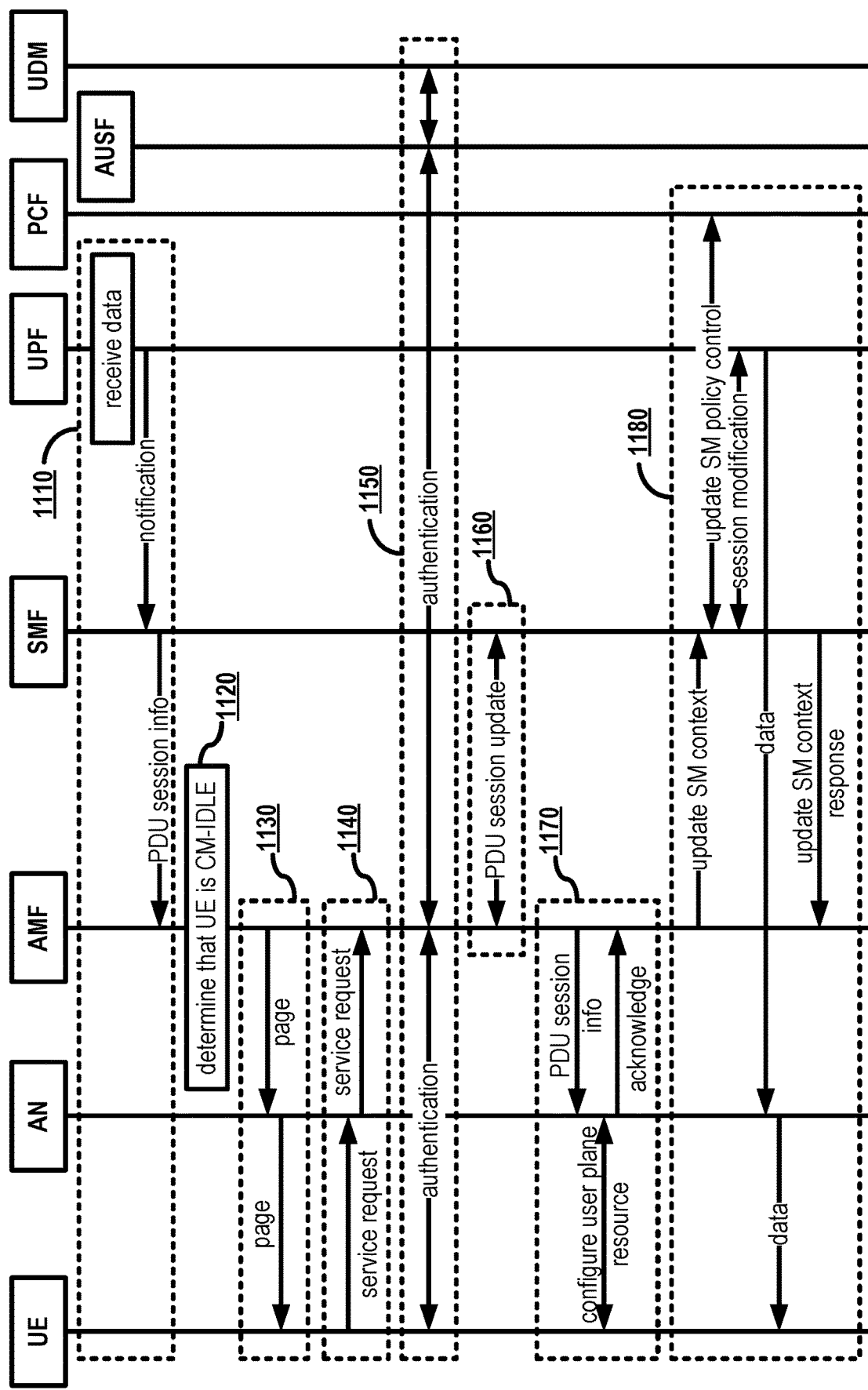
FIG. 11 illustrates an example of a service request procedure for a wireless device.
Figure 12:
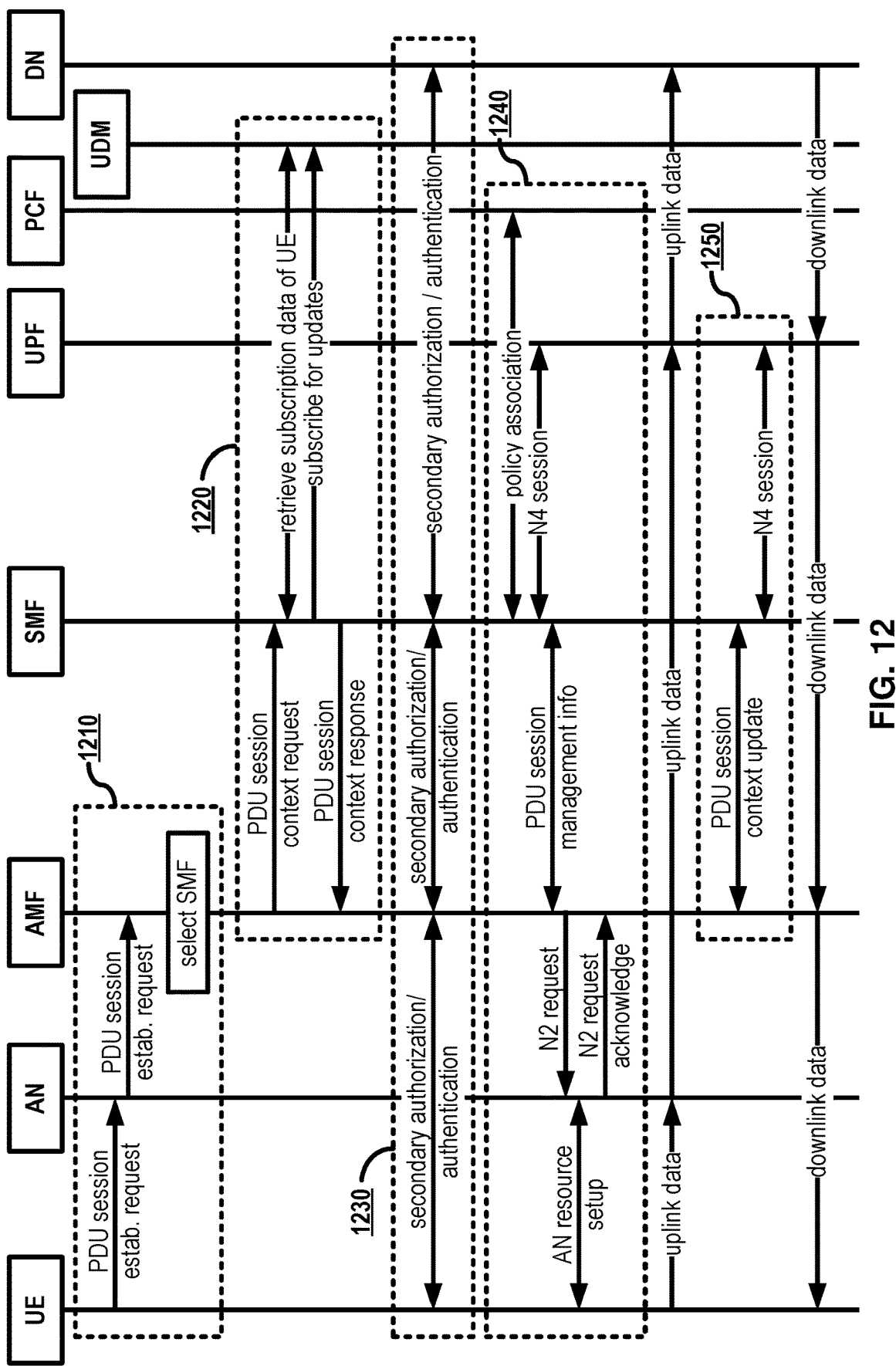
FIG. 12 illustrates an example of a protocol data unit session establishment procedure for a wireless device.

FIGS. 10-12 illustrate example procedures for registering, service request, and PDU session establishment of a UE.

FIG. 10 illustrates an example of a registration procedure for a wireless device (e.g., a UE). Based on the registration procedure, the UE may transition from, for example, RM deregistered 940 to RM registered 950.

Registration may be initiated by a UE for the purposes of obtaining authorization to receive services, enabling mobility tracking, enabling reachability, or other purposes. The UE may perform an initial registration as a first step toward connection to the network (for example, if the UE is powered on, airplane mode is turned off, etc.). Registration may also be performed periodically to keep the network informed of the UE's presence (for example, while in CM-IDLE state), or in response to a change in UE capability or registration area. Deregistration (not shown in FIG. 10) may be performed to stop network access.

At 1010, the UE transmits a registration request to an AN. As an example, the UE may have moved from a coverage area of a previous AMF (illustrated as AMF #1) into a coverage area of a new AMF (illustrated as AMF #2). The registration request may be a NAS message. The registration request may include a UE identifier. The AN may select an AMF for registration of the UE. For example, the AN may select a default AMF. For example, the AN may select an AMF that is already mapped to the UE (e.g., a previous AMF). The NAS registration request may include a network slice identifier and the AN may select an AMF based on the requested slice. After the AMF is selected, the AN may send the registration request to the selected AMF.

At 1020, the AMF that receives the registration request (AMF #2) performs a context transfer. The context may be a UE context, for example, an RRC context for the UE. As an example, AMF #2 may send AMF #1 a message requesting a context of the UE. The message may include the UE identifier. The message may be a Namf_Communication_UEContextTransfer message. AMF #1 may send to AMF #2 a message that includes the requested UE context. This message may be a Namf_Communication_UEContextTransfer message. After the UE context is received, the AMF #2 may coordinate authentication of the UE. After authentication is complete, AMF #2 may send to AMF #1 a message indicating that the UE context transfer is complete. This message may be a Namf_Communication_UEContextTransfer Response message.

Authentication may require participation of the UE, an AUSF, a UDM and/or a UDR (not shown). For example, the AMF may request that the AUSF authenticate the UE. For example, the AUSF may execute authentication of the UE. For example, the AUSF may get authentication data from UDM. For example, the AUSF may send a subscription permanent identifier (SUPI) to the AMF based on the authentication being successful. For example, the AUSF may provide an intermediate key to the AMF. The intermediate key may be used to derive an access-specific security key for the UE, enabling the AMF to perform security context management (SCM). The AUSF may obtain subscription data from the UDM. The subscription data may be based on information obtained from the UDM (and/or the UDR). The subscription data may include subscription identifiers, security credentials, access and mobility related subscription data and/or session related data.

At 1030, the new AMF, AMF #2, registers and/or subscribes with the UDM. AMF #2 may perform registration using a UE context management service of the UDM (Nudm_UECM). AMF #2 may obtain subscription information of the UE using a subscriber data management service of the UDM (Nudm_SDM). AMF #2 may further request that the UDM notify AMF #2 if the subscription information of the UE changes. As the new AMF registers and subscribes, the old AMF, AMF #1, may deregister and unsubscribe. After deregistration, AMF #1 is free of responsibility for mobility management of the UE.

At 1040, AMF #2 retrieves access and mobility (AM) policies from the PCF. As an example, the AMF #2 may provide subscription data of the UE to the PCF. The PCF may determine access and mobility policies for the UE based on the subscription data, network operator data, current network conditions, and/or other suitable information. For example, the owner of a first UE may purchase a higher level of service than the owner of a second UE. The PCF may provide the rules associated with the different levels of service. Based on the subscription data of the respective UEs, the network may apply different policies which facilitate different levels of service.

For example, access and mobility policies may relate to service area restrictions, RAT/frequency selection priority (RFSP, where RAT stands for radio access technology), authorization and prioritization of access type (e.g., LTE versus NR), and/or selection of non-3GPP access (e.g., Access Network Discovery and Selection Policy (ANDSP)). The service area restrictions may comprise a list of tracking areas where the UE is allowed to be served (or forbidden from being served). The access and mobility policies may include a UE route selection policy (URSP)) that influences routing to an established PDU session or a new PDU session. As noted above, different policies may be obtained and/or enforced based on subscription data of the UE, location of the UE (i.e., location of the AN and/or AMF), or other suitable factors.

At 1050, AMF #2 may update a context of a PDU session. For example, if the UE has an existing PDU session, the AMF #2 may coordinate with an SMF to activate a user plane connection associated with the existing PDU session. The SMF may update and/or release a session management context of the PDU session (Nsmf_PDUSession_UpdateSMContext, Nsmf_PDUSession_ReleaseSMContext).

At 1060, AMF #2 sends a registration accept message to the AN, which forwards the registration accept message to the UE. The registration accept message may include a new UE identifier and/or a new configured slice identifier. The UE may transmit a registration complete message to the AN, which forwards the registration complete message to the AMF #2. The registration complete message may acknowledge receipt of the new UE identifier and/or new configured slice identifier.

At 1070, AMF #2 may obtain UE policy control information from the PCF. The PCF may provide an access network discovery and selection policy (ANDSP) to facilitate non-3GPP access. The PCF may provide a UE route selection policy (URSP) to facilitate mapping of particular data traffic to particular PDU session connectivity parameters. As an example, the URSP may indicate that data traffic associated with a particular application should be mapped to a particular SSC mode, network slice, PDU session type, or preferred access type (3GPP or non-3GPP).

FIG. 11 illustrates an example of a service request procedure for a wireless device (e.g., a UE). The service request procedure depicted in FIG. 11 is a network-triggered service request procedure for a UE in a CM-IDLE state. However, other service request procedures (e.g., a UE-triggered service request procedure) may also be understood by reference to FIG. 11, as will be discussed in greater detail below.

At 1110, a UPF receives data. The data may be downlink data for transmission to a UE. The data may be associated with an existing PDU session between the UE and a DN. The data may be received, for example, from a DN and/or another UPF. The UPF may buffer the received data. In response to the receiving of the data, the UPF may notify an SMF of the received data. The identity of the SMF to be notified may be determined based on the received data. The notification may be, for example, an N4 session report. The notification may indicate that the UPF has received data associated with the UE and/or a particular PDU session associated with the UE. In response to receiving the notification, the SMF may send PDU session information to an AMF. The PDU session information may be sent in an N1N2 message transfer for forwarding to an AN. The PDU session information may include, for example, UPF tunnel endpoint information and/or QoS information.

At 1120, the AMF determines that the UE is in a CM-IDLE state. The determining at 1120 may be in response to the receiving of the PDU session information. Based on the determination that the UE is CM-IDLE, the service request procedure may proceed to 1130 and 1140, as depicted in FIG. 11. However, if the UE is not CM-IDLE (e.g., the UE is CM-CONNECTED), then 1130 and 1140 may be skipped, and the service request procedure may proceed directly to 1150.

At 1130, the AMF pages the UE. The paging at 1130 may be performed based on the UE being CM-IDLE. To perform the paging, the AMF may send a page to the AN. The page may be referred to as a paging or a paging message. The page may be an N2 request message. The AN may be one of a plurality of ANs in a RAN notification area of the UE. The AN may send a page to the UE. The UE may be in a coverage area of the AN and may receive the page.

At 1140, the UE may request service. The UE may transmit a service request to the AMF via the AN. As depicted in FIG. 11, the UE may request service at 1140 in response to receiving the paging at 1130. However, as noted above, this is for the specific case of a network-triggered service request procedure. In some scenarios (for example, if uplink data becomes available at the UE), then the UE may commence a UE-triggered service request procedure. The UE-triggered service request procedure may commence starting at 1140.

At 1150, the network may authenticate the UE. Authentication may require participation of the UE, an AUSF, and/or a UDM, for example, similar to authentication described elsewhere in the present disclosure. In some cases (for example, if the UE has recently been authenticated), the authentication at 1150 may be skipped.

At 1160, the AMF and SMF may perform a PDU session update. As part of the PDU session update, the SMF may provide the AMF with one or more UPF tunnel endpoint identifiers. In some cases (not shown in FIG. 11), it may be necessary for the SMF to coordinate with one or more other SMFs and/or one or more other UPFs to set up a user plane.

At 1170, the AMF may send PDU session information to the AN. The PDU session information may be included in an N2 request message. Based on the PDU session information, the AN may configure a user plane resource for the UE. To configure the user plane resource, the AN may, for example, perform an RRC reconfiguration of the UE. The AN may acknowledge to the AMF that the PDU session information has been received. The AN may notify the AMF that the user plane resource has been configured, and/or provide information relating to the user plane resource configuration.

In the case of a UE-triggered service request procedure, the UE may receive, at 1170, a NAS service accept message from the AMF via the AN. After the user plane resource is configured, the UE may transmit uplink data (for example, the uplink data that caused the UE to trigger the service request procedure).

At 1180, the AMF may update a session management (SM) context of the PDU session. For example, the AMF may notify the SMF (and/or one or more other associated SMFs) that the user plane resource has been configured, and/or provide information relating to the user plane resource configuration. The AMF may provide the SMF (and/or one or more other associated SMFs) with one or more AN tunnel endpoint identifiers of the AN. After the SM context update is complete, the SMF may send an update SM context response message to the AMF.

Based on the update of the session management context, the SMF may update a PCF for purposes of policy control. For example, if a location of the UE has changed, the SMF may notify the PCF of the UE's a new location.

Based on the update of the session management context, the SMF and UPF may perform a session modification. The session modification may be performed using N4 session modification messages. After the session modification is complete, the UPF may transmit downlink data (for example, the downlink data that caused the UPF to trigger the network-triggered service request procedure) to the UE. The transmitting of the downlink data may be based on the one or more AN tunnel endpoint identifiers of the AN.

FIG. 12 illustrates an example of a protocol data unit (PDU) session establishment procedure for a wireless device (e.g., a UE). The UE may determine to transmit the PDU session establishment request to create a new PDU session, to hand over an existing PDU session to a 3GPP network, or for any other suitable reason.

At 1210, the UE initiates PDU session establishment. The UE may transmit a PDU session establishment request to an AMF via an AN. The PDU session establishment request may be a NAS message. The PDU session establishment request may indicate: a PDU session ID; a requested PDU session type (new or existing); a requested DN (DNN); a requested network slice (S-NSSAI); a requested SSC mode; and/or any other suitable information. The PDU session ID may be generated by the UE. The PDU session type may be, for example, an Internet Protocol (IP)-based type (e.g., IPv4, IPv6, or dual stack IPv4/IPv6), an Ethernet type, or an unstructured type.

The AMF may select an SMF based on the PDU session establishment request. In some scenarios, the requested PDU session may already be associated with a particular SMF. For example, the AMF may store a UE context of the UE, and the UE context may indicate that the PDU session ID of the requested PDU session is already associated with the particular SMF. In some scenarios, the AMF may select the SMF based on a determination that the SMF is prepared to handle the requested PDU session. For example, the requested PDU session may be associated with a particular DNN and/or S-NSSAI, and the SMF may be selected based on a determination that the SMF can manage a PDU session associated with the particular DNN and/or S-NSSAI.

At 1220, the network manages a context of the PDU session. After selecting the SMF at 1210, the AMF sends a PDU session context request to the SMF. The PDU session context request may include the PDU session establishment request received from the UE at 1210. The PDU session context request may be a Nsmf_PDUSession_CreateSMContext Request and/or a Nsmf_PDUSession_UpdateSMContext Request. The PDU session context request may indicate identifiers of the UE; the requested DN; and/or the requested network slice. Based on the PDU session context request, the SMF may retrieve subscription data from a UDM. The subscription data may be session management subscription data of the UE. The SMF may subscribe for updates to the subscription data, so that the PCF will send new information if the subscription data of the UE changes. After the subscription data of the UE is obtained, the SMF may transmit a PDU session context response to the AMG. The PDU session context response may be a Nsmf_PDUSession_CreateSMContext Response and/or a Nsmf_PDUSession_UpdateSMContext Response. The PDU session context response may include a session management context ID.

At 1230, secondary authorization/authentication may be performed, if necessary. The secondary authorization/authentication may involve the UE, the AMF, the SMF, and the DN. The SMF may access the DN via a Data Network Authentication, Authorization and Accounting (DN AAA) server.

At 1240, the network sets up a data path for uplink data associated with the PDU session. The SMF may select a PCF and establish a session management policy association. Based on the association, the PCF may provide an initial set of policy control and charging rules (PCC rules) for the PDU session. When targeting a particular PDU session, the PCF may indicate, to the SMF, a method for allocating an IP address to the PDU Session, a default charging method for the PDU session, an address of the corresponding charging entity, triggers for requesting new policies, etc. The PCF may also target a service data flow (SDF) comprising one or more PDU sessions. When targeting an SDF, the PCF may indicate, to the SMF, policies for applying QoS requirements, monitoring traffic (e.g., for charging purposes), and/or steering traffic (e.g., by using one or more particular N6 interfaces).

The SMF may determine and/or allocate an IP address for the PDU session. The SMF may select one or more UPFs (a single UPF in the example of FIG. 12) to handle the PDU session. The SMF may send an N4 session message to the selected UPF. The N4 session message may be an N4 Session Establishment Request and/or an N4 Session Modification Request. The N4 session message may include packet detection, enforcement, and reporting rules associated with the PDU session. In response, the UPF may acknowledge by sending an N4 session establishment response and/or an N4 session modification response.

The SMF may send PDU session management information to the AMF. The PDU session management information may be a session service request (e.g., Namf_Communication_N1N2MessageTransfer) message. The PDU session management information may include the PDU session ID. The PDU session management information may be a NAS message. The PDU session management information may include N1 session management information and/or N2 session management information. The N1 session management information may include a PDU session establishment accept message. The PDU session establishment accept message may include tunneling endpoint information of the UPF and quality of service (QoS) information associated with the PDU session.

The AMF may send an N2 request to the AN. The N2 request may include the PDU session establishment accept message. Based on the N2 request, the AN may determine AN resources for the UE. The AN resources may be used by the UE to establish the PDU session, via the AN, with the DN. The AN may determine resources to be used for the PDU session and indicate the determined resources to the UE. The AN may send the PDU session establishment accept message to the UE. For example, the AN may perform an RRC reconfiguration of the UE. After the AN resources are set up, the AN may send an N2 request acknowledge to the AMF. The N2 request acknowledge may include N2 session management information, for example, the PDU session ID and tunneling endpoint information of the AN.

After the data path for uplink data is set up at 1240, the UE may optionally send uplink data associated with the PDU session. As shown in FIG. 12, the uplink data may be sent to a DN associated with the PDU session via the AN and the UPF.

At 1250, the network may update the PDU session context. The AMF may transmit a PDU session context update request to the SMF. The PDU session context update request may be a Nsmf_PDUSession_UpdateSMContext Request. The PDU session context update request may include the N2 session management information received from the AN. The SMF may acknowledge the PDU session context update. The acknowledgement may be a Nsmf_PDUSession_UpdateSMContext Response. The acknowledgement may include a subscription requesting that the SMF be notified of any UE mobility event. Based on the PDU session context update request, the SMF may send an N4 session message to the UPF. The N4 session message may be an N4 Session Modification Request. The N4 session message may include tunneling endpoint information of the AN. The N4 session message may include forwarding rules associated with the PDU session. In response, the UPF may acknowledge by sending an N4 session modification response.

After the UPF receives the tunneling endpoint information of the AN, the UPF may relay downlink data associated with the PDU session. As shown in FIG. 12, the downlink data may be received from a DN associated with the PDU session via the AN and the UPF.

Figure 13:
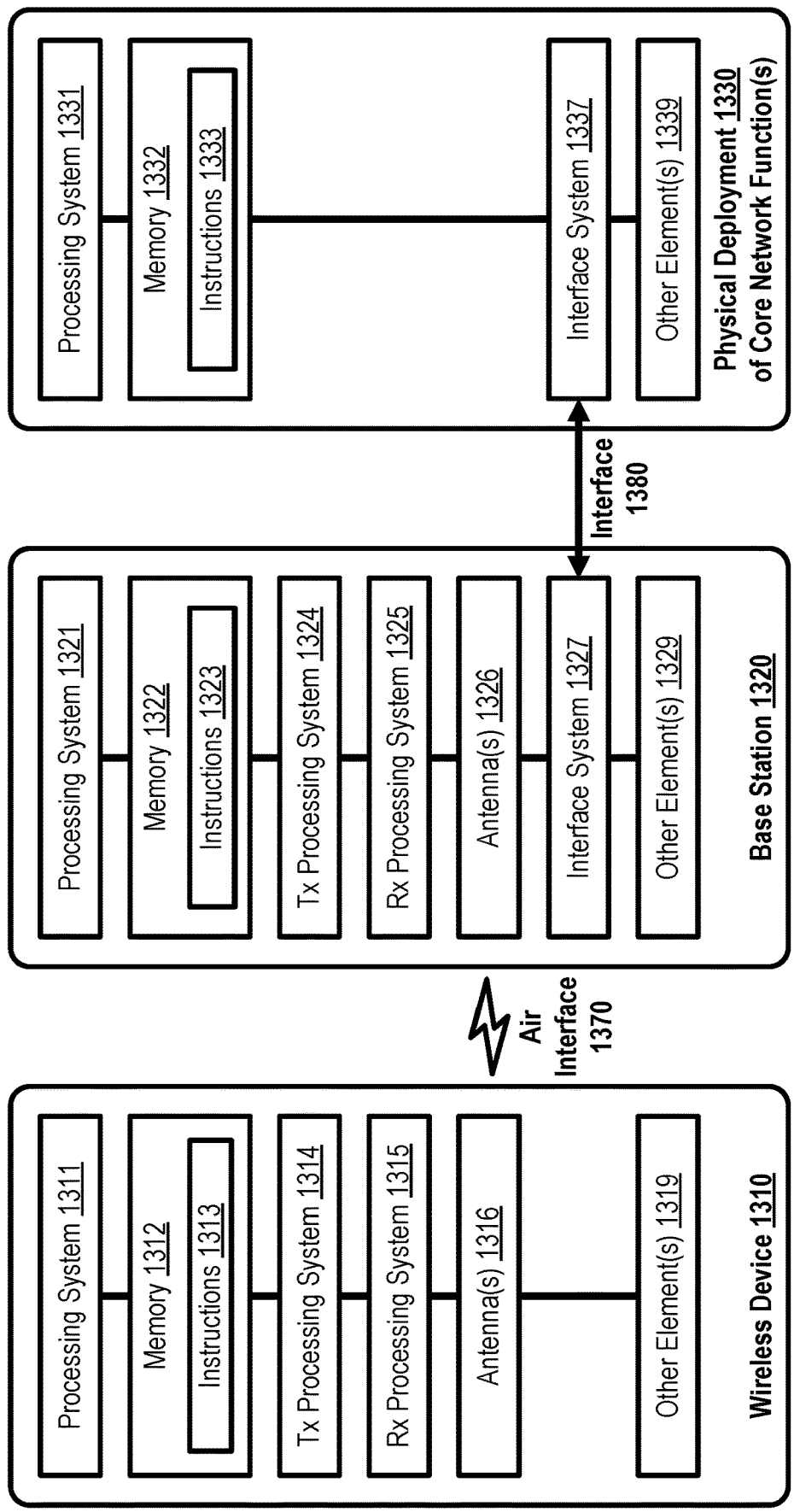
FIG. 13 illustrates examples of components of the elements in a communications network.

FIG. 13 illustrates examples of components of the elements in a communications network. FIG. 13 includes a wireless device 1310, a base station 1320, and a physical deployment of one or more network functions 1330 (henceforth "deployment 1330"). Any wireless device described in the present disclosure may have similar components and may be implemented in a similar manner as the wireless device 1310. Any other base station described in the present disclosure (or any portion thereof, depending on the architecture of the base station) may have similar components and may be implemented in a similar manner as the base station 1320. Any physical core network deployment in the present disclosure (or any portion thereof, depending on the architecture of the base station) may have similar components and may be implemented in a similar manner as the deployment 1330.

The wireless device 1310 may communicate with base station 1320 over an air interface 1370. The communication direction from wireless device 1310 to base station 1320 over air interface 1370 is known as uplink, and the communication direction from base station 1320 to wireless device 1310 over air interface 1370 is known as downlink. Downlink transmissions may be separated from uplink transmissions using FDD, TDD, and/or some combination of duplexing techniques. FIG. 13 shows a single wireless device 1310 and a single base station 1320, but it will be understood that wireless device 1310 may communicate with any number of base stations or other access network components over air interface 1370, and that base station 1320 may communicate with any number of wireless devices over air interface 1370.

The wireless device 1310 may comprise a processing system 1311 and a memory 1312. The memory 1312 may comprise one or more computer-readable media, for example, one or more non-transitory computer readable media. The memory 1312 may include instructions 1313. The processing system 1311 may process and/or execute instructions 1313. Processing and/or execution of instructions 1313 may cause wireless device 1310 and/or processing system 1311 to perform one or more functions or activities. The memory 1312 may include data (not shown). One of the functions or activities performed by processing system 1311 may be to store data in memory 1312 and/or retrieve previously-stored data from memory 1312. In an example, downlink data received from base station 1320 may be stored in memory 1312, and uplink data for transmission to base station 1320 may be retrieved from memory 1312. As illustrated in FIG. 13, the wireless device 1310 may communicate with base station 1320 using a transmission processing system 1314 and/or a reception processing system 1315. Alternatively, transmission processing system 1314 and reception processing system 1315 may be implemented as a single processing system, or both may be omitted and all processing in the wireless device 1310 may be performed by the processing system 1311. Although not shown in FIG. 13, transmission processing system 1314 and/or reception processing system 1315 may be coupled to a dedicated memory that is analogous to but separate from memory 1312, and comprises instructions that may be processed and/or executed to carry out one or more of their respective functionalities. The wireless device 1310 may comprise one or more antennas 1316 to access air interface 1370.

The wireless device 1310 may comprise one or more other elements 1319. The one or more other elements 1319 may comprise software and/or hardware that provide features and/or functionalities, for example, a speaker, a microphone, a keypad, a display, a touchpad, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, a global positioning sensor (GPS) and/or the like). The wireless device 1310 may receive user input data from and/or provide user output data to the one or more one or more other elements 1319. The one or more other elements 1319 may comprise a power source. The wireless device 1310 may receive power from the power source and may be configured to distribute the power to the other components in wireless device 1310. The power source may comprise one or more sources of power, for example, a battery, a solar cell, a fuel cell, or any combination thereof.

The wireless device 1310 may transmit uplink data to and/or receive downlink data from base station 1320 via air interface 1370. To perform the transmission and/or reception, one or more of the processing system 1311, transmission processing system 1314, and/or reception system 1315 may implement open systems interconnection (OSI) functionality. As an example, transmission processing system 1314 and/or reception system 1315 may perform layer 1 OSI functionality, and processing system 1311 may perform higher layer functionality. The wireless device 1310 may transmit and/or receive data over air interface 1370 using one or more antennas 1316. For scenarios where the one or more antennas 1316 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise a processing system 1321 and a memory 1322. The memory 1322 may comprise one or more computer-readable media, for example, one or more non-transitory computer readable media. The memory 1322 may include instructions 1323. The processing system 1321 may process and/or execute instructions 1323. Processing and/or execution of instructions 1323 may cause base station 1320 and/or processing system 1321 to perform one or more functions or activities. The memory 1322 may include data (not shown). One of the functions or activities performed by processing system 1321 may be to store data in memory 1322 and/or retrieve previously-stored data from memory 1322. The base station 1320 may communicate with wireless device 1310 using a transmission processing system 1324 and a reception processing system 1325. Although not shown in FIG. 13, transmission processing system 1324 and/or reception processing system 1325 may be coupled to a dedicated memory that is analogous to but separate from memory 1322, and comprises instructions that may be processed and/or executed to carry out one or more of their respective functionalities. The wireless device 1320 may comprise one or more antennas 1326 to access air interface 1370.

The base station 1320 may transmit downlink data to and/or receive uplink data from wireless device 1310 via air interface 1370. To perform the transmission and/or reception, one or more of the processing system 1321, transmission processing system 1324, and/or reception system 1325 may implement OSI functionality. As an example, transmission processing system 1324 and/or reception system 1325 may perform layer 1 OSI functionality, and processing system 1321 may perform higher layer functionality. The base station 1320 may transmit and/or receive data over air interface 1370 using one or more antennas 1326. For scenarios where the one or more antennas 1326 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise an interface system 1327. The interface system 1327 may communicate with one or more base stations and/or one or more elements of the core network via an interface 1380. The interface 1380 may be wired and/or wireless and interface system 1327 may include one or more components suitable for communicating via interface 1380. In FIG. 13, interface 1380 connects base station 1320 to a single deployment 1330, but it will be understood that wireless device 1310 may communicate with any number of base stations and/or CN deployments over interface 1380, and that deployment 1330 may communicate with any number of base stations and/or other CN deployments over interface 1380. The base station 1320 may comprise one or more other elements 1329 analogous to one or more of the one or more other elements 1319.

The deployment 1330 may comprise any number of portions of any number of instances of one or more network functions (NFs). The deployment 1330 may comprise a processing system 1331 and a memory 1332. The memory 1332 may comprise one or more computer-readable media, for example, one or more non-transitory computer readable media. The memory 1332 may include instructions 1333. The processing system 1331 may process and/or execute instructions 1333. Processing and/or execution of instructions 1333 may cause the deployment 1330 and/or processing system 1331 to perform one or more functions or activities. The memory 1332 may include data (not shown). One of the functions or activities performed by processing system 1331 may be to store data in memory 1332 and/or retrieve previously-stored data from memory 1332. The deployment 1330 may access the interface 1380 using an interface system 1337. The deployment 1330 may comprise one or more other elements 1339 analogous to one or more of the one or more other elements 1319.

One or more of the systems 1311, 1314, 1315, 1321, 1324, 1325, and/or 1331 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an onboard unit, or any combination thereof. One or more of the systems 1311, 1314, 1315, 1321, 1324, 1325, and/or 1331 may perform signal coding/processing, data processing, power control, input/output processing, and/or any other functionality that may enable wireless device 1310, base station 1320, and/or deployment 1330 to operate in a mobile communications system.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab and/or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise computers, microcontrollers, microprocessors, DSPs, ASICs, FPGAs, and complex programmable logic devices (CPLDs). Computers, microcontrollers and microprocessors may be programmed using languages such as assembly, C, C++ and/or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

The wireless device 1310, base station 1320, and/or deployment 1330 may implement timers and/or counters. A timer/counter may start at an initial value. As used herein, starting may comprise restarting. Once started, the timer/counter may run. Running of the timer/counter may be associated with an occurrence. When the occurrence occurs, the value of the timer/counter may change (for example, increment or decrement). The occurrence may be, for example, an exogenous event (for example, a reception of a signal, a measurement of a condition, etc.), an endogenous event (for example, a transmission of a signal, a calculation, a comparison, a performance of an action or a decision to so perform, etc.), or any combination thereof. In the case of a timer, the occurrence may be the passage of a particular amount of time. However, it will be understood that a timer may be described and/or implemented as a counter that counts the passage of a particular unit of time. A timer/counter may run in a direction of a final value until it reaches the final value. The reaching of the final value may be referred to as expiration of the timer/counter. The final value may be referred to as a threshold. A timer/counter may be paused, wherein the present value of the timer/counter is held, maintained, and/or carried over, even upon the occurrence of one or more occurrences that would otherwise cause the value of the timer/counter to change. The timer/counter may be un-paused or continued, wherein the value that was held, maintained, and/or carried over begins changing again when the one or more occurrence occur. A timer/counter may be set and/or reset. As used herein, setting may comprise resetting. When the timer/counter sets and/or resets, the value of the timer/counter may be set to the initial value. A timer/counter may be started and/or restarted. As used herein, starting may comprise restarting. In some embodiments, when the timer/counter restarts, the value of the timer/counter may be set to the initial value and the timer/counter may begin to run.

FIGS. 14A, 14B, 14C, and 14D illustrate various example arrangements of physical core network deployments, each having one or more network functions or portions thereof. The core network deployments comprise a deployment 1410, a deployment 1420, a deployment 1430, a deployment 1440, and/or a deployment 1450. Each deployment may be analogous to, for example, the deployment 1330 depicted in FIG. 13. In particular, each deployment may comprise a processing system for performing one or more functions or activities, memory for storing data and/or instructions, and an interface system for communicating with other network elements (for example, other core network deployments). Each deployment may comprise one or more network functions (NFs). The term NF may refer to a particular set of functionalities and/or one or more physical elements configured to perform those functionalities (e.g., a processing system and memory comprising instructions that, when executed by the processing system, cause the processing system to perform the functionalities). For example, in the present disclosure, when a network function is described as performing X, Y, and Z, it will be understood that this refers to the one or more physical elements configured to perform X, Y, and Z, no matter how or where the one or more physical elements are deployed. The term NF may refer to a network node, network element, and/or network device.

As will be discussed in greater detail below, there are many different types of NF and each type of NF may be associated with a different set of functionalities. A plurality of different NFs may be flexibly deployed at different locations (for example, in different physical core network deployments) or in a same location (for example, co-located in a same deployment). A single NF may be flexibly deployed at different locations (implemented using different physical core network deployments) or in a same location. Moreover, physical core network deployments may also implement one or more base stations, application functions (AFs), data networks (DNs), or any portions thereof. NFs may be implemented in many ways, including as network elements on dedicated or shared hardware, as software instances running on dedicated or shared hardware, or as virtualized functions instantiated on a platform (e.g., a cloud-based platform).

Figure 14A:
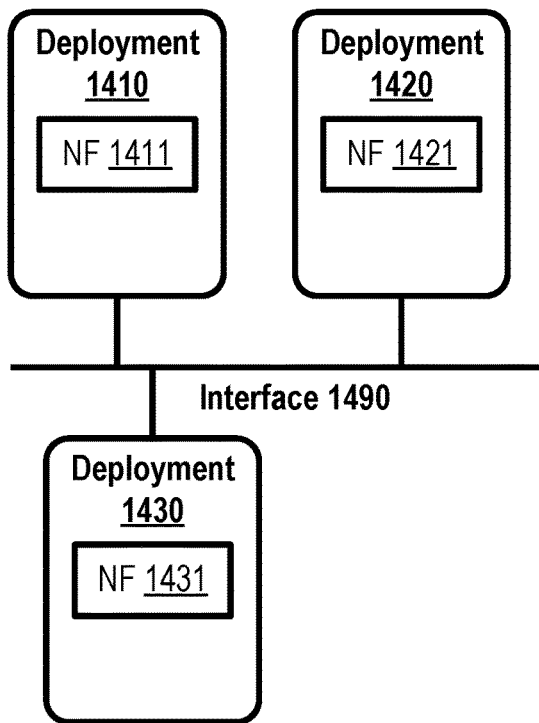
FIG. 14A, FIG. 14B, FIG. 14C, and FIG. 14D illustrate various examples of physical core network deployments, each having one or more network functions or portions thereof.

FIG. 14A illustrates an example arrangement of core network deployments in which each deployment comprises one network function. A deployment 1410 comprises an NF 1411, a deployment 1420 comprises an NF 1421, and a deployment 1430 comprises an NF 1431. The deployments 1410, 1420, 1430 communicate via an interface 1490. The deployments 1410, 1420, 1430 may have different physical locations with different signal propagation delays relative to other network elements. The diversity of physical locations of deployments 1410, 1420, 1430 may enable provision of services to a wide area with improved speed, coverage, security, and/or efficiency.

Figure 14B:
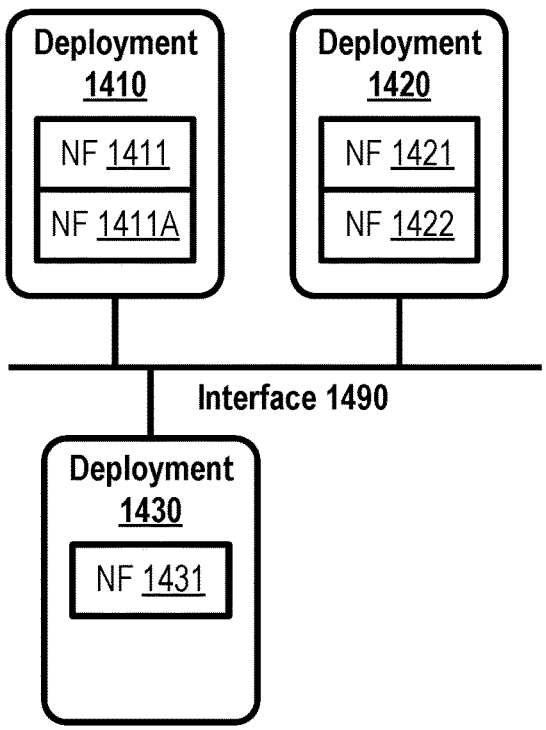

FIG. 14B illustrates an example arrangement wherein a single deployment comprises more than one NF. Unlike FIG. 14A, where each NF is deployed in a separate deployment, FIG. 14B illustrates multiple NFs in deployments 1410, 1420. In an example, deployments 1410, 1420 may implement a software-defined network (SDN) and/or a network function virtualization (NFV).

For example, deployment 1410 comprises an additional network function, NF 1411A. The NFs 1411, 1411A may consist of multiple instances of the same NF type, co-located at a same physical location within the same deployment 1410. The NFs 1411, 1411A may be implemented independently from one another (e.g., isolated and/or independently controlled). For example, the NFs 1411, 1411A may be associated with different network slices. A processing system and memory associated with the deployment 1410 may perform all of the functionalities associated with the NF 1411 in addition to all of the functionalities associated with the NF 1411A. In an example, NFs 1411, 1411A may be associated with different PLMNs, but deployment 1410, which implements NFs 1411, 1411A, may be owned and/or operated by a single entity.

Elsewhere in FIG. 14B, deployment 1420 comprises NF 1421 and an additional network function, NF 1422. The NFs 1421, 1422 may be different NF types. Similar to NFs 1411, 1411A, the NFs 1421, 1422 may be co-located within the same deployment 1420, but separately implemented. As an example, a first PLMN may own and/or operate deployment 1420 having NFs 1421, 1422. As another example, the first PLMN may implement NF 1421 and a second PLMN may obtain from the first PLMN (e.g., rent, lease, procure, etc.) at least a portion of the capabilities of deployment 1420 (e.g., processing power, data storage, etc.) in order to implement NF 1422. As yet another example, the deployment may be owned and/or operated by one or more third parties, and the first PLMN and/or second PLMN may procure respective portions of the capabilities of the deployment 1420. When multiple NFs are provided at a single deployment, networks may operate with greater speed, coverage, security, and/or efficiency.

Figure 14C:
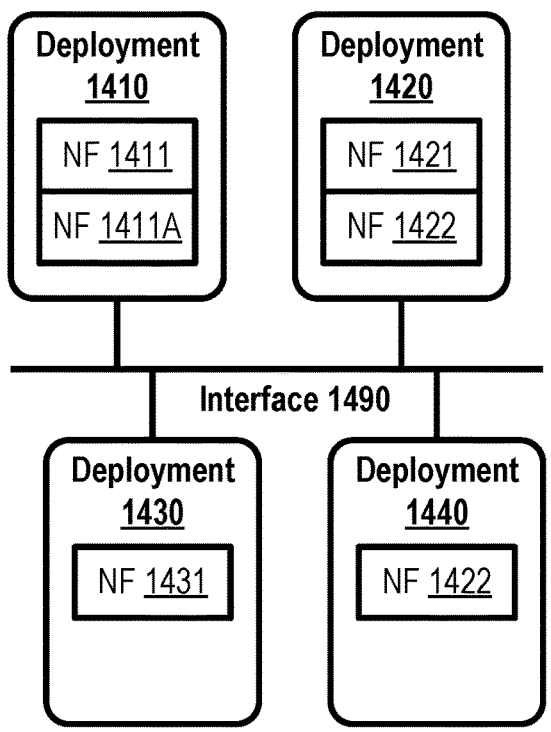

FIG. 14C illustrates an example arrangement of core network deployments in which a single instance of an NF is implemented using a plurality of different deployments. In particular, a single instance of NF 1422 is implemented at deployments 1420, 1440. As an example, the functionality provided by NF 1422 may be implemented as a bundle or sequence of subservices. Each subservice may be implemented independently, for example, at a different deployment. Each subservices may be implemented in a different physical location. By distributing implementation of subservices of a single NF across different physical locations, the mobile communications network may operate with greater speed, coverage, security, and/or efficiency.

Figure 14D:
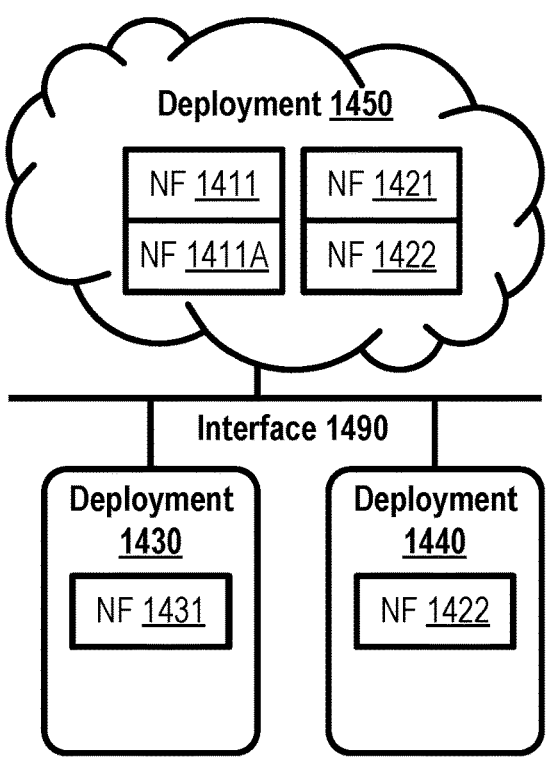

FIG. 14D illustrates an example arrangement of core network deployments in which one or more network functions are implemented using a data processing service. In FIG. 14D, NFs 1411, 1411A, 1421, 1422 are included in a deployment 1450 that is implemented as a data processing service. The deployment 1450 may comprise, for example, a cloud network and/or data center. The deployment 1450 may be owned and/or operated by a PLMN or by a non-PLMN third party. The NFs 1411, 1411A, 1421, 1422 that are implemented using the deployment 1450 may belong to the same PLMN or to different PLMNs. The PLMN(s) may obtain (e.g., rent, lease, procure, etc.) at least a portion of the capabilities of the deployment 1450 (e.g., processing power, data storage, etc.). By providing one or more NFs using a data processing service, the mobile communications network may operate with greater speed, coverage, security, and/or efficiency.

As shown in the figures, different network elements (e.g., NFs) may be located in different physical deployments, or co-located in a single physical deployment. It will be understood that in the present disclosure, the sending and receiving of messages among different network elements is not limited to inter-deployment transmission or intra-deployment transmission, unless explicitly indicated.

In an example, a deployment may be a 'black box' that is preconfigured with one or more NFs and preconfigured to communicate, in a prescribed manner, with other 'black box' deployments (e.g., via the interface 1490). Additionally or alternatively, a deployment may be configured to operate in accordance with open-source instructions (e.g., software) designed to implement NFs and communicate with other deployments in a transparent manner. The deployment may operate in accordance with open RAN (O-RAN) standards.

To get a connectivity service, a UE may select a network to which the UE performs a registration procedure. The UE may attempt registration to the selected network. For example, when the UE is switched on, the UE may perform a network selection, to select the network for registration. For the network selection, the UE may determine one or more candidate networks, the UE may select a network among the one or more candidate networks, and/or the UE may attempt registration to the selected network.

For the determination of the one or more candidate networks, the UE may use a selection list of networks, an information of a home network of the UE, and/or the like. The selection list of networks may comprise information of one or more networks, may indicate priority information of the one or more networks, and/or may comprise information of one or more access technologies for the one or more networks. For example, the one or more information of the one or more access technologies may comprise one or more identifiers (e.g., NG-RAN, satellite NG-RAN, E-UTRAN (WB-S1 mode), E-UTRAN (NB-S1 mode), UTRAN, GERAN, GERAN EC-GSM-IoT) of the one or more access technologies.

In an example, when the UE is switched on, the UE may select a home network for which the UE has a subscription for. Based on the selection, the UE may perform cell search to detect one or more cells belonging to the home network. If the UE finds one or more cells of the selected home network, the UE may attempt registration to the home network. If the UE does not find the one or more cells of the selected home network, the UE may use the selection list of networks. If the registration attempt for the selected home network fails, the UE may use the selection list of networks. For example, the UE may select a first network (e.g., a first prioritized network) among the one or more networks indicated by the list of the networks. For the selected network (e.g., the first prioritized network), the UE may attempt cell search of the selected network and/or may perform registration to the selected network. If a cell of the selected network is not available and/or if the UE fails to register to the selected network, the UE may select a second network (e.g., a second prioritized network) among the one or more networks indicated by the list of the networks. The UE may search one or more cells of the second network, and/or may attempt registration to the second network. If the cell search and/or the registration fail, the UE may select another network among the one or more networks indicated by the list of the networks. This iteration may continue, until the UE succeeds in registration to a network.

Figure 15:
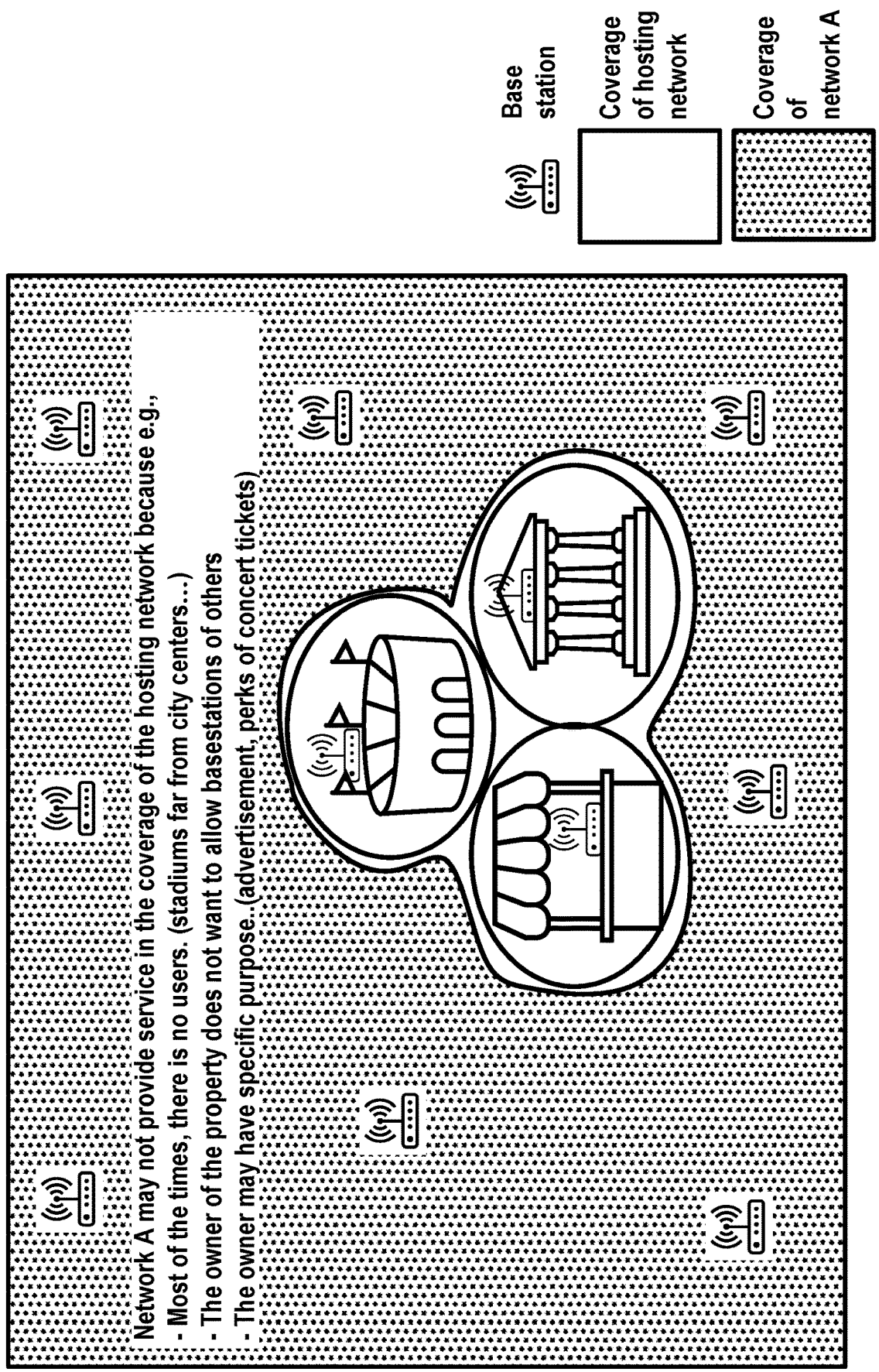
FIG. 15 is an example diagram of an aspect of an embodiment of the present disclosure

FIG. 15 depicts an example implementation in which a network provides a connectivity service to a UE within a certain area (e.g., in coverage) and/or the network may not provide the connectivity service to the UE within a certain area (e.g., out of coverage). In an example, to build the coverage in which the network provides the connectivity service to the UE, the network may comprise one or more base stations. Within the coverage of the network, the UE can send to and/or receive signal from the one or more base stations of the network.

In an implementation, the coverage of the network may not cover one or more areas where the UE may be in. For example, the one or more areas may comprise an area of a stadium, an area of a theater, an area of a private property, an area of a shopping mall, and/or the like. In one example, management of the theater may decide not to allow for the network to have a base station of the network inside the theater. If the network does not have the base station inside of the theater, the network may not provide the connectivity service to the UE. Due to lack of the base station inside of the theater, the coverage of the network may not comprise the area inside of the theater. In one example, the stadium may be in a remote area where there is no user in most of times. Based on that there is no user, the network may determine not to deploy a base station near the stadium. In one example, an owner of the shopping mall may not allow the network to install a base station inside the shopping mall.

Figure 16:
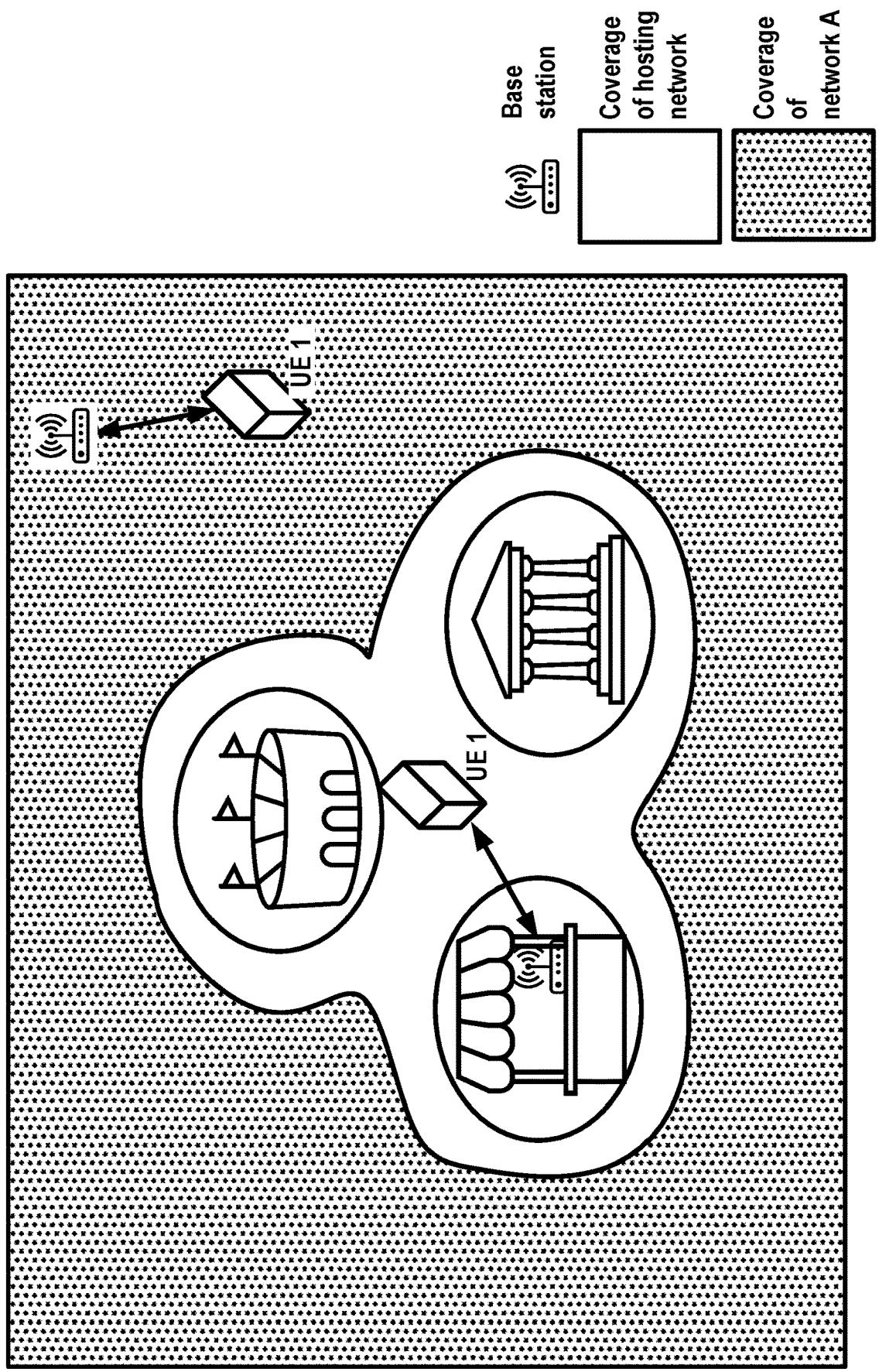
FIG. 16 is an example diagram of an aspect of an embodiment of the present disclosure.

FIG. 16 depicts an example implementation in which one or more networks may provide connectivity service to a UE in one or more areas.

In one implementation, a network (e.g., home network) may provide a connectivity service for a UE in a certain area (e.g., coverage area of the home network). The network (e.g., home network) may not provide the connectivity service for the UE in other area (e.g., out of coverage area of the home network). For the area where the home network does not provide a connectivity service, a hosting network may provide the connectivity service for the UE. For example, in the area of the theater where the UE cannot connect to the home network, the management of the theater may operate the hosting network. The hosting network may provide connectivity service for the UE visiting the theater. For example, in the area of the stadium where the home network does not provide connectivity service, an operator of the stadium may deploy a network (e.g., a hosting network) comprising one or more base stations installed in the stadium. The one or more base stations may provide the connectivity service to the UE. The operator of the stadium may allow for one or more visitors to the stadium to use the hosting network. For example, the owner of the shopping mall may determine to provide connectivity services to its customers, and/or may deploy the hosting network. The hosting network in the shopping mall may provide the connectivity service to the UE. In an example, the UE may prefer to use the hosting network, if the quality of service (e.g., data rate, error rate) of the hosting network is better than the quality of service of the home network.

In an example, the UE (UE 1) may be a subscriber of the network (network A). The network (network A) may be a home network of the UE (UE 1). For example, the UE (UE 1) may have an association with the theater, the stadium, and/or the shopping mall. For example, a user of the UE (UE 1) may be an employer of the theater, may have a ticket for a match at the stadium, and/or may be a customer of the shopping mall. Based on the association, the management of the theater, the operator of the stadium, and/or the owner of the shopping mall may allow the UE to use the connectivity service provided by the hosting network. Based on subscription with the network (network A), if the UE is in coverage of the network (network A), the UE may use the connectivity service provided by the network. Based on authorization to the hosting network, if the UE is in coverage of the hosting network, the UE may use the connectivity service provided by the hosting network.

Figure 17:
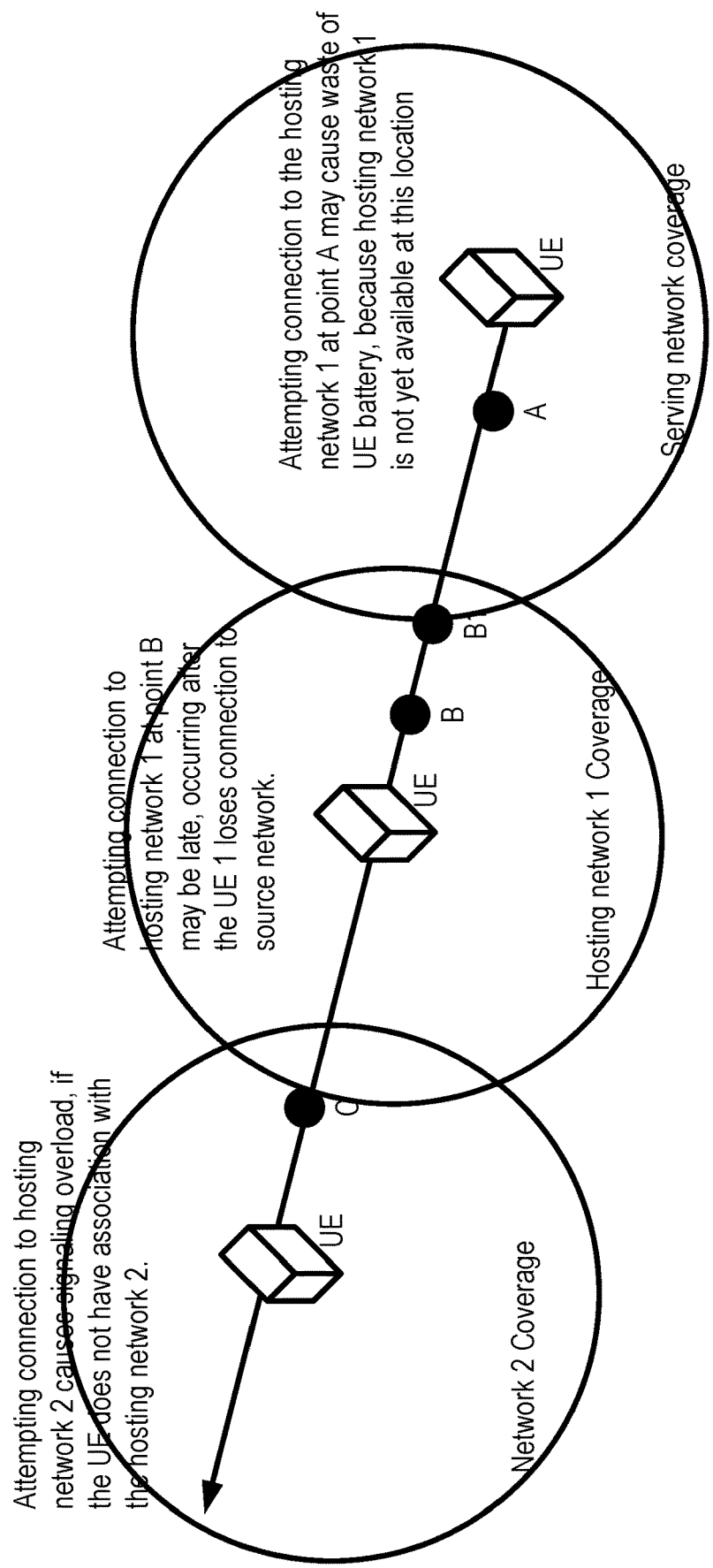
FIG. 17 is an example diagram of an aspect of an embodiment of the present disclosure.

FIG. 17 depicts an example implementation in which a UE moves from a location A to a location C via a location B. For example, the location A may be in a coverage of a serving network, the location B may be in a coverage of a first hosting network (e.g., hosting network 1), and/or the location C may be in a coverage of a second hosting network (e.g., hosting network 2). The coverage of the first hosting network may not comprise the location A. The coverage of the serving network may not comprise the location B and/or the location B1. The coverage of the first hosting network may not comprise the location C. The UE may use a connectivity service via the serving network while the UE is in the coverage (e.g., location A) of the serving network. For example, the first hosting network may allow the UE to use a connectivity service from the first hosting network, and/or the second hosting network may not allow the UE to use a connectivity service from the second hosting network.

In an example, as the UE moves from the location A to the location B, the UE may need to change from the connectivity with the serving network to the connectivity with the first hosting network. For the change of the connectivity from the serving network to the first hosting network, the UE may need to perform measurement of one or more cells of the first hosting network, and/or a NG-RAN of the serving network may need measurement result reported by the UE. Based on the measurement, the UE may determine to select the first hosting network and/or the NG-RAN may determine to handover the UE to the first hosting network.

In the existing technologies, the UE may not know when the UE is allowed to use one or more hosting networks (e.g., the first hosting network). In one implementation, the UE may start to search one or more cells at a location where the one or more hosting networks (e.g., the first hosting network) are not available. For example, the UE may start search/measurement/detection of one or more cells of the first hosting network at the location A. Considering that the location A is not in the coverage of the first hosting network, the UE may not find a cell of the first hosting network, and the UE may consume battery power. In the existing technologies, the UE may waste power resource for the search of a cell which may not be available.

In the existing technologies, the UE may not know where the UE is allowed to use one or more hosting networks. In one implementation, the UE may start the search of one or more cells after the UE experiences interruption to a connectivity service. For example, as moving along the line from a location A to the location B, the UE may not start search/measurement/detection of a cell of the first hosting network. For example, as the UE approaches the location B1 and/or moves out of the coverage of the serving network, the UE may lose connectivity to the serving network without preparation for the connectivity to the first host network. The loss of connectivity may degrade quality of service to the UE.

In the existing technologies, the UE may attempt establishment of connectivity to a hosting network that the UE is not allowed to connect. For example, at the location C, as the UE loses connectivity to the first hosting network, the UE may detect that it is in the coverage of the second hosting network. Based on there being no other available network, the UE may try to establish connectivity with the second hosting network. Because the UE is not allowed to get connectivity service from the second hosting network, an access attempt of the UE to the second hosting network may be rejected and may cause congestion of signaling to the second hosting network.

Figure 18:
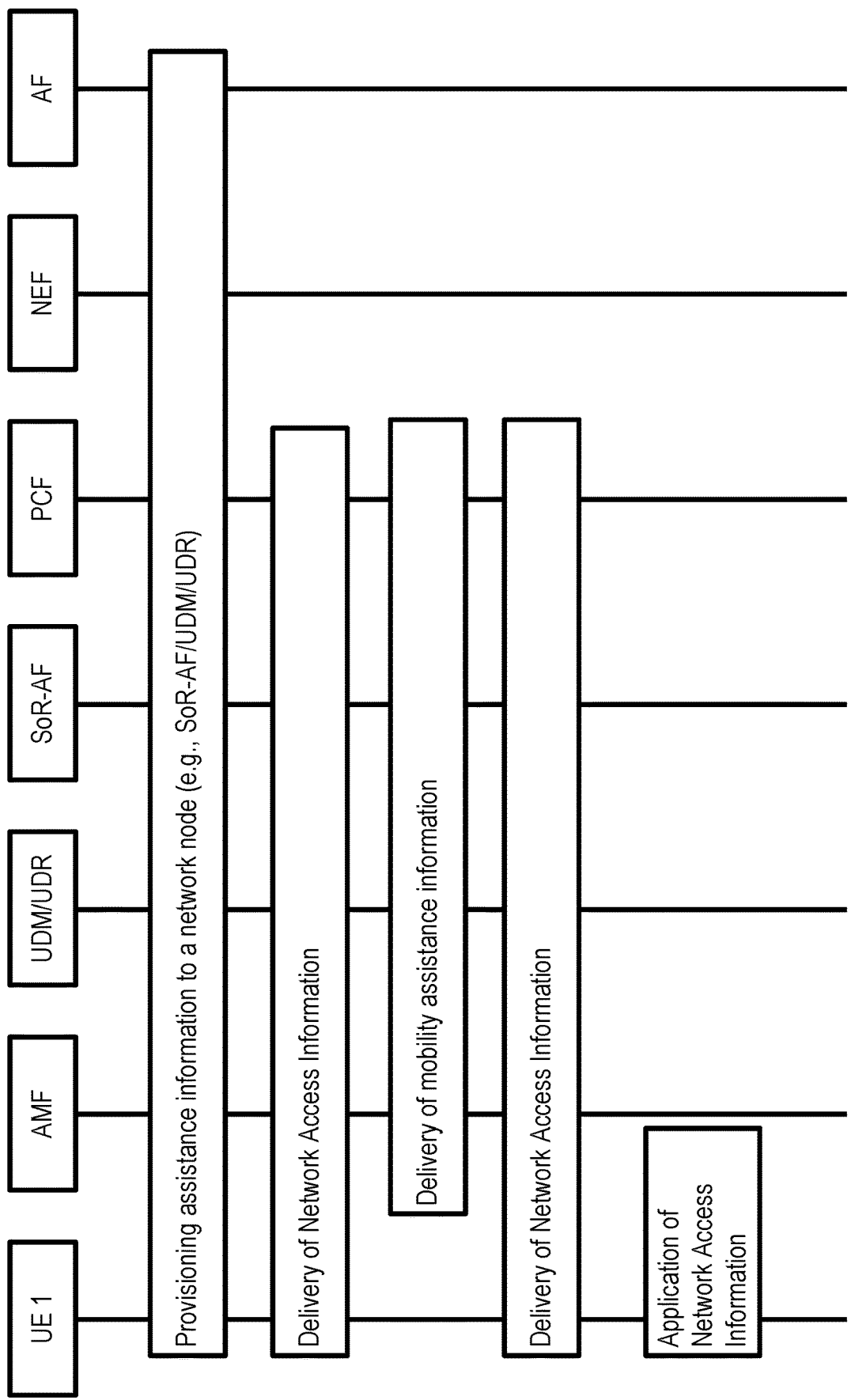
FIG. 18 is an example diagram of an aspect of an embodiment of the present disclosure.

As depicted in FIG. 18, example embodiments of the present disclosure improve system efficiency by signaling enhancement for network access information. For example, based on activation information (e.g., conditions for time/ location) of network access information, a UE can determine whether/when/where the UE may use the network access information. For example, based on information of one or more networks of the network access information and/or based on the activation information, the UE can efficiently search for one or more networks for connectivity and/or can select a network for a registration. The use of the network access information may reduce unnecessary search for a network (e.g., a hosting network), may reduce unnecessary measurement of one or more cells, and/or may increase the power efficiency of the UE. Example embodiments of the present disclosure may reduce UE's attempt for a registration to a hosting network that is not allowed for the UE, by signaling exchange among one or more network nodes and/or the UE. Example embodiments may assist for a network to construct the network access information. For example, based on the network access assistance information from an AF and/or a hosting network, one or more core network nodes can determine the information of one or more networks and/or the activation information. Example embodiments may assist a NG-RAN to determine when to configure a measurement for the UE, when to perform handover of the UE, and/or to which network the handover is performed. Example embodiments may support reduction of connectivity interruption, and selection of a suitable network for a hosting network access.

In the specification, a home network may be interpreted as a network to which a UE has a subscription. The home network may be a primary network which may store, may manage information of the UE, may generate a charging/ billing information for the UE, and/or may issue a security context (e.g., USIM, security key) for the UE. For example, the information of the UE may comprise at least one of an identifier of the UE and/or a credential of the UE. For example, the credential may comprise a value of a key that is shared by the UE and the home network, for authentication of the UE. For example, the identifier of the UE (e.g., a phone number, Mobile Station Integrated Services Digital Network, IMEI, IMSI, SUCI, SUPI, etc.) may be used for a one or more network to identify the UE and/or may be a number assigned to the UE, with which others may use to contact the UE.

In the specification, a serving network may be interpreted as a network to which a UE has registered to. For example, when the UE registers to a first network, the first network may be the serving network for the UE. When the UE registers to a second network, the second network may be the serving network for the UE. When the UE deregisters from the first network, the first network may not be the serving network for the UE. For example, if the serving network for the UE is not a home network of the UE, the serving network may retrieve information of the UE from the home network of the UE.

In the specification, a hosting network may be interpreted as a network providing a connectivity service to a UE having subscription of other network than the hosting network. For example, the hosting network for a UE may be a network other than a home network of the UE. For example, a first UE may be a subscriber of a first network (e.g., a first PLMN, a first private network, a first non-public network, a first closed network, a first credential holder, and so on) and/or a second UE may be a subscriber of a second network (e.g., a second PLMN, a second private network, a second non-public network (NPN), a second closed network, a second credential holder, a second PLMN-integrated NPN (PNI-NPN), a second standalone NPN (SNPN), and so on). The first network may provide a connectivity service to the second UE. For the second UE, the second network may be the home network and/or the first network may be a hosting network. The second network may determine not to provide a connectivity service to the first UE. For the first UE, the first network may be the home network and/or the second network may be neither a hosting network nor a home network. For the UE, a third party (e.g., not the first network, not the second network) may determine whether the UE can access the hosting network (e.g., the first network, the second network). For example, the third party (e.g., a service provider, a management of theater, owner of a shop, operator of a stadium) may allow the second UE to use a hosting network (e.g., the first network) and/or may request the hosting network to provide connectivity service to the second UE. For example, the hosting network (e.g., the first network) may have information of a UE (e.g., the second UE) and/or may preauthorize the access of the UE, before the UE may access the hosting network. For example, the hosting network may not be a public network and/or may allow access from a UE with a specific limitation (e.g., an employer of an enterprise, a customer of a shop, a visitor to a theater, etc.).

In the specification, a network access information may be interpreted as an information used for selection of a network (e.g., a hosting network). For example, the network access information may be delivered among one or more network nodes, one or more access nodes, and/or a UE. For example, the network access information may comprise a selection list of networks (e.g., a list of networks), activation information, one or more access technologies for the one or more networks, and/or the like. The UE may use the network access information to select a network, to attempt registration. For example, the UE may select a network for registration. For example, the UE may select a network for search/detection of a cell of the network. For example, the UE may select a network, based on one or more associated with one or more detected cells. For example, based on activation information of the network access information, the UE may determine when and/or where to use the network access information and/or the list of networks. Based on the network access information, the UE may trigger search of one or more cells of one or more networks indicated by the list of networks. Based on the activation information of the network access information, the UE may switch from using a first network access information to a second network access information. For example, the network access information may comprise SOR information (Steering of Roaming information), a list of preferred network/access technology combinations, a list of allowed networks, a secured packet, SoR transparent container, and/or an access and mobility subscription data. For example, the network access information may comprise information of one or more networks for which the UE may access. For example, the information of one or more networks may comprise information of one or more hosting networks.

In the specification, information of one or more networks may be interpreted as a list of networks. For example, the list of networks may comprise one or more identifiers of the one or more networks. For example, an identifier (of one or more identifiers) may indicate a network. For example, the identifier may comprise at least one of MNC (mobile network code), MCC (mobile country code), NID (Network Identifier), and/or a name of the network.

In the specification, activation information may be interpreted as one or more conditions for which one or more information may apply. For example, the one or more information may comprise network access information, network access assistance information, a list of networks, an information of a network, mobility assistance information, and/or the like. For example, the one or more conditions may comprise at least one of a time information (e.g., when the one or more information is allowed to be used, when the one or more information is valid, etc.) and/or at least one of a location information (e.g., where the one or more information is allowed to be used, where the one or more information is valid, etc.). If the one or more conditions are met, the one or more information may be used. If the one or more conditions are not met, the one or more information may not be used.

In the specification, network access assistance information may be interpreted as an information used to assist a network node to determine network access information for a UE. For example, the network node may receive the network access assistance information from other one or more network nodes and/or an application function. For example, the network node may request the network access assistance information from the other one or more network nodes and/or the application function. Based on the network access assistance information, the network node may be able to determine and/or construct the network access information.

In the specification, mobility assistance information may be interpreted as an information that indicates one or more networks that a UE can use and/or that an access node may handover the UE to. For example, the access node (e.g., NG-RAN) may use the mobility assistance information to determine one or more networks for which the access node may set up a measurement configuration, for which the access node may handover the UE to, and/or for which the UE can access. For example, the mobility assistance information may comprise information of when and/or where the mobility assistance information may be used. The information of when and/or where may be an activation information. Based on the information of when and/or where, the access node may determine when to use the mobility assistance information and/or in which area to use the mobility assistance information. For example, the mobility assistance information may comprise information of one or more networks for which the UE may use. For example, the one or more networks may comprise one or more hosting networks that the UE is allowed to use/access.

In the specification, a term of a NG-RAN may be interpreted as a base station, which may comprise at least one of a gNB, an eNB, a ng-eNB, a NodeB, an access node, an access point, an N3IWF, a relay node, a base station central unit (e.g., gNB-CU), a base station distributed unit (e.g., gNB-DU), and/or the like.

In the specification, a term of a core network node may be interpreted as a core network device, which may comprise at least one of an AMF, a SMF, a NSSF, a UPF, a NRF a UDM, a PCF, a SoR-AF, an AF, and/or the like. A term of core network may be interpreted as a core network node. In the specification, a term of an access node may be interpreted as a base station, which may comprise a NG-RAN, and/or the like. In the specification, a term of a network node may be interpreted as a core network node, an access node, a UE, and/or the like.

In the specification, an AF (application function) may be interpreted as a network node, an application, a third party, and/or an application server. For example, the AF may send a request to a network node and/or may receive a response from a network node. For example, a first network node of a first network may send a request to and/or receive from a second network node of a second network. For example, the second network may consider the first network node as an AF.

In the specification, a term of an SoR-AF may be interpreted as a core network device and/or an AF. The SoR-AF may comprise at least one of a mobility management function, an access management function, a network list management function, a network access information management function, an activation information management function, and/or the like. The SoR-AF may generate the activation information, the network access information, the mobility assistance information, and/or the like.

Figure 19:
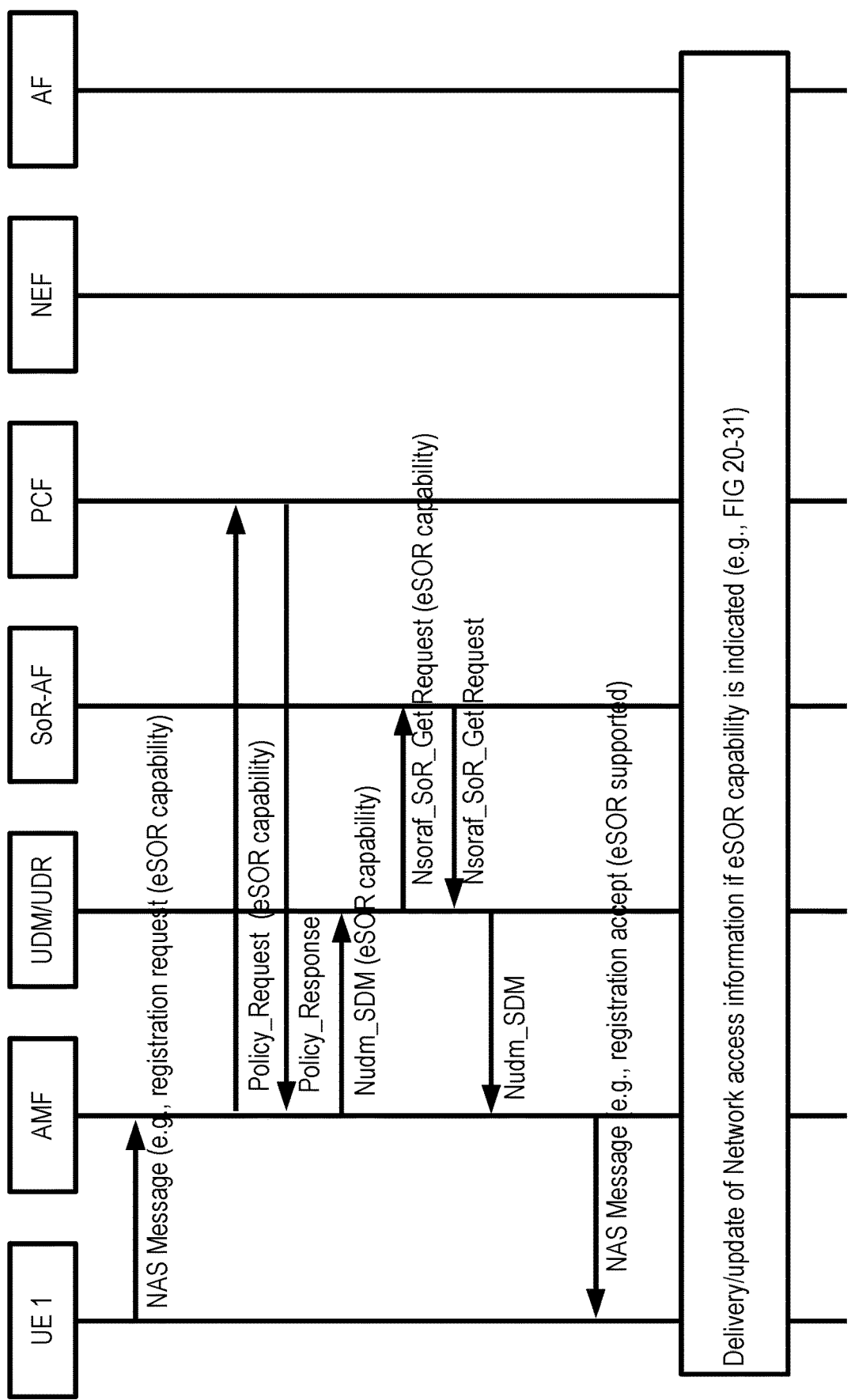
FIG. 19 is an example diagram of an aspect of an embodiment of the present disclosure.

FIG. 19 depicts one example embodiment of the present disclosure. In an example, the UE may indicate whether it supports handling associated with the network access information. For example, indication of the UE may assist one or more network nodes to determine whether to deliver the network access information to the UE or not.

In an example, a UE may send a NAS message (e.g., a UL NAS message, a registration request message, etc.) to a network node (e.g., AMF, PCF, UDM, SoR-AF, etc.). The NAS message may comprise an indication that the UE supports an eSOR (enhanced Steering of Roaming) capability. The eSOR capability may indicate that the UE support handing of network access information, sending network access information request, receiving network access information, handling of activation information, and so on. For example, the eSOR capability may assist the network node to determine whether the network access information needs to be delivered to the UE or not.

In an example, a first network node (e.g., AMF) may receive the NAS message sent by the UE. Based on that the NAS message comprises the eSOR capability, the first network node may send to the second network node (e.g., PCF), a Policy Request (e.g., Npcf_AMPolicyControl_Create request, Npcf_AMPolicyControl_Update request) message comprising the eSOR capability. Based on the eSOR capability, the second network node may determine whether to provide the UE, with service of the network access information. For example, the service of the network access information may be providing the network access information to the UE and/or to handling/processing information for the network access information. For example, if the UE subscribes to the service of the network access information, the second network node may determine to provide the UE with the service of the network access information. For example, if the second network node supports the service of the network access information, the second network node may determine to provide the UE with the service of the network access information. For the received Policy Request message, the second network node may send to the first network node, a Policy Response (e.g., Npcf_AMPolicyControl_Create response, Npcf_AMPolicyControl_Update response) message. For example, the Policy Response message may comprise indication of support for the network access information. The indication of support for the network access information may indicate whether the network node (e.g., the second network node) may provide the UE with the service of the network access information, whether the network node may generate the network access information for the UE, and so on. The first network node may receive the Policy Response sent by the second network node.

In one example, for the received NAS message from the UE, the first network may send to a third network node (e.g., UDM, UDR), a UDM service request (e.g., Nudm_SDM_Get request and/or the like) message. The UDM service request message may comprise the eSOR capability and/or an eSOR support indicator. The eSOR support indicator may indicate to a receiving network node (e.g., a third network node), whether the sending network node (e.g., the first network node) supports providing the service of network access information. For example, if the third network node does not receive the eSOR support indicator, the third network node may consider that the first network node may not provide the service of the network access information. Based on the eSOR capability and/or the eSOR support indicator, the third network node may determine whether to provide the UE with the service of the network access information. For example, if the UE subscribes to the service of the network access information, the third network node may determine to provide the UE with the service of the network access information. For example, if the third network node supports the service of the network access information, the third network node may determine to provide the UE with the service of the network access information. Based on the determination to provide the UE with the service of the network access information, the third network node may send a SoR service request (e.g., Nsoraf_SoR_Get Request) message to a fourth network node (e.g., SoR-AF). The SoR service request message may comprise the eSOR capability and/or the eSOR support indicator (e.g., of the first network, of the third network). Based on the eSOR capability and/or the eSOR support indicator, the fourth network node may determine whether to provide the UE with the service of the network access information. For example, if the UE subscribes to the network access information, the fourth network node may determine to provide the UE with the service of the network access information. For example, if the fourth network node supports providing the service of the network access information, the fourth network node may determine to provide the UE with the service of the network access information. For the received SoR service request message, the fourth network node may send to the third network node, a SoR service response request (e.g., Nsoraf_SoR_Get Response) message. For example, the SoR service response message may comprise information on whether the fourth network node provides the service for the network access information. The third network node may receive the SoR service response message from the fourth network node. For the received UDM service request message and/or based on the SoR service response message, the third network node may send to the first network node, a UDM service response (e.g., Nudm_SDM_Get response and/or the like) message. For example, the UDM service response message may comprise information on whether the third network node and/or the fourth network node provides the service of the network access information. The first network node may receive the UDM service response message from the third network node.

In an example, in response to the NAS message received from the UE, the first network node may send to the UE, a DL NAS message (e.g., registration accept message, UE configuration update message). The DL NAS message may comprise information of whether the network supports eSOR. The information of whether the network support eSOR may indicate whether the network may provide the UE with the service of the network access information and/or whether the network may provide the network access information.

In an example, the UE may receive the DL NAS message. Based on the DL NAS message, the UE may determine whether the network support the eSOR or not. For example, if the network supports the eSOR, the UE may send a message comprising network access information request. If the network does not support eSOR, the UE may not send the message comprising network access information request.

In an example, the network node may send to the UE, network access information, based on whether the UE supports the eSOR capability. For example, if the UE sends to the network, eSOR capability, the network may send to the UE, the network access information. For example, if the UE does not send to the network, the eSOR capability, the network may not send to the UE, the network access information. The examples illustrated in FIG. 20 to FIG. 34 may apply if the UE supports eSOR capability and/or if the network provides the service of network access information.

Figure 20:
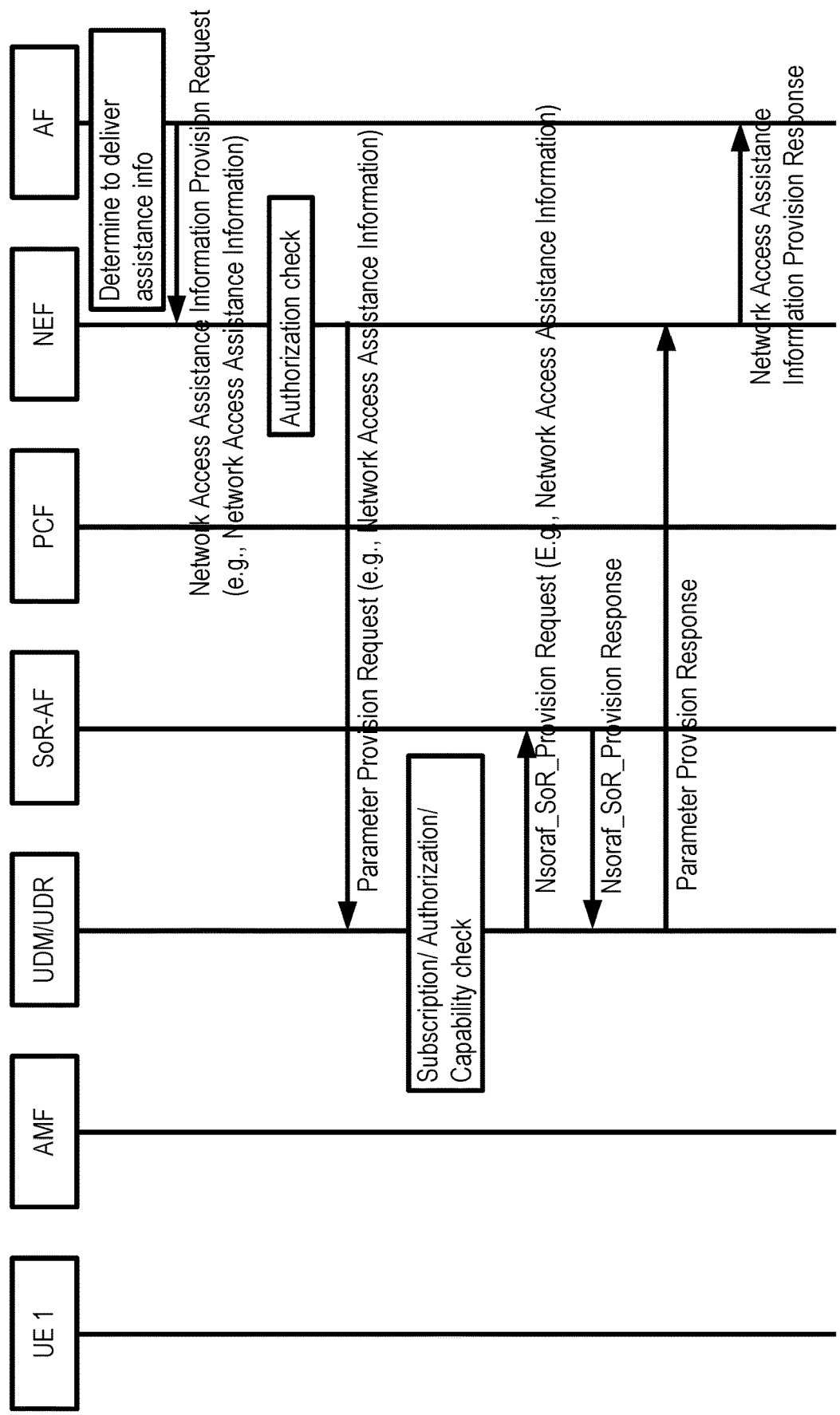
FIG. 20 is an example diagram of an aspect of an embodiment of the present disclosure.

FIG. 20 depicts one example embodiment of the present disclosure. In an example, an application function may provide network access assistance information to a network node.

In an example, an AF (e.g., an application, an entity having an agreement with a network for the use of the network, an entity managing a credential for accessing a network, an entity managing a network, a network node of a hosting network, and/or the like) may determine to allow a UE to use a connectivity service from a network (e.g., a hosting network). For example, a user of the UE may establish a contract for connectivity service with the AF. Based on the determination to provide the connectivity service to the UE, the AF may send a NEF service request message, to a network node (e.g., a NEF, a SoR-AF), to deliver assistance information associated with steering the UE to the network. For example, to determine the network node and/or the network associated with the network node, the AF may gather from the UE, information of the network to which the UE may have a subscription with, information of the UE, information of home network of the UE, information of serving network of the UE, and/or the like. The network node may belong to a home network of the UE and/or to a serving network of the UE.

In an example, the AF may send to the network node (e.g., NEF), the NEF service request message (e.g., Network Access Assistance Information Provision Request, Nnef_ParameterProvision_Create and/or Nnef_ServiceParameter_Create, Nnef_ApplyPolicy_Create and/or the like). For example, the NEF service request message may comprise a network access assistance information. The network access assistance information may comprise at least one of:

UE list information: The UE list information may indicate one or more identifiers of one or more UEs, for which the NEF service request message applies.

Network list information: The network list information may indicate one or more information of one or more networks. The one or more networks may provide connectivity services to the one or more UEs indicated by the UE list information. The network list information may comprise the list of networks.

Event information: The event information may indicate information of time (when), information of location (where), and/or validity conditions of the network access assistance information. For example, the one or more networks indicated by the network list information may provide the connectivity services to the one or more UEs indicated by the UE list information, during a time period indicated by the information of the time. The time period may comprise a start time, an end time, and/or a duration. For example, the information of location may indicate an area, one or more geographical coordinates, one or more tracking areas, one or more cells, and/or the like. When the one or more UEs are located in a place indicated by the information of location, the one or more networks indicated by the network list information may provide the connectivity services to the one or more UEs indicated by the UE list information. For example, the validity conditions may indicate one or more conditions, which may indicate when the information delivered by the network access assistance information may be valid and/or may be applicable.

In an example, the network node (e.g., NEF) may receive the NEF service request message. In response to the received NEF service request message, the network node (e.g., NEF) may perform authorization check, to determine whether the AF is authorized to send the NEF service request message. For example, the network node (e.g., NEF) may use an identity of the AF, to check whether the AF is allowed to send the NEF service request message.

In an example, based on that the authorization check is successful, the network node (e.g., NEF) may send to a data management node (e.g., UDM, UDR), a UDM service request message (e.g., Parameter Provision Request, Nudm_ParameterProvision_Create Request, Nudm_ServiceSpecificAuthorization_Create Request and/or the like). The UDM service request message may comprise the network access assistance information.

In an example, the data management node may receive the UDM service request from the network node (e.g., NEF). For the received UDM service request from the network node (e.g., NEF), the data management node may perform subscription check and/or capability check. For example, the UE may not have a subscription for the service of network access information. Based on that the UE does not have a subscription for the service of the network access information, the data management node may reject the UDM service request message from the network node (e.g., NEF). For example, the UE may have a subscription for the service of the network access information. Based on that the UE has a subscription for the service of the network access information, the data management node may accept the UDM service request message from the network node (e.g., NEF). For example, the UE may not have a capability (e.g., eSOR capability) for the service of the network access information. Based on that the UE does not have the capability, the data management node may reject the UDM service request from the network node (e.g., NEF). For example, the UE may have the capability (e.g., eSOR capability). Based on that the UE has the capability, the data management node may accept the UDM service request message from the network node (e.g., NEF).

In response to the received UDM service request message, the data management node may send to a SoR-AF, a SoR-AF service request (e.g., Nsoraf_SoR_Provision Request and/or the like) message. For example, the data management node may send the SoR-AF service request, to request the SoR-AF to process the network access assistance information and/or to generate an updated network access information. The SoR-AF service request message may comprise the network access assistance information.

In an example, the SoR-AF may store the received network access assistance information of the SoR-AF service request message and/or may process one or more information of the SoR-AF service request message. For example, the SoR-AF may generate one or more network access information for one or more UEs indicated by the UE list information of the network access assistance information. For example, the one or more UEs indicated by the UE list information may comprise a first UE and/or a second UE. The first UE may have a first capability (e.g., a first set of supported radio access technologies, a first set of supported frequency bands, etc.) and/or may subscribe to a first set of services (e.g., eMBB service, a gold-tier service, etc.). The second UE may have a second capability (e.g., a second set of supported radio access technologies, a second set of supported frequency bands, etc.) and/or may subscribe to a second set of services (e.g., IoT service, a silver-tier service, etc.). For example, based on the first capability and/or the first set of services, the SoR-AF may generate a first network access information for the first UE. For example, based on the second capability and/or the second set of services, the SoR-AF may generate a second network access information for the second UE.

In an example, based on the received SoR-AF service request message, the SoR-AF may send to the data management node, a SoR-AF service response (e.g., Nsoraf_SoR_Provision Response and/or the like) message. For example, the SoR-AF service response message may indicate outcome (e.g., successful, unsuccessful, and/or the like) of processing of the SoR-AF service request message.

In an example, the data management node may receive from the SoR-AF, the SoR-AF service response message. In response to the received SoR-AF service response message and/or based on the received UDM service request message, the data management node may send to the network node (e.g., NEF), a UDM service response (e.g., Parameter Provision Response, Nudm_ParameterProvision_Create Response, Nudm_ServiceSpecificAuthorization_Create Response and/or the like). For example, the UDM service response message may indicate outcome (e.g., successful, unsuccessful, and/or the like) of processing of the UDM service request message.

In an example, the network node (e.g., NEF) may receive from the data management node, the UDM service response message. In response to the received UDM service response message and/or based on the received NEF service request message, the NEF may send to the AF, a NEF service response (e.g., Network Access Assistance Information Provision Response, Nnef_ParameterProvision_Create Response and/or Nnef_ServiceParameter_Create Response, Nnef_ApplyPolicy_Create Response and/or the like). For example, the NEF service response message may indicate outcome (e.g., successful, unsuccessful, and/or the like) of processing of the NEF service request message. The outcome may indicate to the AF whether the request of the AF is accepted/processed or not.

Figure 21:
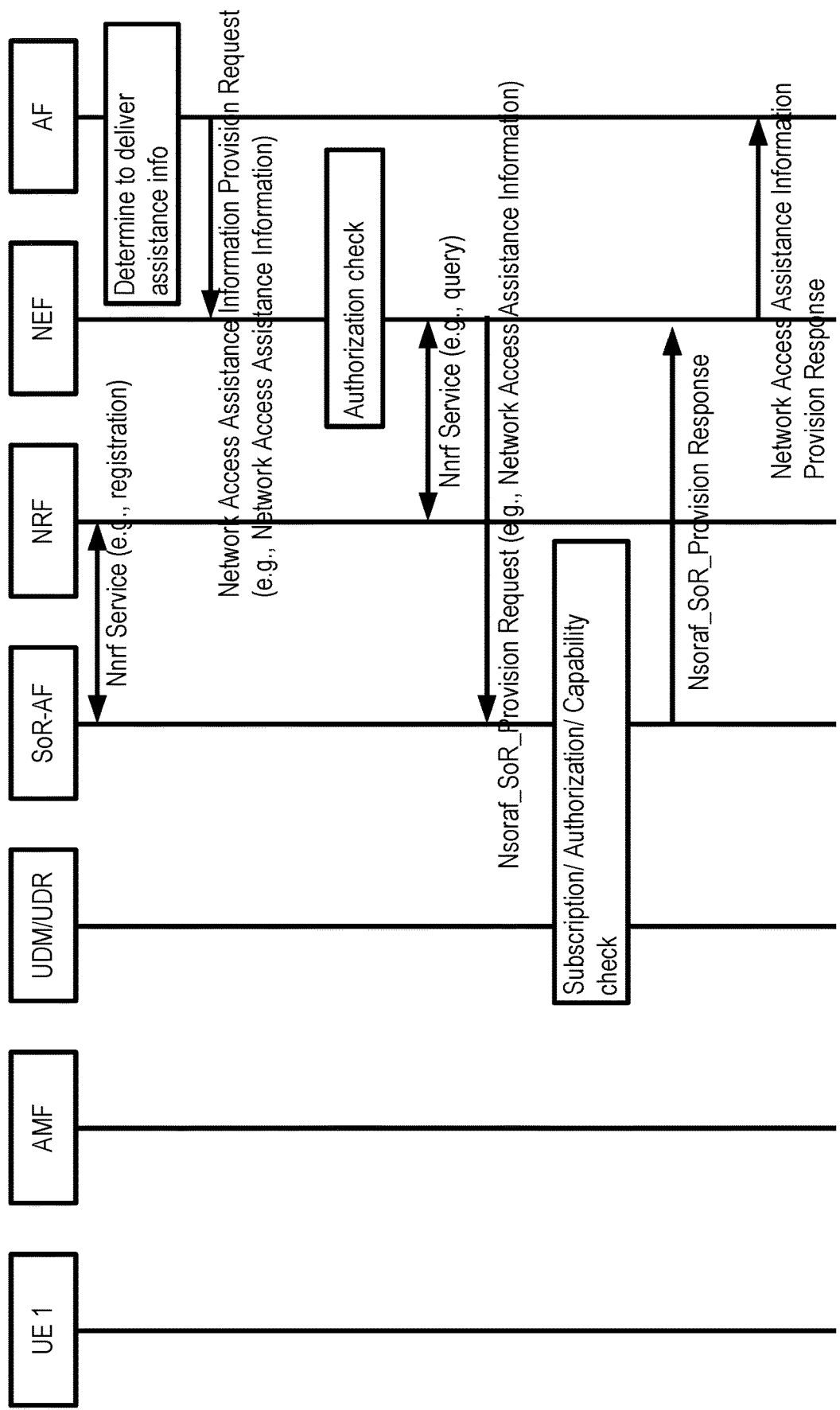
FIG. 21 is an example diagram of an aspect of an embodiment of the present disclosure.

FIG. 21 depicts one example embodiment of the present disclosure. In an example, an application function may provide network access assistance information to a network node.

In an example, a SoR-AF may register the SoR-AF to a NRF, to provide one or more SoR-AF services to one or more network nodes. To register, the SoR-AF may send a first NRF service request (e.g., Nnrf_NFManagement_N-FRegister request) message. For example, the first NRF service request message may comprise at least one of type of network node, instance ID, IP address, supported services, and so on. For example, the type of network node may indicate SoR-AF. For example, the supported services may indicate one or more services supported by the SoR-AF. For example, the supported services of the SoR-AF may comprise handling of network access information and/or handling of network access assistance information. The NRF may receive the first NRF service request message, and/or may store the information delivered by the first NRF service request message. In response to the received first NRF service request message, the NRF may send to the SoR-AF, a first NRF service response message, indicating successful registration. The SoR-AF may receive the first NRF service response message.

In an example, the AF may determine to provide connectivity service to one or more UEs. For example, the example described in FIG. 20 may apply. The AF may send the NEF service request message to the NEF. For example, the NEF service request message may comprise the network access assistance information. The NEF may perform authorization check for the received NEF service request message.

In an example, based on that the authorization check is successful, the NEF may send a second NRF service request (e.g., Nnrf_NFDiscovery request) message to the NRF. For example, the NEF may send the second NRF service request to determine a SoR-AF which may be associated with the NEF service request message. The second NRF service request may comprise at least one of target service name and/or network node type. For example, the network node type may indicate SoR-AF. The NRF may receive the second NRF service request message from the NEF. Based on the received second NRF service request message and/or based on the stored information of the SoR-AF, the NRF may determine the SoR-AF which matches the information of the second NRF request message. Based on the determined SoR-AF, the NRF may send a second NRF service response (e.g., Nnrf_NFDiscovery response) message to the NEF. For example, the second NRF service response message may comprise at least one of IP address of the SoR-AF, the identifier of the SoR-AF, and/or the like. In an example, if the NEF has information of the SoR-AF, based on local configuration and/or based on the previously received information, the NEF may not send the second NRF service request. Based on the information of the SoR-AF, the NEF may determine the SoR-AF to which a SoR-AF service request is sent.

In an example, in response to the NEF service request and/or based on information of the SoR-AF, the NEF may send the SoR-AF service request (e.g., Nsoraf_SoR_Provision Request and/or the like) message, to the SoR-AF. The SoR-AF service request message may comprise the network access assistance information. The SoR-AF may receive the SoR-AF service request message.

In an example, the SoR-AF may perform subscription check and/or capability check for a UE (indicated by the UE list information). For example, the UE may not have a subscription for the service of the network access information. Based on that the UE does not have a subscription for the service of the network access information, the SoR-AF may reject the SoR-AF service request message from the NEF. For example, the UE may have a subscription for the service of the network access information. Based on that the UE has the subscription for the service of the network access information, the SoR-AF may accept the SoR-AF service request from the NEF. For example, the UE may not have a capability (e.g., eSOR capability) for the service of the network access information. Based on that the UE does not have the capability for the service of the network access information, the SoR-AF may reject the SoR-AF service request from the NEF. For example, the UE may have the capability for the service of the network access information. Based on that the UE has the capability for the service of the network access information, the SoR-AF may accept the SoR-AF request from the NEF. In one example, the SoR-AF may send a UDM service request to a UDM. In response, the SoR-AF may receive from the UDM, subscription information and/or capability information of the UE.

In an example, the SoR-AF may store the received network access assistance information of the SoR-AF service request message and/or may process one or more information of the SoR-AF service request message.

For example, the SoR-AF may generate one or more network access information for one or more UEs indicated by the UE list information of the network access assistance information. For example, the SoR-AF may process the one or more information of the SoR-AF service request message, for the one or more UE which may have subscription for the service of the network access information and/or which may have capability for the service of the network access information. For example, the one or more UEs indicated by the UE list information may comprise a first UE and/or a second UE. The first UE may have a first capability (e.g., a first set of supported radio access technologies, a first set of supported frequency bands, etc.) and/or may subscribe to a first set of services (e.g., eMBB service, a gold-tier service, etc.). The second UE may have a second capability (e.g., a second set of supported radio access technologies, a second set of supported frequency bands, etc.) and/or may subscribe to a second set of services (e.g., IoT service, a silver-tier service, etc.). For example, based on the first capability and/or the first set of services, the SoR-AF may generate a first network access information for the first UE. For example, based on the second capability and/or the second set of services, the SoR-AF may generate a second network access information for the second UE.

In an example, in response to the received SoR-AF service request message, the SoR-AF may send a SoR-AF service response (e.g., Nsoraf_SoR_Provision Response and/or the like) message, to the NEF. In an example, the NEF may receive from the SoR-AF, the SoR-AF service response message. In response to the received SoR-AF service response message and/or based on the received NEF service request message, the NEF may send to the AF, a NEF service response (e.g., Network Access Assistance Information Provision Response, Nnef_ParameterProvision_Create Response and/or Nnef_ServiceParameter_Create Response, Nnef_ApplyPolicy_Create Response and/or the like). For example, the NEF service response message may indicate outcome (e.g., successful, unsuccessful, and/or the like) of processing of the NEF service request message. The outcome may indicate to the AF whether the request is accepted/processed or not.

Figure 22:
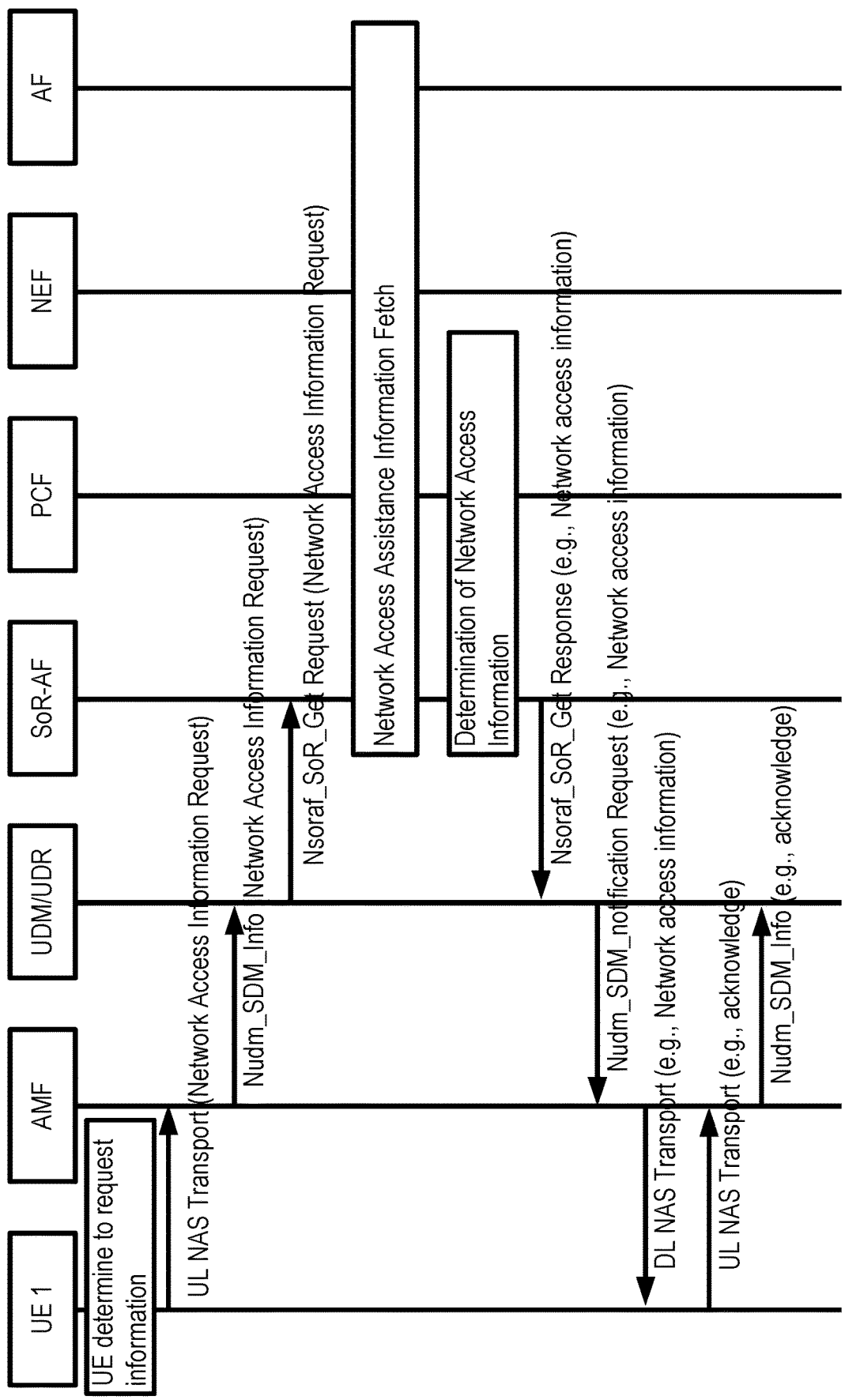
FIG. 22 is an example diagram of an aspect of an embodiment of the present disclosure.

FIG. 22 depicts one example embodiment of the present disclosure. In an example, a UE may request provision of network access information to a network node.

In an example, the UE may send a first NAS message (e.g., a UL NAS Transport message) to an AMF. In one example, the UE may send the first NAS message, if the UE requests provision of a network access information and/or if the UE does not have the network access information. In one example, the UE may request the provision of the network access information, if the UE acquires information of a network (e.g., a hosting network) and/or if the UE needs to access the network. For example, the first NAS message may comprise at least one of an identifier of the UE and/or network access information request. The network access information request may indicate that the UE needs the network access information and/or that the UE does not have a network access information. For example, the network access information request may comprise information (e.g., an address, an identifier, a name, etc.) of a network (e.g., a hosting network), an authorization information for the network, an address of an AF associated with an access to the network, and/or the like. The authorization information may be used by the AF and/or the network to authenticate the request of the UE. The information of the network access information request may be used by one or more network to determine whether to provide the network access information to the UE and/or to gather the network access assistance information.

In an example, the AMF may receive the first NAS message from the UE. For example, based on the network access information request of the first NAS message, the AMF may determine to provide the network access information to the UE. In an example, based on the received first NAS message, the AMF may send to a data management node (e.g., UDM, UDR), a UDM service request (e.g., Nudm_SDM_Info request) message. For example, the UDM service request message may comprise at least one of an identifier of the UE and/or the network access information request. Based on the UDM service request message, the data management node may determine that the network access information needs to be provided to the UE. Based on the determination, the data management node may send a SoR-AF service request message (e.g., Nsoraf_SoR_Get Request and/or the like) to a SoR-AF. For example, the SoR-AF service request message may comprise at least one of the identifier of the UE, the network access information request, and/or the network access information stored at the data management node. For example, based on the network access information stored at the data management node, the SoR-AF may determine whether to update the network access information for the UE or not. For example, based on the network access information request, the SoR-AF may determine to generate the network access information for the UE.

In an example, based on the network access information request, the SoR-AF may determine to send a message to the network (e.g., hosting network) or the AF, to check whether the UE is authorized to receive a connectivity service from the network (e.g., hosting network). For example, the SoR-AF may send a request for network access assistance information, to the network (e.g., hosting network) or the AF. For example, based on the request sent to the network or the AF, the SoR AF may receive the network access assistance information from the AF or the network (e.g., hosting network), and/or authorization information. For example, the authorization information may indicate whether the UE is authorized to use the network (e.g., hosting network). The SoR-AF may receive the network access assistance information, as illustrated in the examples of FIG. 19, 20.

In an example, reverting back to FIG. 22, based on the network access assistance information and/or based on the network access information request, the SoR-AF may determine the network access information for the UE. The SoR-AF may send the network access information to the UE. The network access information for the UE may be delivered from the SoR-AF to the UE, via the data management node and/or AMF. The UE may receive the network access information, and/or may store the network access information.

Figure 23:
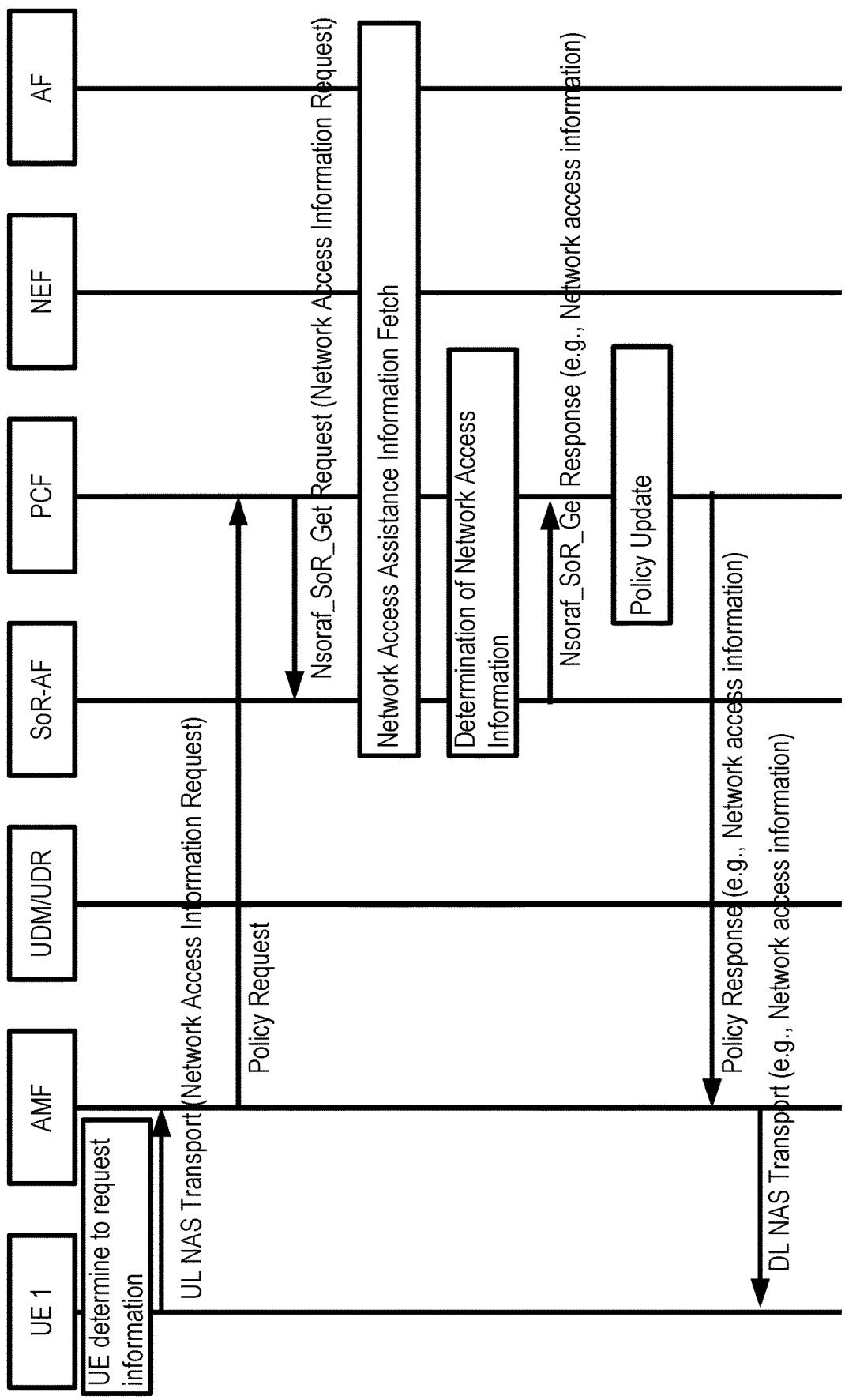
FIG. 23 is an example diagram of an aspect of an embodiment of the present disclosure.

FIG. 23 depicts one example embodiment of the present disclosure. In an example, a UE may request provision of network access information to a network node.

In an example, the UE may send a first NAS message (e.g., a UL NAS Transport message) to an AMF. For example, the UE may send the first NAS message, if the UE requests a network access information and/or if the UE does not have the network access information. For example, the UE may request the network access information, if the UE gets an information of a network (e.g., a hosting network), if the UE receives information from the network/AF, if the UE needs to access the network, and/or if the UE is authorized to access the network. For example, the first NAS message may comprise at least one of an identifier of the UE and/or network access information request. The network access information request may indicate that the UE needs the network access information, that the UE does not have the network access information, and/or that policy of the network access is required. For example, the network access information request message may comprise information (e.g., an address, identity) of the network (e.g., a hosting network), an authorization information for the network, an address of an AF, an identifier of policy for the network access, and/or the like. The authorization information may be used by the AF and/or the network to authenticate the UE. The identifier of policy for the network access may indicate the network access information that the UE may have and/or the policy for the network access that the UE may have.

In an example, the AMF may receive the first NAS message from the UE. Based on the received first NAS message, the AMF may determine that the network access information needs to be provided to the UE and/or that the policy for the network access needs to be provided to the UE. For example, based on the network access information request of the first NAS message, the AMF may determine to request the policy for the network access from a PCF for the UE.

In an example, based on the received first NAS message, the AMF may send to the PCF, a PCF service request (e.g., Npcf_AMPolicyControl_Create request, Npcf_AMPolicyControl_Update request) message. For example, the PCF service request message may comprise at least the network access information request and/or indication that the policy for the network access is required. Based on the PCF service request message, the PCF may determine that the network access information needs to be provided to the UE. Based on the determination, the PCF may send a SoR-AF service request message (e.g., Nsoraf_SoR_Get Request and/or the like) to a SoR-AF. For example, the SoR-AF service request message may comprise at least one of the identifier of the UE and/or the network access information request. For example, based on the network access information request, the SoR-AF may determine the network access information for the UE.

In an example, based on the received SoR-AF service request, the SoR-AF may send a message to the network (e.g., hosting network) or the AF, to check whether the UE is authorized to receive a connectivity service from the network (e.g., hosting network). For example, based on the request sent to the network or the AF, the SoR AF may receive the network access assistance information from the AF or the network (e.g., hosting network) and/or authorization information. For example, the authorization information may indicate whether the UE is authorized to use the network (e.g., hosting network). The SoR-AF may receive the network access assistance information, as illustrated in the examples of FIG. 19, 20.

In an example, reverting back to FIG. 23, based on the network access assistance information, the SoR-AF may determine the network access policy assistance information. The network access policy assistance information may comprise information that indicates one or more networks that the UE is allowed to select, information that indicates one or more networks that are prioritized, information that indicates one or more networks that the UE needs to be steered to, and/or a network access information. In response to the received SoR-AF service request from the PCF, the SoR-AF may send a SoR-AF service response (e.g., Nsoraf_SoR_Get response) message to the PCF. The SoR-AF service response message may comprise the network access policy assistance information. The PCF may receive the SoR-AF service response message. Based on the network access policy assistance information of the SoR-AF service response message, the PCF may construct a network access information for the UE. In response to the received PCF service request, the PCF may send to the AMF, a PCF service response (e.g., Npcf_AMPolicyControl_Create response, Npcf_AMPolicyControl_Update response, Policy response). The PCF service response message may comprise the network access information. The AMF may receive the PCF service response message from the PCF. Based on the PCF service response message, the AMF may send a second NAS message (e.g., DL NAS transport message) to the UE. The second NAS message may comprise the network access information. The UE may receive the second NAS message sent by the AMF and/or may store the network access information of the second NAS message.

Figure 24:
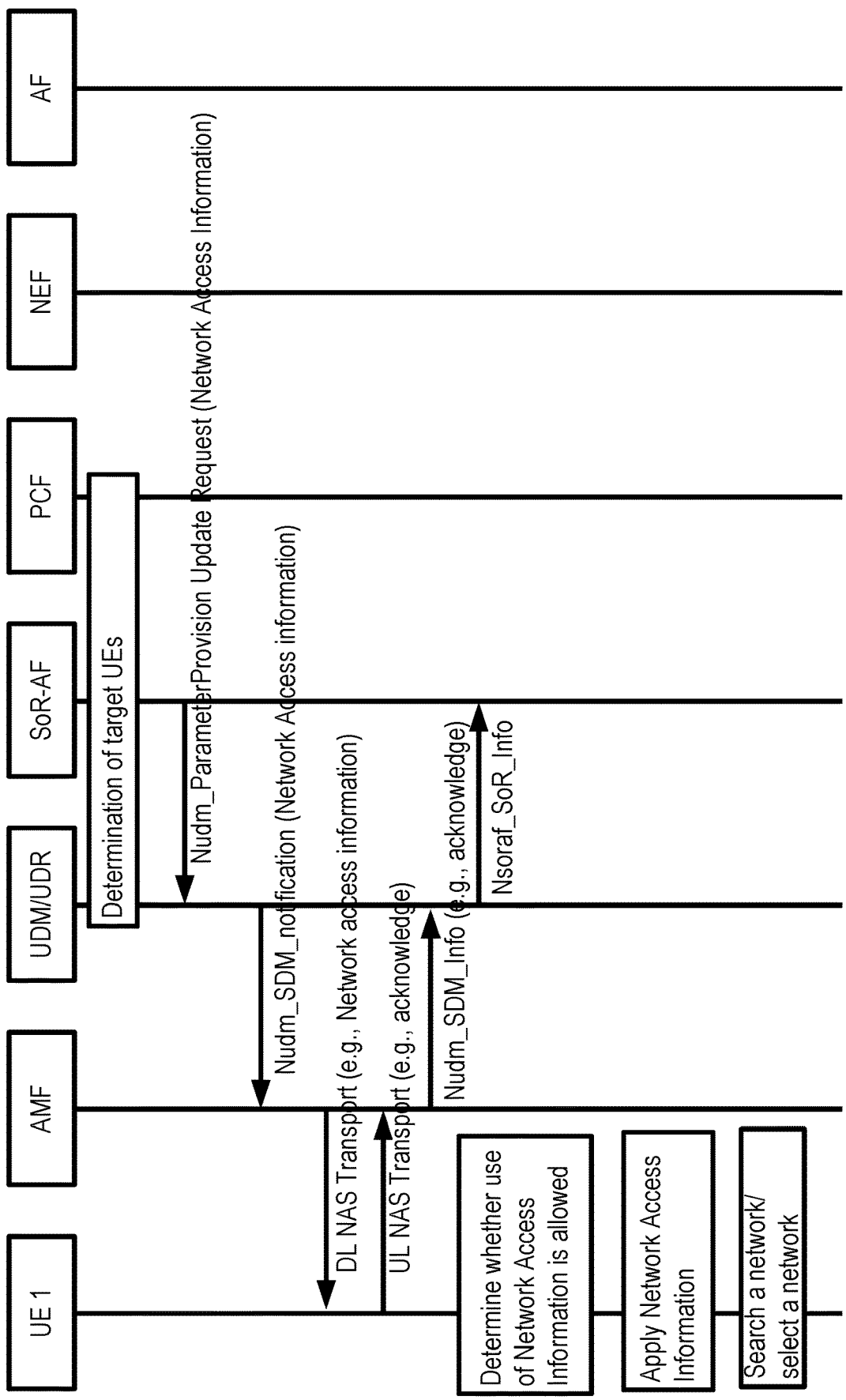
FIG. 24 is an example diagram of an aspect of an embodiment of the present disclosure.

FIG. 24 depicts one example embodiment of the present disclosure. In an example, the one or more network node may deliver the network access information. In an example, the UE may use the delivered network access information.

In an example, the SoR-AF may construct, process and/or generate the network access information. As illustrated in the examples of FIG. 20, 21, 22, the SoR-AF may generate the network access information, based on the network access assistance information.

In an example, the SoR-AF may determine to deliver the network access information to a UE. For example, if the AF and/or the UE requests for delivery of the network access information, if the SoR-AF receives/processes the network access assistance information, and/or if the condition (e.g., time and/or location) indicated by the event information of the network assistance information is met, the SoR-AF may determine to deliver the network access information to the UE. For example, if the event information indicates a time (e.g., 5 PM), the SoR-AF may determine to trigger delivery of the network access information, e.g., at around a time (e.g., 1:00 PM). For example, if the event information indicates a location (e.g., city A), when the UE approaches a border of the location (e.g., 10 miles from the city A), the SoR-AF may determine to trigger delivery of the network access information. For example, the SoR-AF may determine to trigger delivery of the network access information with a guard time.

In an example, the SoR-AF may determine one or more UEs to which the network access information is sent. For example, based on one or more UEs indicated by the UE list information, the SoR-AF may determine to send the network access information to the one or more UEs.

In an example, the network access information may comprise at least one of:

A selection list of networks (list of networks): The selection list of networks may indicate one or more information (e.g., one or more identifiers) of one or more networks. The selection list of networks may comprise one or more entries. An entry (of the one or more entries) may indicate the identifier of the network. The identifier of the network may comprise at least one of MNC (mobile network code), MCC (mobile country code), NID (Network Identifier), and/or a name of the network. In one example, one or more entries of the selection list of networks may be listed in the order of priority. For example, a first entry (e.g., a first network) of the selection list of networks may be of higher priority than a second entry (e.g., a second network) of the selection list. In one example, the entry (of the one or more entries) of the selection list of networks may comprise a priority information of the network. For example, a third entry (e.g., a third network) may comprise information that a priority is 1. For example, a fourth entry (e.g., a fourth network) may comprise information that a priority is 2. Based on the information of priority, the UE may determine the priority among the one or more entries. For example, the UE may determine that third network is of higher priority than the fourth network. Based on the determination of priority of the network, the UE may search one or more cells of one or more networks, starting from one or more cells of an entry of a higher priority. For example, the UE may search one or more cells of the first network before searching one or more cells of the second network. If the UE finds and/or selects a cell of a network, and/or successfully registers to the network, the UE may not search/find/select a cell of a network (of lower priority than the registered network).

Access technologies information: The access technologies information may indicate, for a network (of the one or more networks), one or more access technologies that the UE may use for the access to the network. For a search of one or more cells of the network, the UE may use the one or more access technologies indicated by the access technologies information.

Activation information: The activation information may comprise information indicating when and/or where the network access information is used. The activation information may indicate one or more conditions (criterion) to determine whether the network access information is applicable. For example, the activation information may comprise a validity time (e.g., information of time). The validity time may comprise at least one of a start time, an end time, a duration. The validity time may indicate when the network access information may be used, when (e.g., the start time) the UE needs to start to use the network access information associated with the validity time, when (e.g., the end time) the UE needs to stop using the network access information, and/or how long (e.g., duration) the UE may use the network access information. For example, the activation information may comprise validity location (e.g., information of location). The validity location may comprise at least one of an information of one or more cells, information of one or more geographical coordinates, information of one or more tracking areas, and/or the like. The validity location may indicate where the UE may use the network access information and/or where the UE may not use the network access information.

In an example, the SoR-AF may send a first UDM service request (e.g., Nudm_Parameter_Provision request) message, to a UDM. The UDM may receive from the SoR-AF, the first UDM service request message. For example, to receive the first UDM service request, the UDM may register the address of the UDM to the SoR-AF and/or may request to be notified if the SoR-AF generates/updates the network access information. The first UDM service request message may comprise the network access information and/or the information (e.g., identifier) of the UE. The information of the UE may indicate the UE to which the network access information is delivered.

In an example, the UDM may store the received network access information. Based on the network access information, the UDM may send a second UDM service request (e.g., Nudm_SDM_Notification request) message, to an AMF associated with the UE. For example, to receive the second UDM service request, the AMF may register its address to the UDM and/or the UDM may store the address of the AMF. Based on the registered address, the UDM may send the second UDM service request to the AMF. For example, the second UDM service request message may comprise the network access information and/or indication of whether acknowledgement of reception is required or not. The indication of whether acknowledgment of reception is required or not may indicate whether the UE needs to send acknowledgement of successful security check when the UE receives the network access information. For example, by receiving the acknowledgement of successful security check, the UDM may determine whether the network access information sent by the UDM is changed or not by a network node between the UDM and the UE. For example, if the network node between the UDM and the UE changes one or more information of the network access information sent by the UDM, the UE may not successfully perform security check.

In an example, the AMF may receive the second UDM service request message sent by the UDM. Based on the second UDM service request message, the AMF may send to the UE, a DL NAS message (e.g., DL NAS Transport, Registration Accept, UE configuration Update Command). The DL NAS message may comprise the network access information (e.g., a second network access information). In an example, the UE may receive the DL NAS message and/or the UE may store the network access information of the DL NAS message. For example, the network access information may further comprise the indication of whether acknowledgement of reception is required or not. If the DL NAS message comprises the indication of whether acknowledgement of reception is required, the UE may send an UL NAS message (e.g., UL NAS Transport, UE configuration update complete) to the AMF. For example, the UL NAS message may comprise a SoR transparent container, comprising UE acknowledgement. If the UE successfully check the security of the information of the DL NAS message, the UE may include the UE acknowledgement into the SoR transparent container.

The AMF may receive the UL NAS message. Based on that the UL NAS message comprises the SoR transparent container, the AMF may send a third UDM service request message (e.g., Nudm_SDM_Info request) to the UDM, to deliver the SoR transparent container. The third UDM service request message may comprise the SoR transparent container. Based on the SoR transparent container, the UDM may verify that the UE provides the UE acknowledgement. If the UDM successfully verify that the UE provides the UE acknowledgement, the UDM may send a SoR-AF service request (e.g., Nsoraf_SoR_Info Request) message to the SoR-AF, to inform the SOR-AF of successful delivery of the network access information (e.g., the list of preferred network/access technology combinations, list of networks). The SoR-AF service request may comprise the identifier of the UE and/or indication of successful delivery of the network service information. Based on the indication of the successful delivery, the SoR-AF may determine that the network access information is successfully delivered to the UE.

In an example, based on one or more information of the received network access information, the UE may determine when and/or where to use the received network access information. For example, the UE may determine whether it needs to use the received network access information. For example, the network access information may comprise the activation information. The activation information may comprise the validity time, the validity location, the validity criterion, and/or the like. For example, the validity time (e.g., at 3:00 PM, from 9:00 AM to 1:00 PM, Tuesday, weekdays, etc.) may indicate when the UE applies the network access information. For example, if the validity time indicates a certain time (e.g., at 2:00 PM), and the time is a first time (e.g., 1:59 PM), the UE may determine that the UE does not apply the network access information. For example, if the validity time indicates a certain time (e.g., from 3:00 PM to 5:00 PM), and the time is a second time (e.g., 3:00 PM), the UE may determine that the UE applies the network access information. For example, the validity location (e.g., at TAC=1, GPS coordinate (30.0N, 125.0E), etc.) may indicate where the UE applies the network access information. For example, if the validity location indicates a certain location (e.g., TAC=2, 3, 5), and the cell to which the UE is associated indicates a first location (e.g., TAC=4), the UE may determine that the UE does not apply the network access information. For example, if the validity location indicates a certain location (e.g., GPS coordinate (from 25.0N to 25.1N, from 30.0E to 30.1E)), and the location of the UE is a second location (e.g., GPS coordinate (25.05N, 30.05E)), the UE may determine that the UE applies the network access information (e.g., a second network access information).

In an example, based on the determination that the UE applies the network access information, the UE may apply the network access information. For example, the UE may not use any more the previous network access information and/or the UE may start to use the network access information for which the associated activation information applies. For example, the UE may use a first network access information before the UE receives the network access information (e.g., the second network access information). For example, the second network information may comprise the activation information and/or the first network information may not comprise the activation information. For example, the UE may use the first network access information when a condition (e.g., valid time, valid location, valid condition) of the activation information of the second network access information is not met. For example, the UE may use the second network access information when the condition (e.g., valid time, valid location, valid condition) of the activation information of the second network access information is met. For example, for the received network access information, the UE may not use the network access information if the activation information of the network access information is not met. For example, for the received network access information, the UE may use the network access information if the activation information of the network access information is met. For example, based on the determination that the UE applies the network access information, the UE may start to use the network access information (e.g., the second network access information) and/or may trigger change from using the first network access information to the second network access information.

In an example, based on one or more information of the network access information, the UE may trigger search/finding of a network associated with the network access information, and/or may change registration from a network to another network based on a result of the search/finding. For example, if the UE finds one or more cells for a network based on the network access information, the UE selects the network and/or may send a registration request message to the network. For example, the selected network may be a hosting network.

Figure 25:
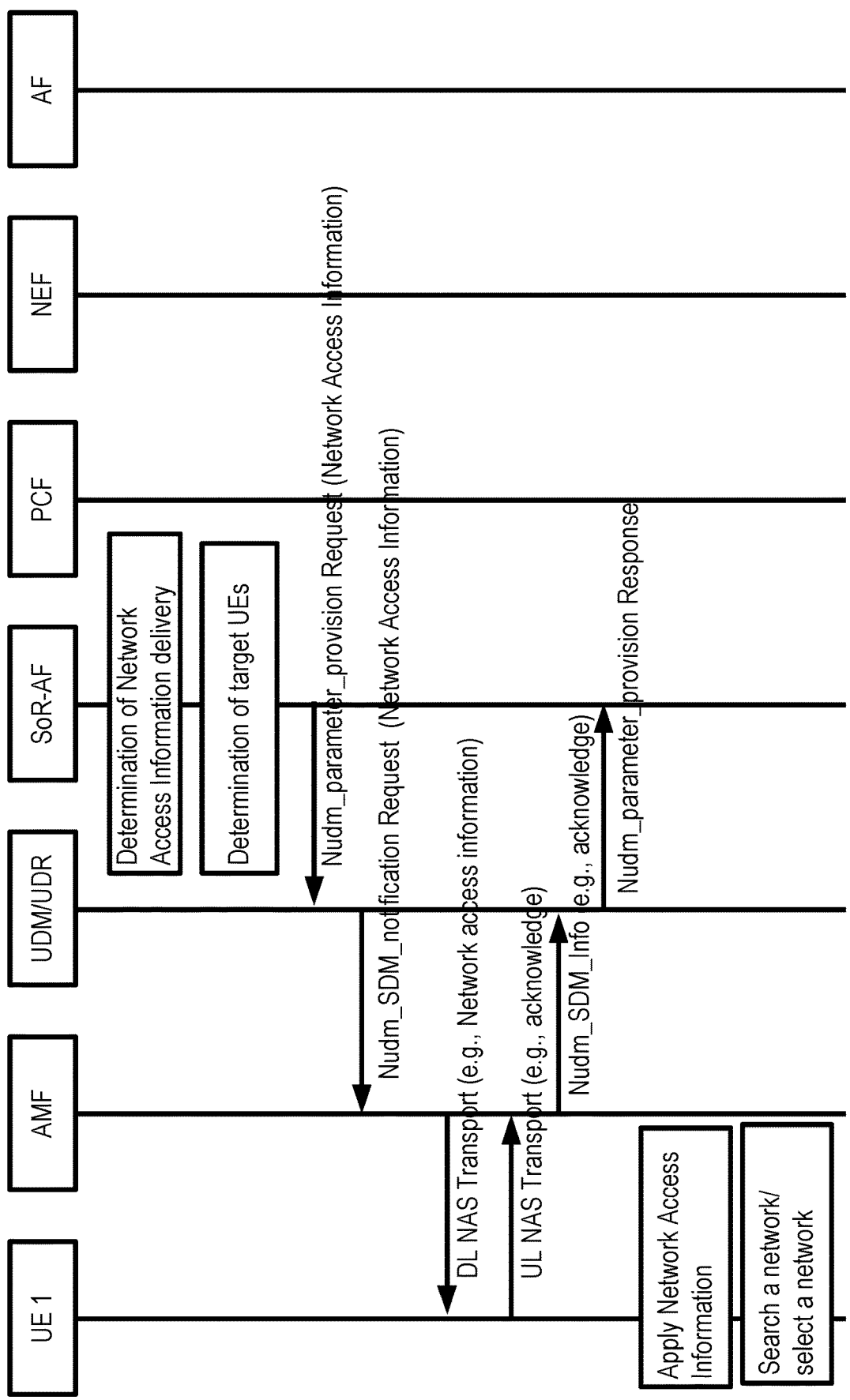
FIG. 25 is an example diagram of an aspect of an embodiment of the present disclosure.

FIG. 25 depicts one example embodiment of the present disclosure. In an example, the one or more network node may deliver the network access information. In an example, the UE may use the delivered network access information.

In an example, the SoR-AF may construct, process, and/or generate the network access information. As illustrated in the examples of FIG. 20, 21, 22, the SoR-AF may generate the network access information, based on the network access assistance information.

In an example, reverting back to FIG. 25, the SoR-AF may determine to deliver the network access information to a UE. For example, the SoR-AF may determine to deliver the network access information to the UE, if the AF and/or the UE requests for delivery of the network access information, if the SoR-AF receives/processes the network access assistance information, and/or if the condition (e.g., time and/or location) indicated by the event information based on the network assistance information is met. For example, if the event information indicates a time (e.g., 2 PM), the SoR-AF may determine to trigger delivery of the network access information at around the time (e.g., 1:59 PM, 2:00 PM). For example, if the event information indicates a location (e.g., city A), when the UE approaches to the border of the location (e.g., 0.3 mile from the city A, the border of the city A), the SoR-AF may determine to trigger delivery of the network access information. For example, if the SoR-AF determines that the UE needs to use the network access information when the UE receives the network access information, the SoR-AF may not send the network access information not comprising the activation information.

In an example, the SoR-AF may determine one or more UEs to which the network access information needs to be sent. For example, based on one or more UEs indicated by the UE list information, the SoR-AF may determine to send the network access information to the one or more UEs. For example, the SoR-AF may determine to send the network access information, if the time is close to the start of the event, and/or if the location of the UE is close to the location of the event.

In an example, the network access information may comprise at least one of:

A selection list of networks (list of networks): The selection list of networks may indicate one or more information of one or more networks. For a network (of the one or more networks), the network access information may or may not comprise an access technologies information. The selection list of networks may comprise one or more entries. An entry of the one or more entries may indicate the identifier of the network. The identifier of the network may comprise at least one of MNC (mobile network code), MCC (mobile country code), NID (Network Identifier) and/or a name of the network. One or more entries of the selection list of networks may be listed in the order of priority. For example, a first entry (e.g., a first network) of the selection list of networks may be of higher priority than a second entry (e.g., a second network) of the selection list. For example, the entry of the selection list of networks may comprise a priority information of the network. For example, a third entry (e.g., a third network) may comprise information that a priority is 1. For example, a fourth entry (e.g., a fourth network) may comprise information that a priority is 2. Based on the priority, the UE may determine the priority among the entries. For example, the UE may determine that third network is of higher priority than the fourth network. Based on the determination of priority, the UE may search one or more cells of one or more networks, starting from an entry of higher priority. For example, the UE may search one or more cells of the first network before searching one or more cells of the second network. If the UE finds and/or selects a cell of a network (of higher priority) and/or successfully registers to the network (of higher priority), the UE may not search/find/select a cell of a network (of lower priority).

Access technologies information: The access technologies information may indicate, for a network, one or more access technologies that the UE may use for the network. For a search of one or more cells of the network, the UE may use the one or more access technologies indicated by the access technologies information.

In an example, the SoR-AF may send a first UDM service request (e.g., Nudm_Parameter_Provision request) message, to a UDM. The UDM may receive from the SoR-AF, the first UDM service request message. The first UDM service request message may comprise the network access information and/or the identifier of the UE. The network access information may not comprise the activation information. The identifier of the UE may indicate the UE to which the network access information is delivered.

In an example, the AMF may receive the second UDM service request message sent by the UDM. Based on the second UDM service request message, the AMF may send to the UE, a DL NAS message (e.g., DL NAS Transport, Registration Accept, UE configuration Update Command). The DL NAS message may comprise the network access information. For example, the network access information may further comprise the indication of whether acknowledgement of reception is required or not. If the DL NAS message comprises the indication of whether acknowledgement of reception is required, the UE may send an UL NAS message (e.g., UL NAS Transport, UE configuration update complete) to the AMF. For example, the UL NAS message may comprise a SoR transparent container, comprising UE acknowledgement. The UE may receive the DL NAS message. The UE may perform security check for the DL NAS message. If the UE successfully check the security of the information (e.g., SoR transparent container) of the DL NAS message, the UE may include the UE acknowledgement into the SoR transparent container. The UE may send to the AMF, a UL NAS message comprising the SoR transparent container.

In an example, based on receiving the network access information, the UE may use the received network access information and/or the UE may apply the network access information. For example, based on that the received network access information does not comprise an activation information, the UE may start to use the received network access information and/or the UE may apply the network access information. For example, based on receiving the network access information, the UE may not use any more the previous network access information. Based on the network access information, the UE may trigger search/finding of a network associated with the network access information and/or the UE may change registration from a network to another network, based on a result of the search. For example, if the UE finds one or more cells for a network based on the network access information, the UE may select the network and/or may send a registration request message to the network. For example, the selected network may be a hosting network.

Figure 26:
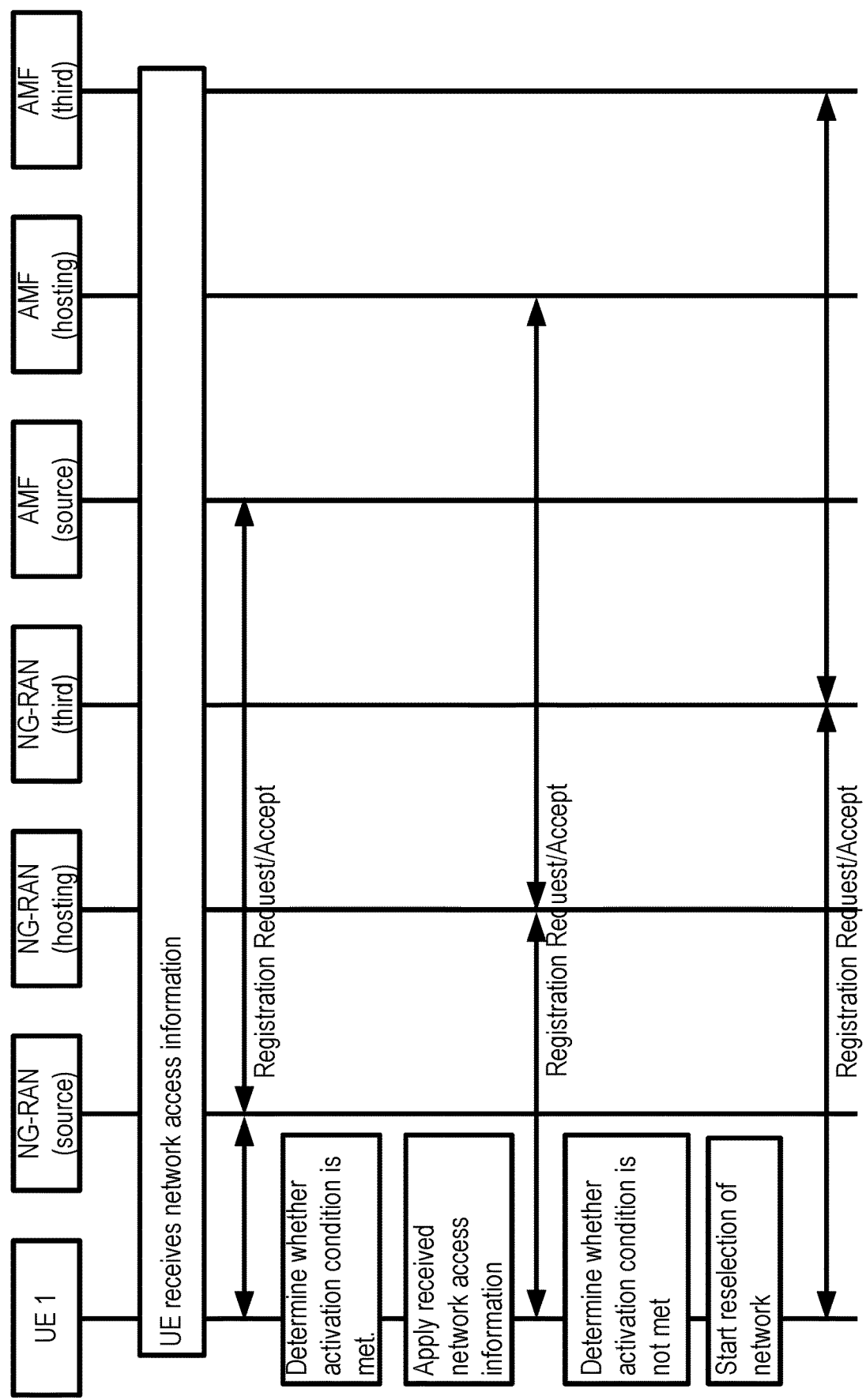
FIG. 26 is an example diagram of an aspect of an embodiment of the present disclosure.

FIG. 26 depicts one example embodiment of the present disclosure. In an example, the UE may use the delivered network access information.

For example, the UE may be using a first network access information. Based on the first network access information, the UE may select a network (e.g., a first network) and/or may register to the network. The UE may receive a network access information (a second network access information). The UE may receive the network access information (the second network access information), as illustrated in the examples of FIG. 20, 21, 22, 24. The second network access information may comprise the activation information.

In an example, reverting back to FIG. 26, based on one or more information of the second network access information, the UE may determine when and/or where to use the second network access information. For example, the UE may determine whether it needs to use the second network access information. For example, the second network access information may comprise the activation information. The activation information may comprise at least one of the validity time, validity location, validity criterion, and/or the like. For example, the validity time (e.g., at 3:00 PM, from 9:00 AM to 1:00 PM, Tuesday, weekdays, etc.) may indicate when the UE applies the second network access information. For example, if the validity time indicates a certain time (e.g., at 2:00 PM), and if the time is a first time (e.g., 1:59 PM), the UE may determine that the UE does not apply the second network access information. For example, if the validity time indicates a certain time (e.g., from 3:00 PM to 5:00 PM), and if the time is a second time (e.g., 3:00 PM), the UE may determine that the UE applies the second network access information. For example, the validity location (e.g., at TAC=1, GPS coordinate (30.0N, 125.0E), etc.) may indicate where the UE applies the second network access information. For example, if the validity location indicates a certain location (e.g., TAC=2, 3, 5), and the cell to which the UE is associated indicates a first location (e.g., TAC=4), the UE may determine that the UE does not apply the second network access information. For example, if the validity location indicates a certain location (e.g., GPS coordinate (from 25.0N to 25.1N, from 30.0E to 30.1E)), and the location of the UE is a second location (e.g., GPS coordinate (25.05N, 30.05E)), the UE may determine that the UE applies the second network access information (e.g., a second network access information).

In an example, based on the determination that the UE applies the second network access information, the UE may apply the second network access information. For example, the UE may not use any more the previous network access information (e.g., the first network access information) and/or the UE may start to use the second network access information for which the associated activation information applies. For example, the UE may use the first network access information used before the UE receives the second network access information. In one example, the second network access information may comprise the activation information and/or the first network access information may not comprise the activation information. For example, the UE may use the first network access information when a condition (e.g., valid time, valid location, valid condition) of the activation information of the second network access information is not met. For example, the UE may use the second network access information when the condition (e.g., valid time, valid location, valid condition) of the activation information of the second network access information is met. For example, the UE may not use the second network access information if the activation information of the second network access information is not met. For example, for the second network access information, the UE may use the second network access information if the activation information of the second network access information is met. For example, based on the determination that the UE applies the second network access information, the UE may start to use the second network access information, may start to fine a cell of a network indicated by the second network access information, and/or may trigger change from using the first network access information to the second network access information.

In an example, based on one or more information of the second network access information, the UE may trigger search of a network associated with the second network access information and/or may change registration from the first network to another network based on a result of the search. For example, if the UE finds one or more cells for a network (a second network) based on the second network access information, the UE selects the second network and/or may send a registration request message to the second network. For example, the selected second network may be a hosting network and/or the second network access information may comprise information of the second network.

In an example, the UE may start to use/apply the second network access information. The UE may check whether the activation information of the second network access information is met. If the condition indicated by the activation information of the second network access information is not met any more, the UE may stop using the second network access information. For example, based on that the UE stops using the second network access information, the UE may perform de-registration with the second network. For example, based on that the UE stops using the second network access information, if a third network access information is available and/or if one or more conditions of the activation information of the third network access information are met, the UE may start to use the third network access information. For example, based on that the UE stops using the second network access information, if the first network access information is available and/or if the first network access information does not comprise an activation information for the first network access information, the UE may start to use the first network access information. Based on the first network access information and/or based on the third network access information, the UE may start to search one or more cells of one or more networks indicated in the first network access information and/or the third network access information. Based on the search, if the UE finds one or more cells of the one or more networks indicated by the first network access information and/or the third network access information, the UE may select a network of the one or more networks. Based on the selected network, the UE may send a registration message to a core network node of the selected network.

Figure 27:
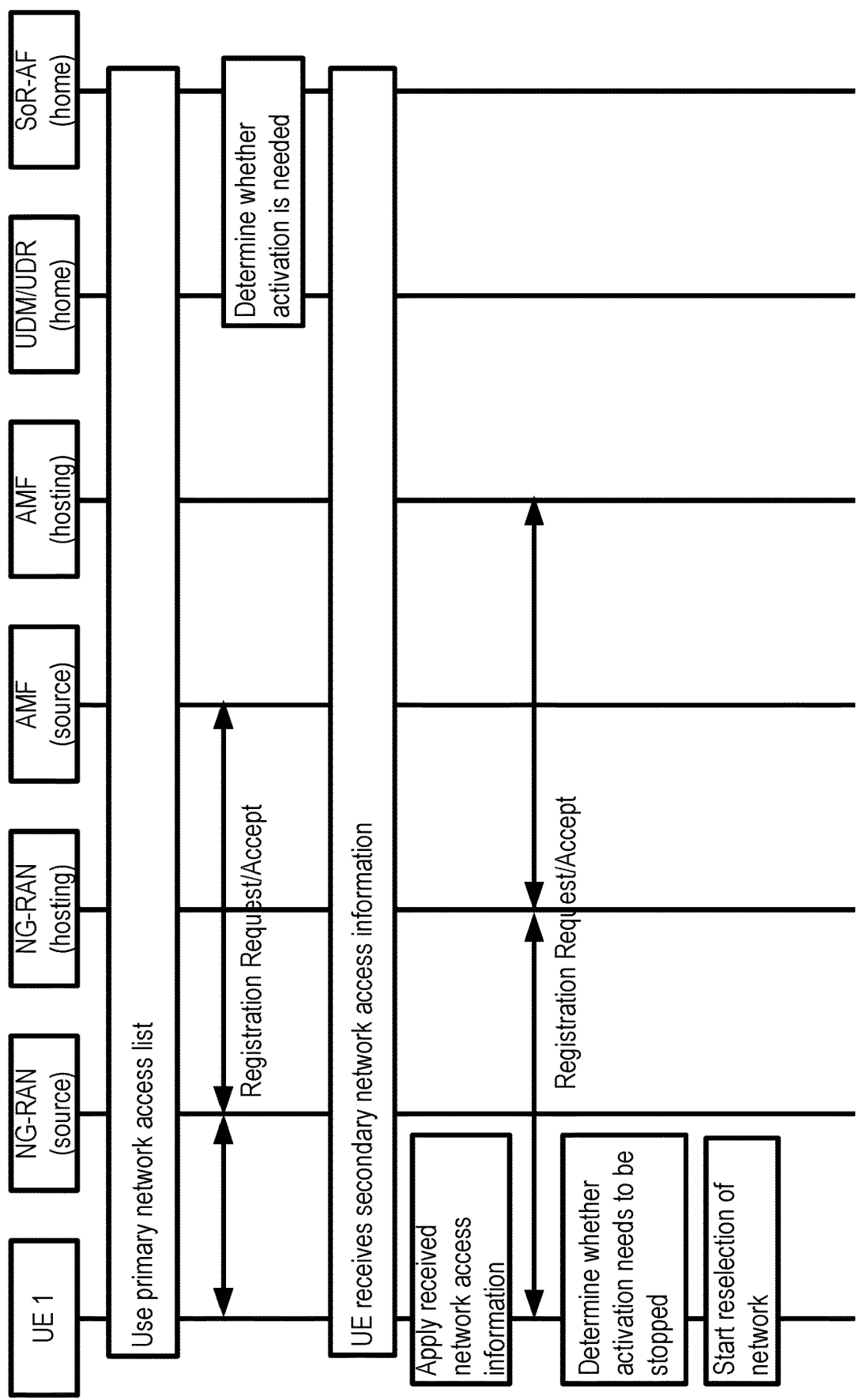
FIG. 27 is an example diagram of an aspect of an embodiment of the present disclosure.

FIG. 27 depicts one example embodiment of the present disclosure. In an example, the UE may use the network access information.

For example, the UE may be using a primary network access information. Based on the primary network access information, the UE may select a network (e.g., a first network) and/or may register to the network. For example, the primary network access information may be the network access information that UE may use when no other network access information (e.g., a secondary network access information) is delivered.

In an example, a core network node (e.g., SoR-AF, UDM, PCF, etc.) may determine whether the condition of the event information (e.g., based on the network access assistance information), is met. If the core network node determines that the condition is met, the core network node may send a network access information (a secondary network access information) to the UE. For example, the secondary network access information may not comprise the activation information. The UE may receive the network access information (the secondary network access information) sent by the core network, as illustrated in the example of FIG. 25.

In an example, reverting back to FIG. 27, based on receiving the secondary network access information, the UE may determine to use the secondary network access information. Based on the determination, the UE may start to apply the secondary network access information. For example, the UE may not use any more the previous network access information (e.g., the primary network access information) and/or the UE may start to use the secondary network access information.

In an example, based on one or more information of the secondary network access information, the UE may trigger search of a network indicated by the secondary network access information. For example, the UE may change registration from the first network to another network based on a result of the search. For example, if the UE finds one or more cells for a network (a second network) based on the secondary network access information, the UE selects the second network and/or may send a registration request message to the second network. For example, the selected second network may be a hosting network and/or the second network access information may comprise information of the second network.

In an example, the UE may apply the secondary network access information. For example, the secondary network access information may comprise a deactivation information. The deactivation information may comprise one or more condition when the UE may stop using the secondary network access information. For example, the deactivation information may indicate a first time (e.g., 10:00 AM). The UE may check whether a time is the time indicated in the deactivation information. For example, if the time (e.g., 09:59 AM) is not the first time, the UE may continue to use the secondary network access information. For example, if the time (e.g., 10:00 AM) is the first time, the UE may stop using the secondary network access information and/or the UE may start to use the primary network access information.

In an example, based on starting use of the primary network access information, the UE may start to search one or more cells of one or more networks indicated in the primary network access information. Based on the search, if the UE finds one or more cells of the one or more networks, the UE may select a network of the one or more networks. Based on the selected network, the UE may send a registration message to a core network node of the selected network.

Figure 28:
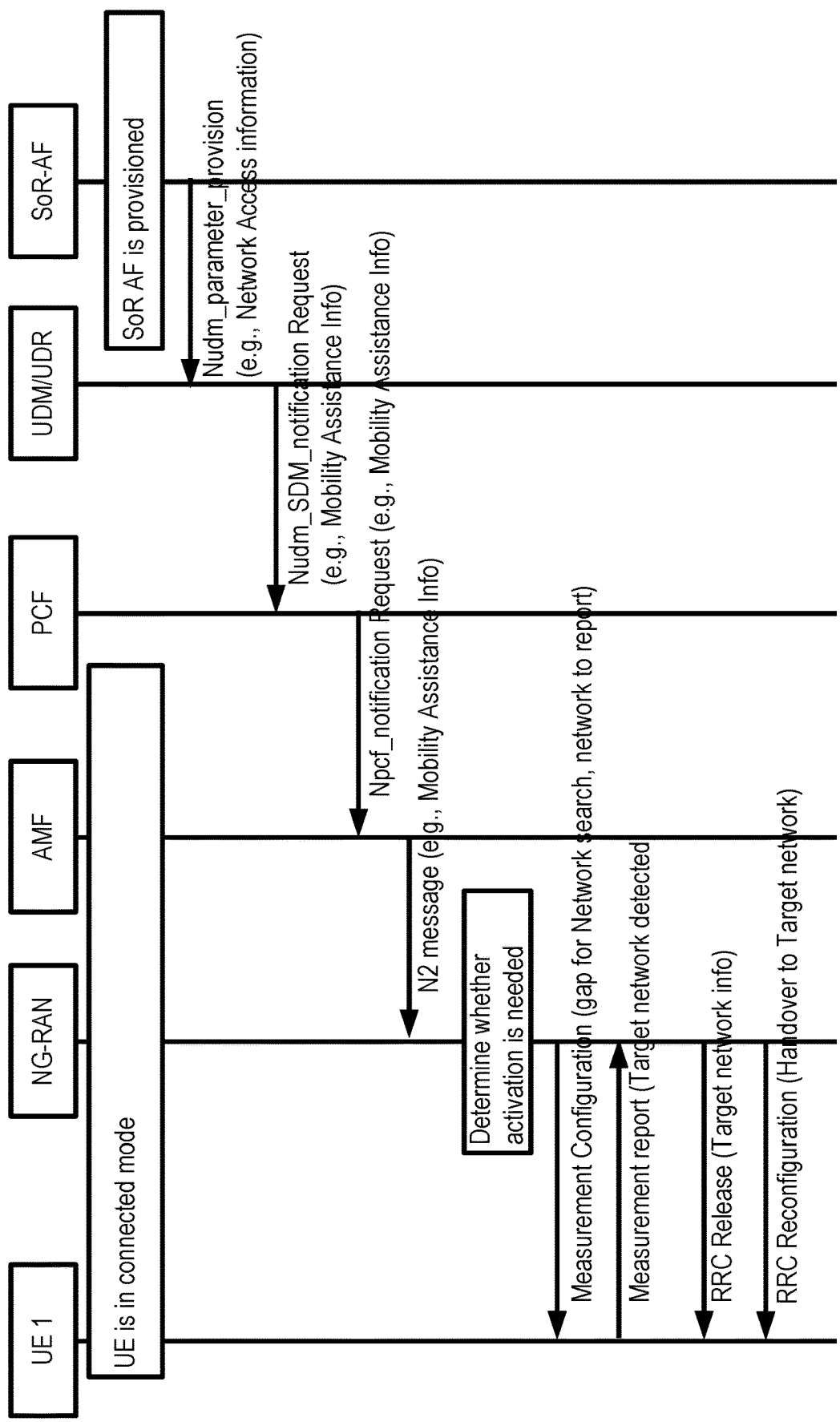
FIG. 28 is an example diagram of an aspect of an embodiment of the present disclosure.

FIG. 28 depicts one example embodiment of the present disclosure. In an example, one or more network nodes may generate a mobility assistance information, to assist for a NG-RAN to handle mobility of a UE in RRC connected mode. The RRC connected mode may be an RRC connected state. For example, if the UE has an active PDU session, the UE may be in RRC connected mode and/or may have a RRC connection with the NG-RAN.

In an example, the SoR-AF may generate the network access information for the UE. As illustrated in the examples of FIG. 20, 21, 22, 23, the SoR-AF may have the network access assistance information and/or the SoR-AF may generate the network access information, based on the network access assistance information.

In an example, reverting back to FIG. 28, the SoR-AF may send a first UDM service request (e.g., Nudm_Parameter_Provision request) message, to a UDM (e.g., UDM, UDR). The first UDM service request message may comprise at least one of the network access information, the identifier of the UE, the network access policy assistance information, and/or the like. The identifier of the UE may indicate the UE to which the network access information and/or the network access policy assistance information may apply. In an example, the UDM may receive from the SoR-AF, the first UDM service request message.

In an example, the UDM may store the received network access information and/or the network access policy assistance information of the first UDM service request message. Based on the received first UDM service request message, the UDM may send a second UDM service request (e.g., Nudm_SDM_Notification request) message, to a PCF associated with the UE. For example, to receive the second UDM service request message, the PCF may register its address to the UDM and/or the UDM may store the address of the PCF. Based on the registered address, the UDM may send the second UDM service request message to the PCF. For example, the second UDM service request message may comprise at least one of the network access information, the network access policy assistance information and/or the identifier of the UE.

In an example, the PCF may receive the second UDM service request message sent by the UDM. Based on the network access policy assistance information and/or the network access information of the second UDM service request message, the PCF may construct a network access policy information for the UE. In response to receiving the second UDM service request message, the PCF may send to the AMF, a PCF service request (e.g., Npcf_AMPolicyControl_Create response, Npcf_AMPolicyControl_Update response, Policy response, Npcf_AMPolicy_Notify, etc.) message. The PCF service request message may comprise at least one of the network access information and/or the network access policy information. In one example, the network access information may comprise the network access policy information. For example, the network access policy information may comprise the mobility assistance information. For example, the mobility assistance information may indicate information of one or more networks that the NG-RAN may handover the UE to. For example, a first network (e.g., a first hosting network) may allow the UE to access the first network and/or a second network (e.g., a second hosting network) may not allow the UE to access the second network. The mobility assistance information may indicate that the UE may use the first network and/or that the UE may not use the second network. For example, the mobility assistance information may comprise a validity information, indicating when and/or where the information of one or more networks may be used or valid.

In an example, the AMF may receive the PCF service request message from the PCF. Based on the network access information and/or the network access policy information of the PCF service request message, the AMF may determine to provide, to the NG-RAN, information that may assist the NG-RAN to control mobility of the UE. For example, based on the network access information and/or the network access policy information received via the PCF service request message, the AMF may generate the mobility assistance information. In response to receiving the PCF service request message, the AMF may send to the NG-RAN, a N2 message (e.g., Initial Context Setup, UE Context Modification). For example, the N2 message may comprise the mobility assistance information and/or network access information.

In an example, the NG-RAN may receive the N2 message sent by the AMF. Based on the mobility assistance information of the N2 message, the NG-RAN may determine whether the NG-RAN may start to use the mobility assistance information. For example, if the mobility assistance information does not comprise the validity information (e.g., when and/or where the mobility assistance information applies), the NG-RAN may start to use the mobility assistance information. For example, if the mobility assistance information comprises the validity information, the NG-RAN may determine whether one or more conditions indicated by the validity information are met or not. For example, the validity information may indicate a first time (e.g., 09:00 AM) and/or a first location (e.g., cell A, TA B). For example, the NG-RAN may determine whether the first time indicated by the validity information is met. For example, if a time (e.g., 08:59 AM) is not the first time, the NG-RAN may not start to use the mobility assistance information. For example, if a time (e.g., 09:00 AM) is the first time, the NG-RAN may start to use the mobility assistance information. For example, the NG-RAN may determine whether the first location indicated by the validity information is met. For example, if a current location (e.g., TA B) is not within the first location, the NG-RAN may not start to use the mobility assistance information. For example, if a current location (e.g., cell A) is within the first location, the NG-RAN may start to use the mobility assistance information.

In an example, based on the determination to start to use the mobility assistance information, the NG-RAN may send a RRC configuration message (e.g., RRCReconfiguration, RRCResume) to the UE. For example, the RRC configuration message may comprise a measurement configuration (e.g., measConfig). For example, the measurement configuration may comprise network measurement configuration. The network measurement configuration may comprise information of one or more networks for which the UE may measure and/or report. For example, the NG-RAN may construct the network measurement configuration, based on the mobility assistance information. For example, the network measurement configuration may comprise at least one of one or more identifiers of the one or more networks (e.g., NCC, NMC, NID, name of the network, etc.), information of reporting, and/or measurement gap information for network search. For example, the information of reporting may indicate how/when the UE sends a report to the NG-RAN and/or what the UE reports. For example, information of reporting may indicate that the UE may send the report to the NG-RAN when the UE detects the one or more networks indicated by the network measurement configuration. For example, information of reporting may indicate that the UE may send the report of the one or more networks and/or may indicate one or more frequencies that the one or more networks may use. The measurement gap information for network search may indicate one or more time information when the UE may perform search for the one or more networks. For example, the UE and/or NG-RAN may not send data during a time period indicated by the one or more time information.

In an example, the UE may search for one or more networks, based on the network measurement configuration. For example, based on the measurement gap information for network search, the UE may search for the one or more networks, during the time indicated by the measurement gap information for network search. In an example, the UE may find one or more cells of one or more networks indicated by the network measurement configuration. If the UE finds the one or more cells, the UE may send a measurement report to the NG-RAN. For example, the measurement report may comprise information of the one or more networks that the UE detects. For example, the network measurement configuration may comprise information of a first network and/or a second network. For example, the information of the first network may be an identifier of the first network (e.g., MCC=A, MNC=B, NID=C). For example, the information of the second network may be an identifier of the second network (e.g., network name='host network A'). For example, if the UE detects a third cell, the UE may read via system information of the third cell, information of a network associated with the third cell. For example, the information of the network associated with the third cell may indicate a third identifier (e.g., MCC=A, MNC=B, NID=D) of a third network. Based on that the network measurement configuration does not comprise the identifier of the third network, the UE may not report to the NG-RAN, detection of the third cell and/or the third network. For example, if the UE detects a second cell, the UE may read via system information of the second cell, information of a network associated with the second cell. For example, the information of the network associated with the second cell may indicate the second identifier (e.g., network name='host network A') of the second network. Based on that the network measurement configuration comprise the identifier of the second network, the UE may send a measurement report to the NG-RAN, comprising information of detected networks. For example, the information of detected networks may comprise information of the second cell and/or information of the second network.

In an example, the NG-RAN may receive the measurement report sent by the UE. For example, based on that the measurement report comprise the information of detected networks and/or based on the mobility assistance information, the NG-RAN may determine whether the NG-RAN needs to hand over the UE. For example, based on that the mobility assistance information comprise the information of the detected networks, the NG-RAN may determine to handover the UE to a target network. For example, the target network may be a network indicated in the information of detect networks (e.g., the second network). For example, to handover the UE to the target network (e.g., the second network), the NG-RAN may send a RRC message (e.g., RRC reconfiguration message). The RRC message (e.g., RRC reconfiguration message) may comprise information of the target network, indicating the UE to access a cell of the target network. In one example, based on that the mobility assistance information comprise the information of detected networks, the NG-RAN may determine to release RRC connection to the UE and/or to command the UE to select the target network. For example, based on the determination to release the RRC connection and/or to command the UE to select the target network, the NG-RAN may send a RRC message (e.g., RRC release message). The RRC message (e.g., RRC release message) may comprise information of the target network. The UE may receive the RRC message. Based on information of the target network, the UE may perform cell selection and/or network selection. For example, the UE may select the target network and/or may start registration procedure to the target network.

Figure 29:
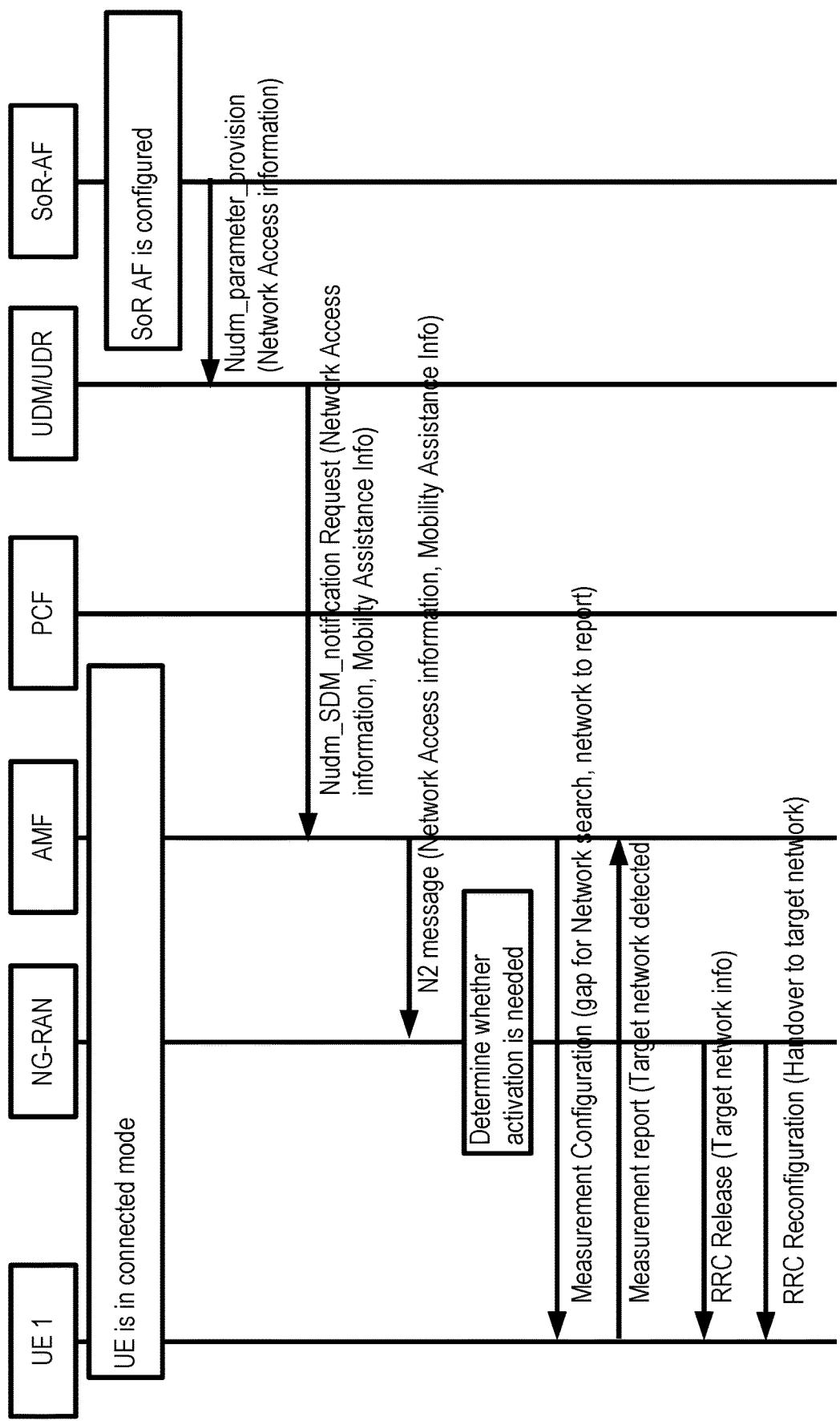
FIG. 29 is an example diagram of an aspect of an embodiment of the present disclosure.

FIG. 29 depicts one example embodiment of the present disclosure. In an example, one or more network nodes may generate a mobility assistance information, to assist for a NG-RAN to handle mobility of a UE in RRC connected mode. For example, if the UE has an active PDU session, the UE may be in RRC connected mode and/or may have a RRC connection with the NG-RAN.

In an example, a SoR-AF may generate a network access information for the UE. As illustrated in the examples of FIG. 20, 21, 22, 23, the SoR-AF may gather the network access assistance information. Based on the network access assistance information, the SoR-AF may generate the network access information.

In an example, reverting back to FIG. 29, the SoR-AF may send a first UDM service request (e.g., Nudm_Parameter_Provision request) message, to a UDM (e.g., UDM, UDR). The first UDM service request message may comprise at least one of the network access information, the identifier of the UE, the network access policy assistance information, and/or the like. The identifier of the UE may indicate the UE to which the network access information and/or the network access policy assistance information may apply. In an example, the UDM may receive from the SoR-AF, the first UDM service request message.

In an example, the UDM may store the received network access information. Based on the received first UDM service request, the UDM may send a second UDM service request (e.g., Nudm_SDM_Notification request) message, to an AMF associated with the UE. For example, to receive the second UDM service request message, the AMF may register its address to the UDM and/or the UDM may store the address of the AMF. Based on the registered address, the UDM may send the second UDM service request message to the AMF. For example, the second UDM service request message may comprise at least one of the network access information and/or mobility assistance information. In one example, the network access information may comprise the mobility assistance information. For example, the mobility assistance information may indicate information of one or more networks that the NG-RAN may handover the UE to. For example, a first network (e.g., a first hosting network) may allow the UE to access the first network and/or a second network (e.g., a second hosting network) may not allow the UE to access the second network. The mobility assistance information may indicate that the UE may use the first network and/or that the UE may not use the second network. For example, the mobility assistance information may comprise a validity information, indicating when and/or where the information of one or more networks may be used or valid.

In an example, the AMF may receive the second UDM service request message from the UDM. Based on the network access information and/or the mobility assistance information of the UDM service request message, the AMF may determine to provide, to the NG-RAN, information that may assist the NG-RAN to control mobility of the UE. In one example, based on the network access information, the AMF may generate the mobility assistance information. In response to receiving the UDM service request message, the AMF may send to the NG-RAN, a N2 message (e.g., Initial Context Setup, UE Context Modification). For example, the N2 message may comprise the mobility assistance information and/or the network access information.

In an example, the NG-RAN may receive the N2 message sent by the AMF. As illustrated in the example of FIG. 28, based on the information delivered via the N2 message, the NG-RAN may determine whether to activate the network measurement configuration, the NG-RAN may send the network measurement configuration to the UE, the NG-RAN may receive the measurement report from the UE, the UE may perform measurements, the UE may send the measurement report to the NG-RAN, the NG-RAN may handover the UE, the NG-RAN may release the RRC connection, the UE may perform handover, and/or the UE may perform network selection.

Figure 30:
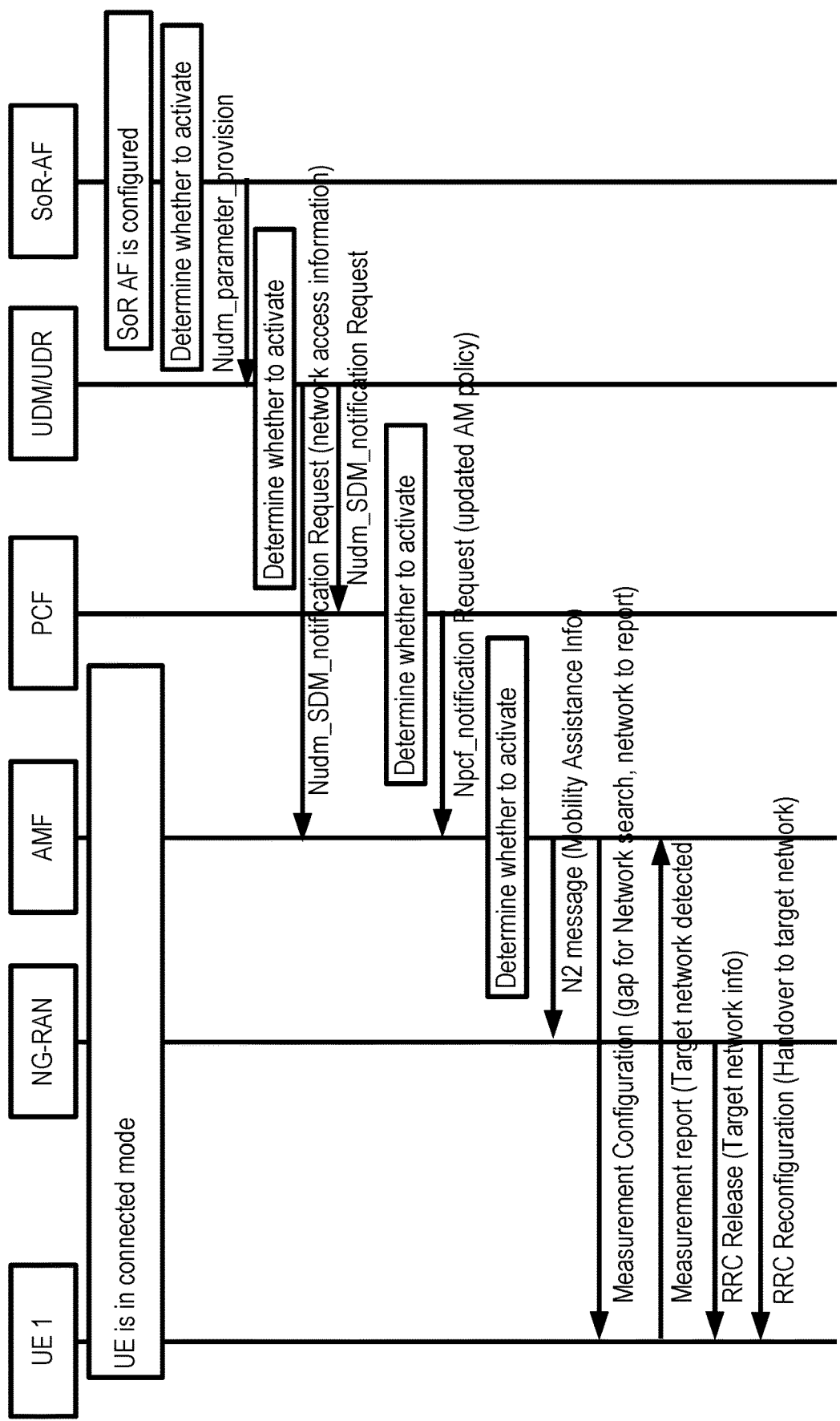
FIG. 30 is an example diagram of an aspect of an embodiment of the present disclosure.

FIG. 30 depicts one example embodiment of the present disclosure. In an example, one or more network nodes may generate a mobility assistance information, to assist for a NG-RAN to handle mobility of a UE in RRC connected mode. For example, if the UE has an active PDU session, the UE may be in RRC connected mode.

In an example, a SoR-AF may generate a network access information for the UE. As illustrated in the examples of FIG. 20, 21, 22, 23, the SoR-AF may gather network access assistance information and/or the SoR-AF may generate the network access information, based on the network access assistance information.

Reverting back to FIG. 30, in one example, the SoR-AF may determine when to send to one or more network nodes, the network access information and/or the network policy assistance information, as illustrated in the example of FIG. 25. Reverting back to FIG. 30, if the SoR-AF determines to send the network access information and/or the network policy assistance information, the SoR-AF may send a first UDM service request (e.g., Nudm_Parameter_Provision request) message, to a UDM (e.g., UDM, UDR). The first UDM service request may comprise at least one of the network access information, the identifier of the UE, the validity information, and/or the network policy assistance information. In one example, the network access information may comprise the mobility assistance information and/or the validity information. The UDM may receive from the SoR-AF, the first UDM service request message.

In one example, based on the received first UDM service request message, the UDM may store the network access information, the identifier of the UE, the validity information and/or the network policy assistance information. In one example, based on the validity information of the received first UDM service request, the UDM may determine whether one or more conditions indicated by the validity information is met. For example, a condition (of the one or more conditions of the validity information) may comprise a time information. If the condition of the time information (e.g., a time is within the time indicated by the time information) is met, the UDM may send a second UDM service request (e.g., Nudm_SDM_Notification request) message, to an AMF associated with the UE. For example, the second UDM service request message may comprise the network access information and/or the mobility assistance information. For example, the mobility assistance information may indicate to the NG-RAN, information of one or more networks that the NG-RAN may handover the UE to and/or that the UE may reselect to. For example, the UDM may construct the mobility assistance information, based on the network access information and/or subscription information of the UE.

In one example, based on the received first UDM service request message, the UDM may store the network access information, the identifier of the UE, the validity information and/or the network policy assistance information. In one example, the UDM may send a third UDM service request message, to a PCF associated with the UE. For example, the third UDM service request message may comprise at least one of the network access information, the network access policy assistance information, the identifier of the UE, and/or the validity information. The PCF may receive the third UDM service request message sent by the UDM.

In one example, based on the validity information of the received third UDM service request, the PCF may determine whether the one or more conditions indicated by the validity information is met. For example, a condition (of the one or more conditions of the validity information) may comprise a time information. If the condition of the time information (e.g., a time is within the time indicated by the time information) is met, the PCF may send to the AMF, a PCF service request (e.g., Npcf_AMPolicyControl_Create response, Npcf_AMPolicyControl_Update response, Policy response, Npcf_AMPolicy_Notify, etc.) message. The PCF service request message may comprise at least one of the network access information, the network access policy information, the validity information, and/or the identifier of the UE. The network access information and/or the network access policy information may comprise the mobility assistance information.

In an example, the AMF may receive the second UDM service request message from the UDM and/or the PCF service request message from the PCF. Based on the second UDM service request message and/or the PCF service request message, the AMF may determine when to send to the NG-RAN, a N2 message (e.g., Initial Context Setup, UE Context Modification). For example, the AMF may use the validity information to determine when to send the N2 message. When the one or more conditions indicated by the validity information is met, the AMF may send the N2 message. For example, when the AMF does not receive the validity information, the AMF may determine to send the N2 message. For example, to control mobility of the UE, the N2 message may comprise the mobility assistance information.

In an example, the NG-RAN may receive the N2 message sent by the AMF. As illustrated in the examples of FIG. 28, 29, based on the N2 message, the NG-RAN may determine whether to activate the network measurement configuration, the NG-RAN may send the network measurement configuration to the UE, the NG-RAN may receive the measurement report from the UE, the UE may perform measurements, the UE may send the measurement report, the NG-RAN may handover the UE, the NG-RAN may release the RRC connection, the UE may perform handover, and/or the UE may perform network selection.

Figure 31:
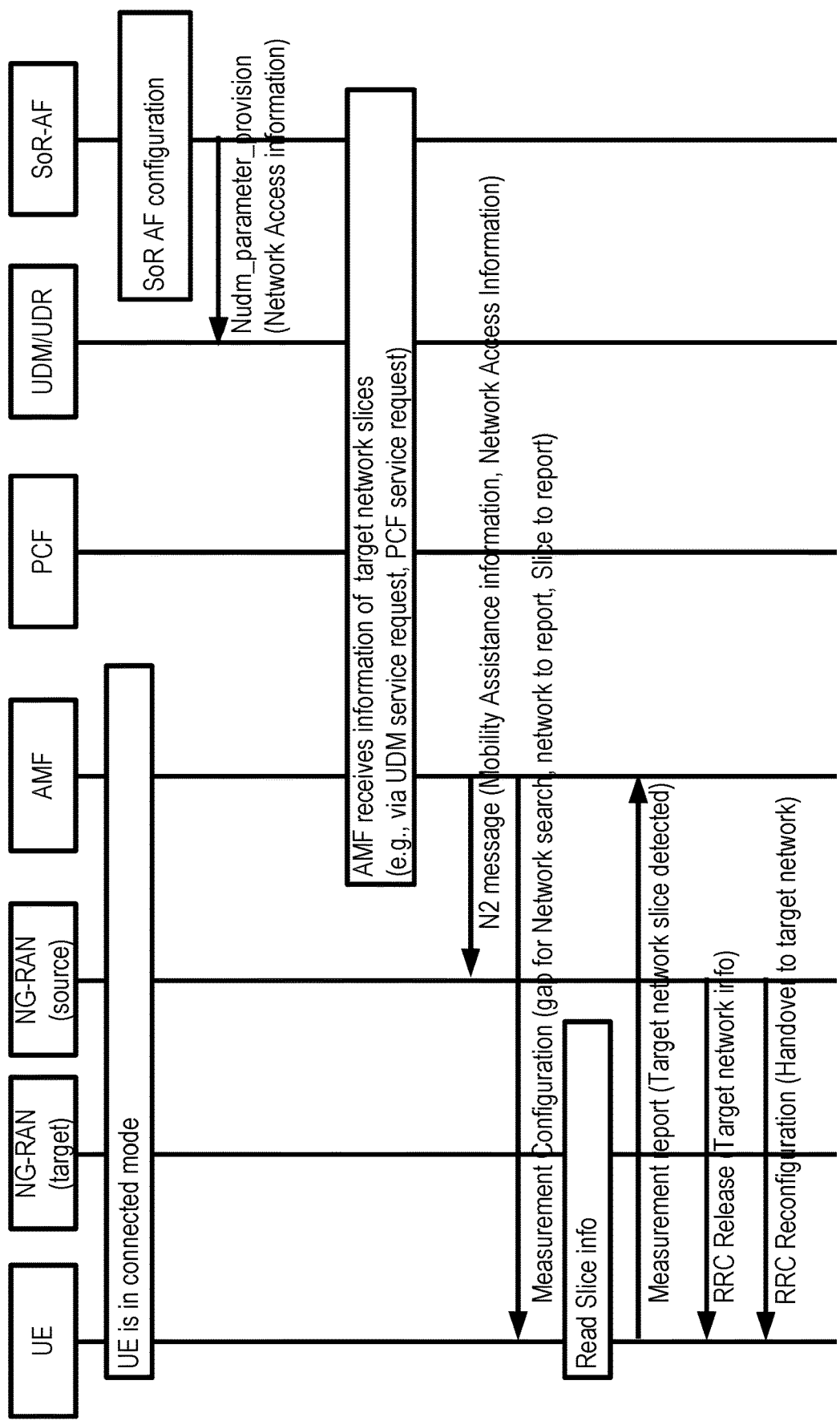
FIG. 31 is an example diagram of an aspect of an embodiment of the present disclosure.

FIG. 31 depicts one example embodiment of the present disclosure. In an example, based on information of one or more network slices provided by one or more networks (e.g., one or more hosting networks), a NG-RAN may determine to handover a UE to the one or more networks.

In an example, an AMF may receive the second UDM service request message from the UDM and/or the AMF may receive the PCF service request message from the PCF, as illustrated in the examples of FIG. 28, 29, 30. Reverting back to FIG. 31, the second UDM service request message and/or the PCF service request message may further comprise information of target network slices. For example, the network access information, the network access assistance information, and/or the mobility assistance information may comprise the information of target network slices. The information of target network slices may comprise information of one or more network slices that the one or more networks indicated by the network access information may provide for the UE. For example, the one or more networks of the network access information may comprise a fifth network and/or a sixth network. The fifth network may provide a fifth network slice (e.g., S-NSSAI 5) and/or the sixth network may provide a sixth network slice (e.g., S-NSSAI 6). The information of target network slices may indicate that the fifth network provides the fifth network slice and/or that the sixth network provides the sixth network slice.

In an example, based on the second UDM service request message and/or the PCF service request message, the AMF may determine to provide, to the NG-RAN, the mobility assistance information that may assist the NG-RAN to control mobility of the UE. For example, to deliver the assistance information, the AMF may construct the mobility assistance information and/or the mobility access information. The AMF may send to the NG-RAN, a N2 message (e.g., Initial Context Setup, UE Context Modification). For example, the N2 message may comprise the mobility assistance information and/or the network access information. For example, the mobility assistance information and/or the network access information may comprise the information of target network slices. The NG-RAN may receive the N2 message sent by the AMF.

In an example, the NG-RAN may use the information of the target network slices delivered by the N2 message. Based on the information of the target network slices, the NG-RAN may send a RRC configuration message (e.g., RRCReconfiguration, RRCResume) to the UE. For example, the RRC configuration message may comprise a measurement configuration (e.g., measConfig). For example, the measurement configuration may comprise network measurement configuration. The network measurement configuration may comprise information of target network slices for which the UE may measure and/or report. For example, the information of the target network slices may comprise at least one of one or more identifiers of the one or more network slices (e.g., S-NSSAIs, etc.), information of reporting, and/or measurement gap information for network search. For example, the information of reporting may indicate how/when the UE sends a report to the NG-RAN and/or what the UE reports. For example, information of reporting may indicate that the UE may send a report to the NG-RAN when the UE detects one or more cells indicating the one or more network slices. For example, information of reporting may indicate that the UE may send the report comprising information of the one or more network slices and/or information of one or more networks broadcasting the information of the one or more network slices. The measurement gap information for network search may indicate one or more time information when the UE may perform search for the one or more network slices. In one example, a network slice (of the one or more network slices) may be identified by an identifier (e.g., S-NSSAI) of the network slice and/or by an identifier of a network slice group that the network slice belongs to.

In an example, the UE may search for one or more cells, for the one or more network slices, and/or the for one or more networks, based on the network measurement configuration. For example, based on the measurement gap information for network search, the UE may search for one or more cells indicating the one or more network slices, during the time indicated by the measurement gap information for network search. If the UE finds the one or more cells indicating the one or more network slices, the UE may send a measurement report to the NG-RAN. For example, the measurement report may indicate information of the one or more network slices that the UE detects/finds, information of the one or more cells indicating the one or more network slices, and/or information of one or more networks associated the one or more cells.

In an example, the NG-RAN may receive the measurement report sent by the UE. For example, based on that the measurement report and/or based on the information of the target network slice, the NG-RAN may determine whether the NG-RAN needs to hand over the UE and/or whether the UE needs to reselect a network. For example, based on that the information of the target network slices comprises the one or more identifiers of the one or more network slices reported by the measurement report, the NG-RAN may determine to handover the UE to a target network. For example, the target network may be a network associated with the network slices reported by the measurement report. For example, to handover the UE to the target network, the NG-RAN may send a RRC message (e.g., RRC reconfiguration message). The RRC message (e.g., RRC reconfiguration message) may comprise information of the target network, indicating the UE to access a cell of the target network. In one example, the NG-RAN may determine to release RRC connection to the UE and/or to command the UE to select the target network. For example, based on the determination to release the RRC connection and/or to command the UE to select the target network, the NG-RAN may send a RRC message (e.g., RRC release message). The RRC message (e.g., RRC release message) may comprise information of the target network. The UE may receive the RRC message. Based on information of the target network, the UE may perform cell selection and/or network selection. For example, the UE may select the target network and/or may start registration procedure to the target network.

Figure 32:
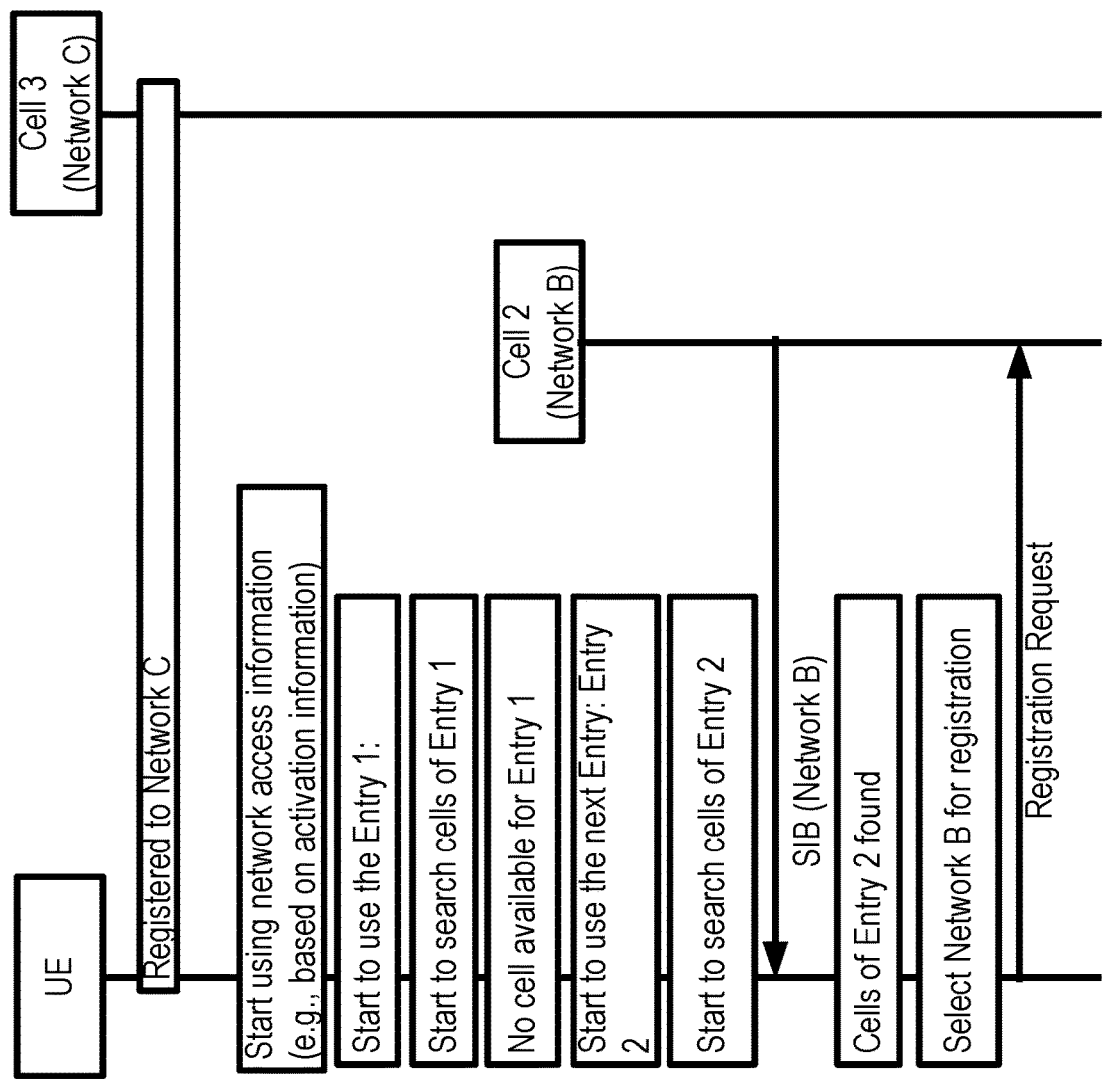
FIG. 32 is an example diagram of an aspect of an embodiment of the present disclosure.
Figure 32:
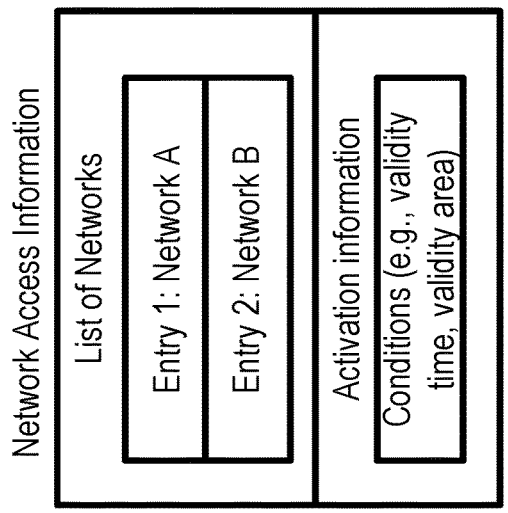

FIG. 32 depicts one example embodiment of the present disclosure. In an example, a UE may select a network using the network access information and/or may perform registration toward the selected network.

In an example, the UE may have a network access information. For example, the network access information may comprise one or more entries. For example, the one or more entries comprise a first entry (Entry 1) indicating a first network (Network A) and/or a second entry (Entry 2) indicating a second network (Network B).

In an example, the UE may register to a third network (Network C). For example, the UE may be in a third cell (cell 3) of the third network.

In an example, the UE may determine to use the network access information. For example, based on the validity time and/or the validity location of the network access information, the UE may start to use the network access information. For example, the UE may start to use the first entry of the network access information. Based on that the first entity indicates the first network, the UE may attempt to find and/or search a cell of the first network. For example, if there is no cell of the first network near the UE, the UE may fail to find a cell of the first network. Based on that there is no cell for the first network, the UE may start to use the next entry of the network access information. For example, the UE may start to use the second entry of the network access information. The UE may attempt to find and/or search a cell of the second network. For example, the UE may find a second cell (cell 2) of the second network. For example, the UE may receive from the second cell, a SIB indicating the second network. Based on that the UE finds the cell of the second network, the UE may select the second network. The UE may select the second network, to perform a registration procedure. For example, the UE may send a registration request message to the selected network. Based on that the UE selects the second network, the UE may not select the third network and/or the UE may stop selecting the third network. Based on that the UE does not select the third network, the UE may not perform registration to the third network and/or may perform de-registration procedure to the third network.

In one example, the UE may start search a network search procedure and/or a cell search procedure. Based on the network search procedure and/or the cell search procedure, the UE may find one or more cells. From the one or more cells, the UE may determine information of the one or more networks (detected networks) associated with the one or more cells by reading SIBs of the one or more cells. For the one or more networks (detected networks), the UE may determine whether the network access information comprise information (e.g., identifiers) of a network (of the detected networks). If the network access information comprises the information of the network (of the detected networks), the UE may select the network and may perform registration to the network.

Figure 33:
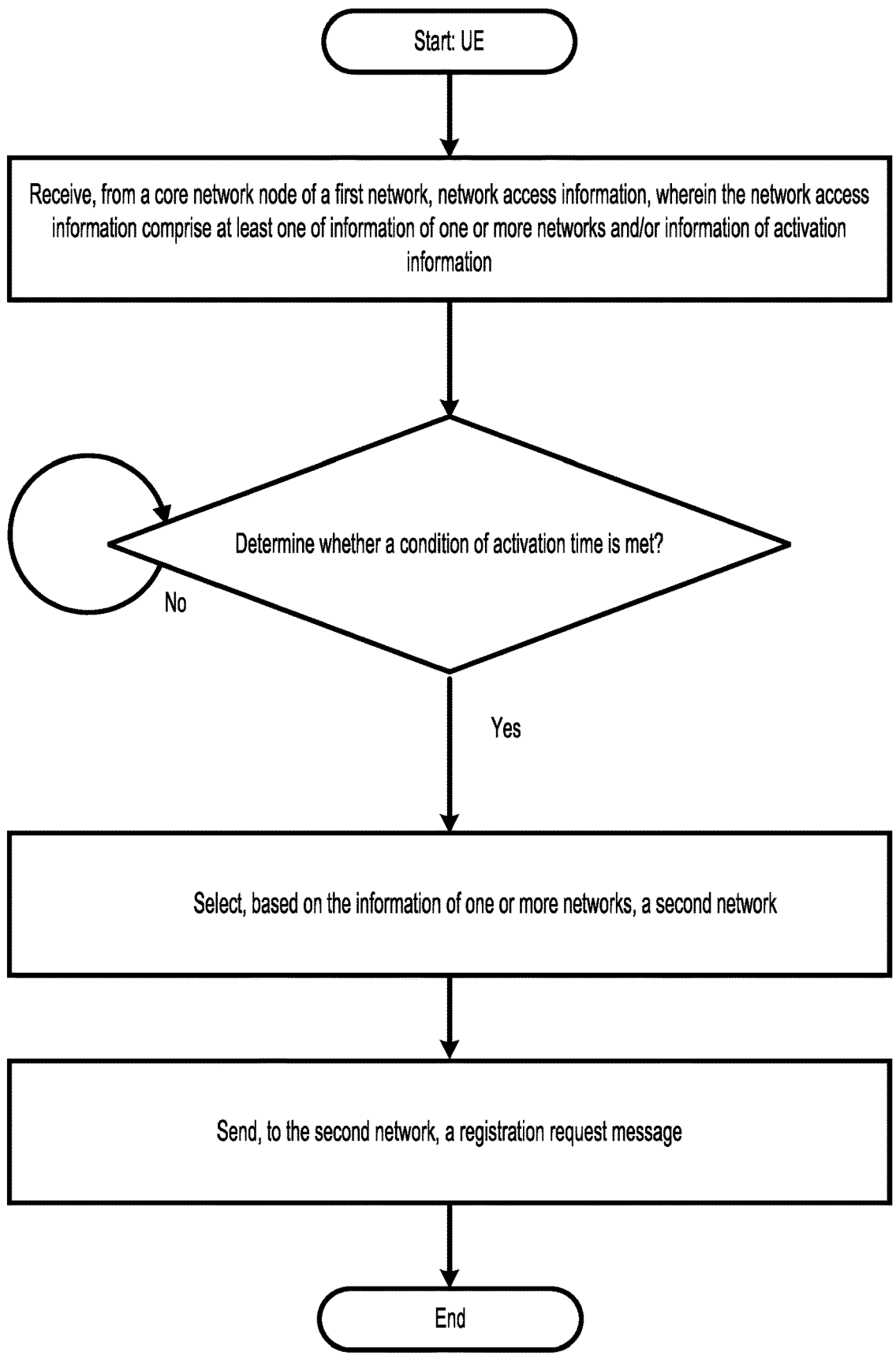
FIG. 33 is an example diagram of an aspect of an embodiment of the present disclosure.

FIG. 33 depicts one example embodiment of the present disclosure. In an example, a UE may receive and/or may apply the network access information, based on an activation information.

In an example, the UE may receive from a core network node (e.g., AMF, PCF, UDM, SoR-AF), a network access information. The network access information may comprise at least one of information of one or more networks (e.g., networks that UE is allowed to access, networks that the UE needs to switch to, target networks, hosting networks), and/or an activation information.

In an example, the UE may determine whether the one or more conditions indicated by the activation information are met. For example, the one or more conditions may indicate validity time information when the network access information is valid/applicable, and/or validity area information where the network access information is valid/applicable. If the one or more conditions are met, the UE may start to use the network access information. For example, the UE may start to use the information of one or more networks. If the one or more conditions are not met, the UE may not use the network access information.

In an example, based on the network access information, the UE may start to search for one or more cells of the one or more networks indicated by the information of one or more networks. For example, the UE may start by attempting to find a cell of a first network (e.g., highest priority network among the one or more networks). If the UE finds the cell of the first network, the UE may select the first network to send a registration request. The UE may send the registration request to the first network. If the UE fails to find the cell of the first network and/or the UE fails to register to the first network, the UE may attempt to find a cell of a second network (e.g., second highest priority network among the one or more networks). If the UE finds the cell of the second network, the UE may select the second network to send a registration request. If the UE selects the second network, the UE may send the registration request. Iteration of selection may continue until there is no more network to attempt among the one or more networks.

In an example, the UE may receive from a core network node (e.g., AMF, SoR-AF, UDM, PCF, NEF) of a first network, a message (e.g., DL NAS transport, UE configuration update, UE parameter update, secure packet, transparent container, registration accept, etc.) comprising a network access information for selecting a network. The first network may comprise at least one of a serving network to which the UE is registered and/or a home network which owns/manages the subscription of the UE. In response to receiving the message, the UE may send a response (e.g., UE configuration update, UL NAS transport, Secure packet, transparent container, etc.) to the core network node, to indicate reception of network access information and/or to indicate successful security check of the network access information. For example, the UE may send an indication that the UE supports the handling of the activation information and/or the network access information. Based on the indication, the core network node may send to UE the network access information comprising the activation time.

In an example, the UE may use the network access information for selecting a network. In one example, the UE may perform search of one or more cells of the selected network. In one example, the UE may perform search/find/detect one or more cells, may identity one or more networks associated with one or more found/detected cells, may select a network from the one or more networks, and/or may perform a registration procedure to the selected network. For example, for the selection of the network, the UE may use the network access information. For example, the UE may attempt to search/find/detect one or more cells of one or more networks for which the network access information indicates. For example, the UE may not attempt to search/find/detect one or more cells of one or more networks for which the network access information does not indicate. For example, the UE may search/find/detect one or more cells of one or more networks, may identify one or more networks of the one or more cells. The one or more networks may comprise a first one or more networks for which the network access information may indicate and/or a second one or more networks for which the network access information may not indicate. The UE may select a network among the first one or more networks, and/or may perform registration to the network that is selected.

In an example, the network access information may comprise at least one of information of one or more networks (list of networks), activation information indicating one or more conditions in which the list of networks is valid/used, and/or information of one or more access network type. The list of networks may comprise information of one or more networks for which the UE may access and/or may be allowed to access. For example, the list of networks may comprise information of one or more hosting networks. For example, the list of networks may comprise one or more identifiers of the one or more networks. The one or more identifiers of the one or more networks may comprise at least one of one or more mobile country codes, one or more mobile network codes, one or more network identifiers (NIDs), and/or one or more names of the one or more networks. For example, the one or more conditions may comprise at least one of a validity time information and/or a validity area information. For example, the validity time information may indicate one or more time periods when the UE is allowed to use the list of networks for network selection. For example, the one or more time periods may comprise at least one of a start time indicating the time when the UE may use the list of networks, an end time indicating the time when the UE may stop using the list of networks, and/or a duration indicating the amount of time during which the UE may use the list of networks. For example, the validity area information may indicate one or more location information where the UE is allowed to use the list of networks for network selection. For example, the one or more location information may comprise at least one of an information of one or more area, an information of one or more geographical coordinates, an information of one or more cell identifiers, and/or an information of one or more tracking areas. For example, the one or more access network types may indicate one or more access network types (e.g., NG-RAN, E-UTRAN, GSM, E-UTRA, NR, etc.) for which the UE is allowed to use for search/selection/registration to a network (of the list of networks).

In an example, based on the activation information, the UE may determine whether the UE is allowed to use the list of networks. For example, to determine whether the UE is allowed to use the list of networks, the UE may determine whether one or more conditions of the activation information are met or not. If the one or more conditions are met, the UE may determine that the UE is allowed to use the list of networks, that the UE is allowed to access a network (of the list of networks) and/or that one or more networks are activated. If the one or more conditions are not met, the UE may determine that the UE is not allowed to use the list of networks, and/or that the UE is not allowed to access the one or more networks (of the list of networks). In an example, if the network access information does not comprise the activation information, the UE may start using the list of networks.

In an example, based on determining that the UE is allowed to use the list of networks and/or that the UE is allowed to access a network (of the list of networks), the UE start to use the list of networks. For example, the UE may start searching/detecting/finding one or more cells indicated by the list of networks. For example, if the one or more cells associated with the list of networks are searched/detected/found, the UE may select a network (e.g., a second network) among the one or more networks associated with the one or more cells. Based on selecting the network, the UE may start a registration procedure to the selected network. For example, the UE may send a registration request message to the selected network. The registration request message may comprise at least one of an identity of the UE, a cause of registration, one or more identifier of network slices, an identifier of the first network, an identifier of the home network, and/or a capability of the UE. In response to sending the registration request message, the UE may receive from the second network, a registration accept message. For example, if the UE fails find a cell of the second network, the UE may not select the second network.

In an example, based on the activation information, the UE may determine whether the UE is no more allowed to use the list of networks. For example, to determine whether the UE needs to stop using the list of networks, the UE may determine whether one or more conditions of the activation information are met or not. If the one or more conditions are not met any more, the UE may determine that the UE needs to stop using the list of networks. In one example, a network node of the second network may send to the UE, an indication, to indicate that the UE needs to de-register from the second network and/or that the UE is not allowed to use the second network anymore. In one example if the UE receives the indication from the second network, the UE may not use the network access information, may stop using the list of networks, may start selecting a third network, and/or may stop selecting the second network.

In an example, based on the determination that the UE needs to stop using the list of networks, the UE may search for one or more cells. For example, the UE may search for one or more cells, based on a second network access information. For example, the UE may select the third network, if the UE finds a cell of the third network indicated by the second network access information. The UE may send a registration request message to the third network. In an example, the UE may use the second network access information for the registration to the first network. For example, the third network may comprise at least one of the first network and/or a network indicated by the second network access information.

Figure 34:
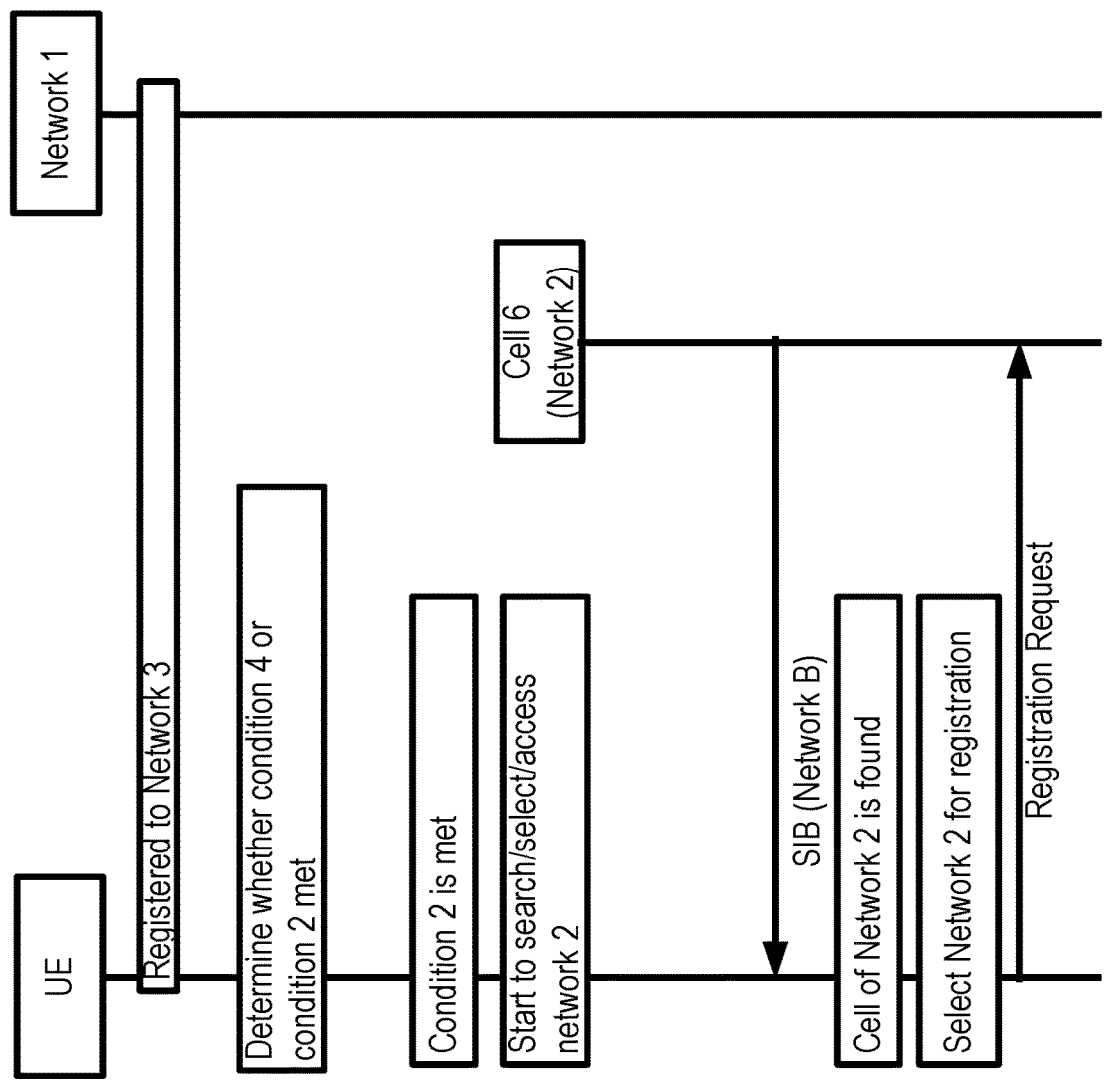
FIG. 34 is an example diagram of an aspect of an embodiment of the present disclosure.
Figure 34:
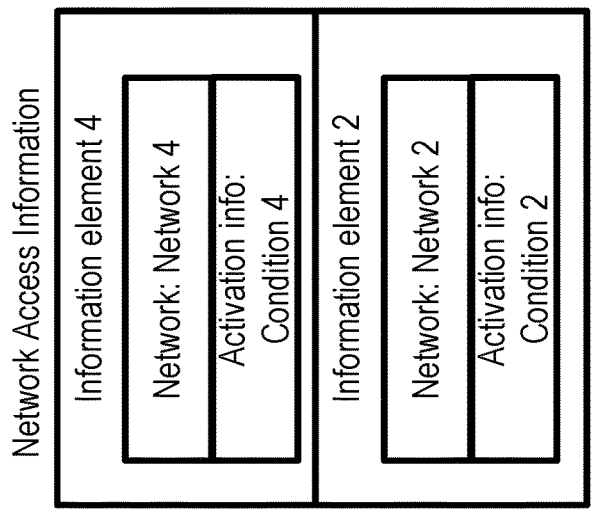

FIG. 34 depict one example embodiment of the present disclosure. In an example, a UE may select a network using the network access information and/or may perform registration toward the selected network.

In an example, a UE may receive from a core network node of a first network (e.g., network 1), network access information. The network access information may comprise information of one or more networks and/or one or more activation information for the one or more networks. For example, the information of one or more networks of the network access information may comprise information of a fourth network (network 4) and/or information of a second network (network 2). For example, the one or more activation information may comprise an activation information for the fourth network and/or an activation information for the second network. The activation information for the fourth network may comprise a fourth condition (condition 4) and/or the activation information for the second network may comprise a second condition (condition 2). For example, the fourth condition may indicate a fourth time period (e.g., from 2:00 PM to 4:00 PM) and/or the second condition may indicate a second time period (e.g., from 5:00 PM to 6:00 PM). For example, an activation information for a network may indicate when the UE is allowed to access/search/select/register to the network. For example, based on the second condition of the second activation information associated with the second network, the UE may be allowed to access the second network for the second time period. For example, an activation information for a network may indicate when an entry (e.g., information element, entry in the network access information) associated with the activation information may be used by the UE. For example, the information of one or more networks may comprise one or more identifier of the one or more networks.

In an example, for an activation information (of the one or more activation information), the UE may determine whether the condition indicated by the activation information is met or not. If the condition is met, the UE may determine that the UE may be allowed to access/use/select/register the network associated with the activation information. If the condition is not met, the UE may determine that the UE is not allowed to access/use/select/register the network associated with the activation information. For example, at a time (e.g., 5:30 PM), based on that the time meets the second condition, the UE may determine that the UE is allowed to access/use/select/register to the second network. For example, at the time (e.g., 5:30 PM), based on that the time does not meet the fourth condition, the UE may determine that the UE is not allowed to access/use/select/register to the fourth network. Based on the determination that the UE is allowed to access the second network, the UE may search a cell of the second network, the UE may select the second network and/or the UE may send a registration request message to the second network.

In one example, based on the network access information, the UE may determine whether the one or more conditions of the network access information for the second network are met or not. For example, if the one or more conditions for the second network are met, the UE start to use search/finding of a cell of the second network. For example, at the time (e.g., 5:30 PM), the UE may determine that the condition for the second network is met. Based on the determination, the UE may determine that the UE is allowed to access the second network. Based on the determination, the UE may start to search for a cell of the second network. If the UE finds the cell of the second network, the UE may select the second network and/or may send a registration request message to the second network. For example, if the UE fails to find the cell of the second network, the UE may not select the second network and/or may not send a registration request message to the second network. For example, at the time (e.g., 11:00 AM), the UE may determine that the condition for the second network is not met. Based on the determination that, the UE may determine that the UE is not allowed to access the second network. Based on the determination, the UE may not start search of a cell of the second network.

In an example, a UE may receive from a core network node (e.g., AMF, SoR-AF, UDM, PCF, AF) of a first network, a network access information. The network access information may comprise at least one of an identifier of a second network and/or activation information of the second network. In an example, the UE may determine whether the second network is activated/active, based on the activation information. For example, the activation of the network access information may indicate when the second network is active/activated. For example, the second network (e.g., a hosting network) may operate for one or more time periods (e.g., from 10:00 AM to 5:00 PM, from Monday to Friday, etc.) and/or at one or more areas (e.g., geographic coordinate (x1, y1, z1), in a city A, etc.). For example, the activation information for the second network may indicate the second network may operate and/or may be active for the one or more time periods and/or at the one or more areas. Based on the activation information for the second network, the UE may determine whether the second network is active and/or operates. For example, at a first time (e.g., 08:00 AM), the UE may determine that the second network is not active. For example, at a second time (e.g., 1:00 PM), the UE may determine that the second network is active. For example, based on that the network access information comprises the information of the second network, the UE may determine that the UE is allowed to access the second network when the second network is activated. In an example, based on the determination that the second network is active/activated, the UE may start searching of a cell of the second cell and/or the UE may select the second network. In one example, the UE may select the second network, if the UE finds/detects the cell of the second network. Based on that the UE selects the second network and/or based on that the cell of the second network is found/detected, the UE may send a registration request message to the second network.

In an example, a UE may receive from a core network node (AMF, SoR-AF, UDM) of a first network, network access information. The network access information may assist the UE to select a network (e.g., a hosting network). The network access information may comprise at least one of information of one or more networks and/or activation information. In an example, based on the activation information, the UE may determine to use the network access information. For example, the UE may use the information of the one or more networks, to search/select a network indicated by the information of the one or more networks.

In an example, a UE may receive from a core network node (AMF, SoR-AF, UDM, PCF, AF) of a first network, a first network access information for selecting a network. For example, the first network access information comprises information of one or more networks and/or activation information. The information of one or more networks may comprise information of a second network. In an example, based on the first network access information, the UE may register to a second network. In an example, the UE may determine to stop using the first network access information, based on at least one of the activation information of the first network access information and/or indication from the second network. For example, the second network may send to the UE, a message comprising the indication. The indication may indicate that the UE is to de-register from the second network, that an access to the second network is not allowed, that the UE need to do a network selection, and/or that the UE needs to stop using the first network selection information. Based on determining to stop using the first network access information, the UE may search a cell of a third network. For example, the UE may perform a search based on a second network access information.

In an example, a UE may register to a second network. In an example, the UE may determine to stop using the first network access information, based on at least one of the activation information of the first network access information and/or indication from the second network. For example, the second network may send to the UE, a message comprising the indication. The indication may indicate that the UE is to de-register from the second network, that an access to the second network is not allowed, that the UE need to do a network selection, and/or that the UE needs to stop using the first network selection information. Based on determining to stop using the first network access information, the UE may search a cell of a third network. For example, the UE may perform a search based on a second network access information.

In an example, a core network node may determine, based on activation information, whether to send a network access information, to a UE. The network access information may comprise information of one or more networks. The one or more networks may be one or more network that the UE is allowed to use/select. Based on the determination to send the network access information, the core network node may send to the UE, the network access information.

In an example, a UE may send to a core network node (e.g., AMF, SoR-AF, UDM, etc.), a request for network access information. For example, the core network node may be a core network node of a first network. The core network node may receive from the UE, the request for network access information. The network access information may comprise information of one or more networks, for which the UE may be allowed to use/access. In response to the request, the core network node may send to the UE, the network access information. The UE may use the network access information to select a network. In response to the sending the request for network access information, the UE may receive from the core network node, the network access information. Based on the received network access information, the UE may select a second network for registration. The network access information may comprise information of the second network.

In an example, the core network node may receive network access assistance information. The network access assistance information may comprise at least one of information of one or more UEs and/or information of one or more networks. In an example, based on the network access assistance information, the core network node may determine a network access information. The network access information may comprise information one or more networks. In an example, the core network node may send to one or more UEs, the network access information.

In an example, a UE may send to a core network node (e.g., AMF, UDM, SoR-AF, PCF) of a first network, a message (e.g., registration request) indicating a capability to handle network access information for selecting a network (e.g., a hosting network). The core network node may receive from the UE, the message indicating a capability to handle network access information for selecting a network. The capability may indicate whether the UE can handle the network access information and/or whether the UE can handle activation information for the network access information. The core network node may determine, based on the message, the network access information. The network access information may comprise at least one of information of one or more networks and/or activation information. Based on the determined network access information, the core network may send to the UE, a message comprising the network access information. In an example, the UE may receive from the core network node, the message comprising the network access information. Based on the network access information, the UE may select a second network. For example, the network access information may comprise information of the second network.

The invention claimed is:

1. A method comprising:
sending, by a wireless device to an access and mobility management function (AMF) of a public land mobile network (PLMN), a non-access stratum (NAS) message comprising a parameter indicating that the wireless device is capable to support an enhanced steering of roaming (SOR) for selecting a standalone non-public network (SNPN), wherein in the enhanced SOR, the wireless device checks whether one or more location validity conditions for accessing one or more SNPN are met;
receiving, by the wireless device from the AMF, network access information comprising:
an identifier of a first SNPN; and
a location validity condition indicating where the wireless device is allowed to access the first SNPN, wherein the location validity condition comprises one or more tracking areas; and
sending, by the wireless device to the first SNPN and upon the location validity condition being met, a registration request message.

2. The method of claim 1, wherein the parameter indicates that the wireless device supports handling the network access information.

3. The method of claim 1, wherein the NAS message comprises at least one of:
an identity of the wireless device;
one or more identifiers of one or more requested network slices; or
an identity of the first SNPN.

4. The method of claim 3, wherein the wireless device receives the network access information in response to sending the NAS message.

5. The method of claim 3, wherein the first NAS message comprises a first registration request message.

6. The method of claim 1, wherein the network access information comprises a time period condition during which the wireless device is allowed to access the first SNPN.

7. The method of claim 6, wherein the time period condition comprises at least one of:
a start time from when the wireless device is allowed to access the first SNPN;
an end time from when the wireless device is not allowed to access the first SNPN; or
a time duration during which the wireless device is allowed to access the first SNPN.

8. A wireless device comprising one or more processors and memory storing instructions that, when executed by the one or more processors, cause the wireless device to:
send, to an access and mobility management function (AMF) of a public land mobile network (PLMN), a non-access stratum (NAS) message comprising a parameter indicating that the wireless device is capable to support an enhanced steering of roaming (SOR) for selecting a standalone non-public networks (SNPN), wherein in the enhanced SOR, the wireless device checks whether one or more location validity conditions for accessing one or more SNPN are met;
receive, from the AMF, network access information comprising:
an identifier of a first SNPN; and
a location validity condition indicating where the wireless device is allowed to access the first SNPN, wherein the location validity condition comprises one or more tracking areas; and
send, to the first SNPN and upon the location validity condition being met, a registration request message.

9. The wireless device of claim 8, wherein the parameter indicates that the wireless device supports handling the network access information.

10. The wireless device of claim 8, wherein the NAS comprises at least one of:
an identity of the wireless device;
one or more identifiers of one or more requested network slices; or
an identity of the first SNPN.

11. The wireless device of claim 10, wherein the wireless device receives the network access information in response to sending the NAS message.

12. The wireless device of claim 10, wherein the NAS message comprises a first registration request message.

13. The wireless device of claim 8, wherein the network access information comprises a time period condition during which the wireless device is allowed to access the first SNPN.

14. The wireless device of claim 13, wherein the time period condition comprises at least one of:
a start time from when the wireless device is allowed to access the first SNPN;
an end time from when the wireless device is not allowed to access the first SNPN; or
a time duration during which the wireless device is allowed to access the first SNPN.

15. A non-transitory computer-readable medium comprising instructions that, when executed by one or more processors, cause a wireless device to:
send, to an access and mobility management function (AMF) of a public land mobile network (PLMN), a non-access stratum (NAS) message comprising a parameter indicating that the wireless device is capable to support an enhanced steering of roaming (SOR) for selecting a standalone non-public network (SNPN), wherein in the enhanced SOR, the wireless device checks whether one or more location validity conditions for accessing one or more SNPN are met;
receive, from the AMF, network access information comprising:
an identifier of a first SNPN; and
a location validity condition indicating where the wireless device is allowed to access the first SNPN, wherein the location validity condition comprises one or more tracking areas; and
send, to the first SNPN and upon the location validity condition being met, a registration request message.

16. The computer-readable medium of claim 15, wherein the parameter indicates that the wireless device supports handling the network access information.

17. The computer-readable medium of claim 15, wherein the NAS message comprises at least one of:
   an identity of the wireless device;
   one or more identifiers of one or more requested network slices; or
   an identity of the first SNPN.

18. The computer-readable medium of claim 17, wherein the wireless device receives the network access information in response to sending the NAS message.

19. The computer-readable medium of claim 17, wherein the NAS message comprises a first registration request message.

20. The computer-readable medium of claim 15, wherein the network access information comprises a time period condition during which the wireless device is allowed to access the first SNPN.

* * * * *